United States Patent
Barton et al.

(10) Patent No.: US 10,839,105 B1
(45) Date of Patent: Nov. 17, 2020

(54) METHOD AND SYSTEM FOR COMPILING A MULTI-SOURCE DATABASE OF COMPOSITE INVESTOR-SPECIFIC DATA RECORDS WITH NO DISCLOSURE OF INVESTOR IDENTITY

(71) Applicant: PLUTOMETRY CORPORATION, Washington, DC (US)

(72) Inventors: Samuel Barton, Washington, DC (US); Bhalchandra R. Ketkar, McLean, VA (US); Casey V. O'Hara, Boyds, MD (US); Todd Goldwasser, Washington, DC (US)

(73) Assignee: Plutometry Corporation, Washington, DC (US)

( * ) Notice: Subject to any disclaimer, the term of this patent is extended or adjusted under 35 U.S.C. 154(b) by 294 days.

(21) Appl. No.: 16/042,980

(22) Filed: Jul. 23, 2018

Related U.S. Application Data

(63) Continuation of application No. 15/150,156, filed on May 9, 2016, now Pat. No. 10,032,048, which is a continuation of application No. 13/895,019, filed on May 15, 2013, now Pat. No. 9,336,532, which is a continuation of application No. 12/649,226, filed on Dec. 29, 2009, now Pat. No. 8,478,765.

(60) Provisional application No. 61/142,597, filed on Jan. 5, 2009, provisional application No. 61/141,203, filed on Dec. 29, 2008.

(51) Int. Cl.
| | | |
|---|---|---|
| G06F 7/00 | (2006.01) |
| G06F 21/62 | (2013.01) |
| G06Q 30/02 | (2012.01) |
| G06Q 40/06 | (2012.01) |
| G06F 16/22 | (2019.01) |
| G06F 16/955 | (2019.01) |
| G06F 16/901 | (2019.01) |
| G06F 16/9535 | (2019.01) |

(52) U.S. Cl.
CPC .......... *G06F 21/6254* (2013.01); *G06F 16/22* (2019.01); *G06F 16/9017* (2019.01); *G06F 16/955* (2019.01); *G06F 16/9535* (2019.01); *G06Q 30/02* (2013.01); *G06Q 30/0201* (2013.01); *G06Q 30/0203* (2013.01); *G06Q 40/06* (2013.01)

(58) Field of Classification Search
USPC .......................................................... 707/756
See application file for complete search history.

(56) References Cited

U.S. PATENT DOCUMENTS

| | | |
|---|---|---|
| 6,397,224 B1 | 5/2002 | Zubeldia et al. |
| 7,158,979 B2 | 1/2007 | Iverson et al. |
| 7,519,591 B2 | 4/2009 | Landi et al. |
| 7,543,149 B2 | 6/2009 | Ricciardi et al. |
| 7,587,368 B2 | 9/2009 | Felsher |

(Continued)

*Primary Examiner* — Alexandria Y Bromell
(74) *Attorney, Agent, or Firm* — Foley & Lardner LLP

(57) ABSTRACT

A system and method are disclosed for compiling a database of investor-related data by gathering and linking customer-specific data records from multiple unaffiliated financial institutions, where such data records are coded in such a manner that the database compiler is enabled to link, across data providers and/or time periods, data records that pertain to the same investor without being provided any information that reveals the identity of any investor.

24 Claims, 15 Drawing Sheets

(56) References Cited

U.S. PATENT DOCUMENTS

| | | | | |
|---|---|---|---|---|
| 7,712,029 | B2* | 5/2010 | Ferreira | G06F 40/166 |
| | | | | 715/256 |
| 7,865,376 | B2* | 1/2011 | Ober | G06F 19/324 |
| | | | | 705/3 |
| 8,478,765 | B2 | 7/2013 | Barton et al. | |
| 9,336,532 | B1 | 5/2016 | Barton et al. | |
| 2002/0073099 | A1* | 6/2002 | Gilbert | G06F 21/6227 |
| | | | | 707/707 |
| 2004/0024790 | A1* | 2/2004 | Everett | G06F 16/284 |
| | | | | 707/707 |
| 2004/0172293 | A1 | 9/2004 | Bruschi et al. | |
| 2005/0193020 | A1* | 9/2005 | Shkedi | G06Q 30/0241 |
| | | | | 707/707 |
| 2006/0053288 | A1* | 3/2006 | Stern | H04L 9/3218 |
| | | | | 713/168 |
| 2007/0106612 | A1* | 5/2007 | O'Brien | G06Q 20/04 |
| | | | | 705/44 |
| 2007/0219928 | A1* | 9/2007 | Madhogarhia | G06Q 20/401 |
| | | | | 705/75 |
| 2008/0147554 | A1* | 6/2008 | Stevens | G16H 10/60 |
| | | | | 705/51 |
| 2009/0044254 | A1* | 2/2009 | Tian | H04L 9/3234 |
| | | | | 726/4 |
| 2009/0271617 | A1* | 10/2009 | Song | H04L 63/06 |
| | | | | 713/155 |
| 2010/0223261 | A1* | 9/2010 | Sarkar | G06F 16/38 |
| | | | | 707/726 |
| 2010/0280763 | A1* | 11/2010 | Fernandez | G06F 21/6245 |
| | | | | 702/19 |

* cited by examiner

METHOD AND SYSTEM FOR COMPILING A MULTI-SOURCE DATABASE OF COMPOSITE INVESTOR-SPECIFIC DATA RECORDS WITH NO DISCLOSURE OF INVESTOR IDENTITY

CROSS REFERENCE TO PRIOR APPLICATIONS

This application is a continuation of U.S. patent application Ser. No. 15/150,156, filed May 9, 2016, which is a continuation of U.S. patent application Ser. No. 13/895,019, filed May 15, 2013, which is a continuation of U.S. patent application Ser. No. 12/649,226, filed Dec. 29, 2009, entitled "A Method and System for Compiling a Multi-Source Database of Composite Investor-Specific Data Records with No Disclosure of Investor Identity," which claims priority pursuant to 35 U.S.C. § 119(e) to U.S. Provisional Patent Application No. 61/141,203, filed Dec. 29, 2008, and U.S. Provisional Patent Application No. 61/142,597, filed Jan. 5, 2009, all of which are hereby incorporated by reference in their entirety.

DESCRIPTION

Background of the Invention

1. Field of the Invention

The present invention generally relates to techniques for compiling computer-processable market research databases and, in particular, to techniques for gathering and linking investor-specific data from multiple data providers without their disclosure of investor-identifying information.

2. Background Description

It has long been commonplace among marketers of consumer products and services to acquire and analyze externally-generated information about their markets in order to gain insight into market trends, consumer preferences, relative competitive performance, the behavior of their customers, and other metrics, with the objective of improving marketing decision-making. Among the methods that have been developed over the years for creating information of this kind, two of the most widely-used are Survey Research and Database Compilation, which can be briefly characterized as follows:

(i) Survey Research—This method entails drawing a scientifically-designed sample of respondents from a certain study population, administering a questionnaire to the respondents to obtain answers to various questions, making statistical projections of the responses to estimate what results would be obtained if such questions were posed to the entire population under study (rather than just a sample thereof) and then creating a range of reports/analyses based upon the survey results to satisfy information needs of the various end-users.

(ii) Database Compilation—This method entails gathering data provided by a set of organizations that participate in an industry (usually extracted from the computerized customer-related data records maintained by such organizations), integrating such data to form a database (a "Multi-Source Database"), and then creating a range of reports/analyses based upon the data in such Multi-Source Database to satisfy information needs of the various data providers.

Discussion of Survey Research

Survey Research is perhaps the earliest and most widely-practiced method of systematic market research within the business world. It is by now a very well-established method of estimating the characteristics of a population of interest or of any segment thereof (such as buyers of luxury automobiles, or retirees, or families with high incomes and children in school).

Typically, the respondents to a survey are not identifiable to the end-users of the survey results. Instead, each respondent data-record includes a set of respondent attributes, which provide a means for classifying respondents so that tabulations/cross-tabulations of responses can be produced that reveal differences among various types or classes of consumers (such as demographic groups, geographic areas, behavioral classes, or any combination of any of the foregoing).

The process typically involves the following set of steps: [a] stratifying the population into relatively homogeneous strata, [b] setting a sampling ratio for each stratum, [c] recruiting a panel of respondents in each stratum to fulfill the sampling plan, [d] assigning a weight to each respondent according to the population size of the stratum the respondent represents, [e] designing and testing a standard questionnaire, [f] administering such questionnaire to each of the respondents, [g] editing the results and loading them into a database of combined respondent records, [h] statistically projecting the results, based upon the weight assigned to each respondent, to estimate the behavior, attitudes, etc., of the various segments of the population of interest, and then [i] generating a set of statistical reports/analyses based upon such data for use by the intended end-users of the survey.

Strengths of Survey Research

The main strength of the Survey Research method is that information about a large population can be gathered through the sampling/projection procedure on a very economical basis, as compared to the cost of surveying the entire population. In addition, this method is highly flexible in terms of the nature of questions asked, being limited only by the imagination of the questionnaire designer and the willingness and/or ability of the respondents to answer the questions posed and to do so accurately.

Limitations of Survey Research

The most important limitation of Survey Research is that the survey process is subject to bias, which can be so profound as to render the survey results invalid. Two main types of bias exist: [a] sampling bias, which arises when the sample of respondents is not representative of the population under study, and [b] response bias, which arises when respondents are either unable or unwilling to accurately respond to questions asked.

There are multiple, and oftentimes intractable, causes of bias in survey work, and it is almost always difficult (or sometimes even impossible) for a survey researcher to know the extent to which survey results have suffered from such distortions since there usually is no objective standard against which to judge the results. Often, the only means by which the validity and accuracy of a survey's outcome can be gauged is by comparing the results to those obtained from similar surveys conducted at other times, or, in the absence of comparable survey results, by making common-sense evaluations of the results. However, both of these approaches are notably fallible ways of determining if a given survey can be relied upon as accurately reflecting the population under study or if, on the contrary, the results are a misleading distortion of reality or, even worse, an invalid (and therefore potentially dangerous) misrepresentation of reality.

Another concern in using Survey Research is that the statistical reliability of projections of survey results depends upon respondent sample sizes. The required sample size usually varies from the hundreds of respondents to the low thousands of respondents, depending upon the percent-incidence in the population of the behavior and/or characteristics to be measured and the degree of projection accuracy required. In cases where the researcher desires to obtain estimates for distinct segments of the population, a comparable sample size is frequently needed for each segment to be measured. Given that survey costs generally vary proportionally with the number of respondents interviewed, the cost of surveying the overall population of interest must be multiplied by a factor that is proportional to the number of mutually-exclusive segments to be measured.

This characteristic of Survey Research makes the method especially challenging from a cost perspective when researchers need to measure many local markets and a variety of discrete segments within them. The prohibitively high cost of conducting a survey on such a large scale is the main reason for the lack of surveys providing extensive geographic and segment detail.

Implications

The Survey Research method has enjoyed broad acceptance and application in a variety of industries as a tool for gaining insight into, and understanding of, consumer/buyer behavior. This is primarily because of the flexibility of content and administration of survey questionnaires and the relative cost-effectiveness of this method in situations where information is sought concerning a certain population in aggregate, or with respect to broad segments of such population. However, when information is required concerning very detailed geographic areas or narrow segments of the population, or when a high degree of accuracy is sought with respect to the study subjects' actual behavior, Survey Research has proved to be less effective than other methods of market research (notably, Database Compilation).

Discussion of Database Compilation

Database Compilation, as a method of conducting market research, has become more and more widely used as the use of computer technology has spread.

Depending upon the analytical purposes for which a Database Compilation is created, data from multiple sources may be merely pooled (i.e., amassed to form a database without interrelating source data records) or both pooled and linked (to further integrate the data by logically associating various sets of source data records received from different data providers).

In cases where input data are merely pooled into a database, reports/analyses can be produced either by comparing the data received from various data providers or, alternatively, summing the data reported so as to calculate totals for all data providers combined.

In cases where data sources are to be linked (after having been pooled), the Database Compilation process includes the creation of a composite logical data record for each person or other entity with respect to which data have been provided (each such person or other entity, a "measured entity"), by linking data received from all data providers that pertain to such measured entity. This procedure enables the creation of reports/analyses based upon a more complete picture of the behavior and characteristics of each measured entity than would be possible using the data from each data provider separately.

Examples of Database Compilations

The present-day practice of Database Compilation takes many forms. Three broad types can be cited to illustrate:

(i) Trade Association Compilations: Numerous trade associations gather data from their members and pool the data to create reports/analyses that satisfy common needs of their members.

One well-known example of this is the flow-of-funds compilation operated by the Investment Company Institute (the "ICI") to track, at the national level, the flow of investment capital into and out of mutual fund families and individual funds. For this purpose, the ICI gathers from each mutual fund group a set of statistical measures related to each fund managed by such fund group and combines the data into a Multi-Source Database in which individual mutual funds and fund groups are measured entities and the input data are pooled for time-series analysis purposes at the level of individual fund and fund group.

From this database the ICI provides to each participant a tracking report that reveals the fund industry's overall status and progress, the trends of the market, and the competitive performance of each fund group.

In this application, there is no need to link data across data sources because the data pertaining to each fund are reported exclusively by the single applicable fund group and, therefore, require only to be pooled before reporting/analysis is performed using the data.

(ii) Government Compilations: The federal and state governments in the U.S. cause useful databases to be compiled for purposes of supporting regulatory functions in their jurisdictions. In many cases such databases are made available to the public for other private uses.

One well-known example is the FDIC's quarterly compilation of bank financial statements and other data. For this program, the FDIC gathers from each bank it regulates a computerized data feed reporting detailed balance sheet information and branch-level metrics, among other data, which it combines into a Multi-Source Database where individual banks and bank holding groups (and, for certain data, bank branches) are measured entities and the input data are pooled for comparative time-series analysis of all measured entities.

The FDIC uses the database for regulatory oversight purposes. Commercial enterprises then acquire the database and repackage the data it contains into products that are marketed to financial institutions and other commercial users for a range of purposes.

For this program, the FDIC does not link data across data sources because the data that pertain to each measured entity are only reported by the institution of which such entity is a part, and the data therefore require only to be pooled before reporting/analysis is performed using the data.

(iii) Commercial Compilations: Many commercial enterprises have established Database Compilation programs by gathering data from firms participating in an industry and then pooling, or pooling and linking, the data obtained in order to create a database from which reports/analyses can be generated to satisfy various information needs of the participants.

An example of a pooled database is the database of financial-advisor performance metrics compiled by the McLagan company. That company gathers data from U.S. securities brokers at the level of individual financial advisor, including a range of metrics related to revenue production and other performance criteria. McLagan pools the data received in order to create a Multi-Source Database in which the financial advisors are treated as measured entities. Because data for each financial advisor can only be provided by the brokerage firm for which he/she works, there is no need (or ability) to link the data across the data providers at that level.

McLagan uses the database to generate comparative reports at the level of individual financial advisor, enabling each participant to assess the performance of each of its individual financial advisors relative to his/her peers in the same geographic market area. McLagan also tabulates aggregate statistics from its database to make broader reports/analyses for its data contributors.

An example of a linked database is the database of financial asset data compiled by IXI Corporation. This firm gathers data from a variety of financial institutions at the ZIP+4 Code level, including data related to customer financial assets, broken down by investment product. IXI pools the data it receives into a Multi-Source Database in which ZIP+4 Codes are treated as measured entities. Because more than one financial institution may provide data with respect to any given ZIP+4 (each doing so to the extent that it has at least one customer who receives statements at an address in such ZIP+4), IXI links its input data across data providers at the ZIP+4 level, thereby enabling it to calculate wealth ratings (both aggregate and average) for each such geographic unit. IXI uses such data in a variety of applications, which include rating consumers based upon the average wealth level of their ZIP+4 neighborhoods and summing the combined data to higher levels in order to produce aggregate statistical analyses.

Strengths of Database Compilation

The principle strengths of Database Compilation as a market research method result from the fact that the source data provided for creating databases in this manner are extracted from computerized records maintained by the participating data providers. As such, input data can be far more accurate and precise than is typically possible using the Survey Research method. As an example, to calculate how much money consumers have invested in financial assets, it would clearly be advantageous to tally the actual statement balances of millions of investors, as reported by the institutions holding such assets, rather than to have to rely upon a few thousand survey respondents to recall balances and be willing to truthfully and accurately report such data, or to rely on the assumption that the persons agreeing to be respondents are actually representative of the population from which they were drawn.

In addition to the inherent accuracy advantages of Database Compilation, there is also the potential for virtually unlimited depth of detail with respect to geographic breakdowns, behavioral classification and other dimensions of segmentation because it is conceptually possible to create a database using every transaction record or account record held by the data providers, rather than using only a sample of records. By contrast to Survey Research processes, once a Database Compilation process has been established, the cost of expanding the quantity of subject records acquired and processed is typically trivial. As a consequence, a large-scale Database Compilation can usually be created at a substantially lower operational cost than is possible when conducting a survey of comparable scope and depth of detail.

Limitations of Database Compilation

Notwithstanding these compelling advantages, a number of natural limitations of Database Compilation can make this research method unsuitable for certain applications. One of the most important limitations is that a Database Compilation can be created solely with respect to data that are captured/maintained by the data providers. The method is therefore suitable for applications based upon data in customer accounts or transactions (for example) but not suitable if the data of interest are not captured, such as customer buying intentions or attitudes (the latter being research interests where the Survey Research method can be effective). In addition, data providers would not normally be able to provide data with respect to consumers who are not yet their customers, while survey researchers can theoretically interview virtually anyone (i.e., both customers and non-customers).

The functional possibilities of a Database Compilation may also be limited by the level of granularity of analysis enabled by the data providers through the structure and content of the data they provide. Any such built-in structural limitations are a function of how the input data records are coded, which reflects the purpose of the database in addition to any policy-based constraints the data providers elect to apply, it normally being the case that data providers do not disclose any more information about their customers than is strictly necessary to fulfill the purpose for which the data are being gathered and are to be used.

There are two main ways in which such limitations are imposed, as described in more detail below.

(i) Pre-aggregation—In some cases, input data are pre-aggregated to the lowest level at which data analysis is to be permitted. As an example, the data providers for the McLagan database might pre-tabulate (or otherwise summarize) their data by financial advisor before submission of their data. In such event, the McLagan database would not be capable of supporting reports/analyses based on entities at more granular levels of detail, such as individual customers or accounts.

(ii) Pre-coding—In other cases, the data may be submitted in disaggregated form (e.g., in the form of individual transactions) but coded so that entity-identifying codes are included only for the levels at which analysis is to be permitted. In such cases, all entity-identifying codes for lower levels of aggregation are excluded (or otherwise removed) from the data before submission, thereby making it impossible to conduct analysis at such levels. For example, data providers for the IXI database might provide disaggregated data records but pre-code each data record with the ZIP+4 Code of the customer to which the data pertain, excluding all personally-identifying information. In that way, IXI would be able to link data across data providers at the ZIP+4 level and tabulate data for that level, while not being able to link data at a more granular level, such as by household or individual person.

Implications

In sum, then, Database Compilation can be a very effective method for gathering information when data of interest are recorded and maintained in the computerized records of the firms in an industry. Moreover, this method can be used to create information of such scope, depth and accuracy as to make it economically infeasible or even impossible to create anything comparable using Survey Research.

In the case of the McLagan database, for example, financial advisors could be surveyed, but they would likely be unable (and perhaps unwilling, as well) to report their commission and other revenue production for each specific time period with an adequate degree of accuracy. Moreover, since it is essential (for the applications intended) to obtain information about each specific financial advisor, it is a far simpler solution to gather revenue/commission data from the computerized records of the brokerage firms that employ such financial advisors rather than to attempt to collect comprehensive and accurate data of this kind by surveying the financial advisors themselves.

A similar comparison to Survey Research could be made with respect to the other Database Compilations described as examples above. All of these examples demonstrate special strengths of Database Compilation as a market research tool and reveal the reasons why this method has emerged as an important complementary tool to Survey Research.

A Special Case: The U.S. Wealth Management Industry

Recent decades have brought exceptionally rapid growth in the U.S. to the retail wealth-management industry, which includes securities brokerage firms, mutual fund groups, retail banks, insurance companies and other firms that hold cash or invested financial assets on deposit for consumers. In response, many efforts have been launched to use Survey Research to track industry trends, gather useful insight into the behavior of investors, and gauge the effectiveness of marketing programs. However, through time, two key issues have emerged that, taken together, constitute a formidable obstacle to the acceptance of Survey Research as a credible and dependable method of creating market information for retail wealth-management firms.

Limitations of Survey Research

The first issue is the difficulty experienced by survey researchers in securing the cooperation of the affluent and wealthy to function as effective survey respondents. A high percentage of such individuals simply refuse to join respondent panels. Of those who agree to do so, many fail to complete the interview process (often as the result of "respondent fatigue," concerns over how their answers might be utilized, or sensitivity to the questions being asked: e.g., "What is your approximate net worth?"). In addition, due to the all-too-frequent lack of plausibility of many survey "findings," financial institutions have come increasingly to suspect that affluent and wealthy respondents, cautious or concerned about how their personal wealth information may be used, misrepresent and consistently understate to a substantial degree the assets they hold when questioned about them in surveys. The net effect of these phenomena is that many financial institutions doubt the representativeness (i.e., lack of bias) and accuracy of self-reported data obtained through surveys of affluent and wealthy individuals and are therefore reluctant to rely on such data for corporate decision-making.

The second issue is the prohibitively high cost of surveying with sample sizes large enough to yield statistically-reliable results for each significant geographic locality and market segment of interest to the wealth-management industry. This limitation is especially significant for the many wealth-management firms engaged in marketing through branch systems in local markets that differ sharply in demographic composition and competitive conditions.

Given the foregoing, and the fact that financial institutions participating in the wealth-management industry are almost exclusively interested in knowing about the affluent and high-net-worth segments of the market, it is all but inevitable that Survey Research would be accorded a far less significant position in the wealth-management industry than in other consumer-oriented industries, such as packaged goods, automotive, media and telecommunications.

Uses of Database Compilation

By contrast, the Database Compilation method has been broadly adopted for market research programs in the wealth-management industry, with applications for a variety of measured entities. As noted earlier in connection with the ICI, FDIC, McLagan and IXI databases, information has been gathered for mutual funds, competing firms, geographic areas, ZIP Codes, ZIP+4 Codes and bank branches as measured entities, among others. Some of these databases are focused on producing aggregate statistics to track an industry's totals and trends. That application is a noteworthy strength of Database Compilation (relative to Survey Research) because the use of actual customer records as source data makes it possible to achieve a very high level of accuracy in the resulting database (presuming of course that there is a high level of participation among the possible sources of data).

However, in order to compile a database that is capable of filling the information gap caused by the key shortcomings of Survey Research (relative to the needs of the wealth-management industry), source data would have to be gathered from multiple financial institutions, pooled and then linked at the individual investor level. If the provided data are not linked in this manner, then it would not be possible to conduct accurate analysis of investors' behavior (whether at an individual or aggregate level) since many investors allocate their financial assets across multiple financial institutions, thereby fragmenting their investment portfolios. In such cases, an accurate view of an investor's portfolio can be created only by joining together (i.e., linking) the various parts held by different institutions.

The linkage of data across data providers at the individual investor level would enable the tabulation/cross-tabulation of data using investor-specific data records in much the same way as is done with survey-respondent data records. A database compiled in this manner would combine the analytical flexibility that is the hallmark of the Survey Research method with the accuracy and depth of detail that is the hallmark of the Database Compilation method. In spite of the considerable promise such a database would hold, there is hardly an example in the prior art, and the reasons for this are well-known, as explained below.

Consumer Privacy Issues and Regulation

Traditionally, financial institutions have been highly sensitive to the confidentiality commitments they have made to their customers. In addition, they have been very cautious when taking the business risk of exposing their customer-identifying information to processes that could (whether inadvertently or as a result of malfeasance) disclose their competitively sensitive data to a third party. Moreover, following the enactment by Congress of the Gramm-Leach-Bliley Act ("GLB") in 1999, the disclosure by a financial institution of any customer-identifying data to a commercial enterprise for the purpose of compiling a Multi-Source Database would constitute a violation of GLB-based regulations. Given these factors, it is hardly surprising that the financial industry has not proven to be a fertile ground for the development of Database Compilations at the individual investor level.

The credit bureau industry could be considered a noteworthy exception to the foregoing in that the databases used in the field are created by gathering credit-history data from many different credit grantors and then pooling and linking such data at individual-consumer level by matching records using identifying information such as name and address, or other identifiers. However, such activities fall under the jurisdiction of the Fair Credit Reporting Act ("FCRA"), not the GLB legislation and, as such, do not constitute a true exception.

Some attempts have been made to initiate similar Database Compilations outside the scope of the FCRA, in which financial data other than credit data would be linked at the individual investor level. One case is a project initiated by Abacus Corporation over a decade ago to pool and link customer-related information it would gather from financial institutions. Abacus had earlier developed a database using catalog purchase records provided by various catalog marketers, which it linked at the person level via name-and-address matching. This yielded a composite purchase-history record for each distinct catalog buyer and a highly productive resource for targeted-marketing purposes. Abacus sought to extend its model into the financial industry but did not succeed. At first, financial institutions were reluctant to participate based on privacy policy considerations. With the passage of the GLB legislation, the Abacus model became legally infeasible and the program never reached a marketable status.

A Gap in Technology

There remains, then, a critical gap in Database Compilation methods used to create market information for the wealth-management industry. In order for a Database Compilation program to fill that gap, a new method is needed that makes it possible for financial institutions to provide investor-specific data to a database compiler, and for the database compiler to link such data across data providers at the individual investor level to create composite investor-specific logical data records, and do so without causing a financial institution to violate GLB-related regulations or to expose its confidential and competitively-sensitive customer information to significant risk of improper disclosure (whether inadvertent or otherwise).

SUMMARY OF THE INVENTION

Statement of the Problem Solved

The present invention is a method and system that enables an entity functioning as a database compiler to create a database by:

(i) gathering, in a computer-processable form, customer-specific data provided by multiple financial institutions (all data so provided, "Customer-Specific Data," and each such financial institution, a "Data Provider"); and (ii) linking such Customer-Specific Data, across Data Providers (and/or time periods) at the level of individual Investor (where "Investor" means any person, or group of persons or other entity, that has a customer relationship with at least one of such Data Providers), without having received from any such Data Provider (in any form or manner) any information maintained by such Data Provider that either is a unique identifier/designator of any of its customers or is information pertaining to any such customer that such Data Provider deems to be non-public personal information (any and all such identifiers, designators and non-public personal information, "Customer-Identifying Information").

A database created in such manner contains composite logical data records, each of which logically associates Customer-Specific Data provided by the Data Providers that pertain to a particular Investor, (any such database, a "Database," and any entity creating such a Database, a "Receiving Entity").

DESCRIPTION OF THE INVENTION

Introduction

Ternary Structure of the Inventive Method

The invention is comprised of three primary parts: the Providing Step, the Gathering Step and the Linking Step, the functions of which are described below with respect to [a] a particular Database, [b] the Receiving Entity creating such Database, [c] the Data Providers providing data for such Database, and [d] a Trusted Third Party, if any, engaged with respect to such Database ("Trusted Third Party" being defined as an entity that is neither the Receiving Entity nor a Data Provider and that, acting under the direction of the Receiving Entity and/or the Data Providers, (1) creates in private, (2) securely maintains, and (3) securely provides to each Data Provider, at least one essential element of the computer-based means to obtain Surrogate Investor Codes (as defined below) and may perform other roles related to creating such Database).

The Use of Surrogate Investor Codes

The method of the invention involves providing to each Data Provider a computer-based means to obtain, with respect to any Investor with which such Data Provider has a customer relationship, a non-identifying code (each such code, a "Surrogate Investor Code") that can be logically associated with Customer-Specific Data pertaining to such Investor that such Data Provider is to provide to the Receiving Entity, where such computer-based means to obtain Surrogate Investor Codes is based upon a certain process through which the Surrogate Investor Codes are derived from, or otherwise related to, a certain portion of Customer-Identifying Information (such as Social Security Number, Taxpayer ID Number, or Name-and-Address) that the Data Providers agree is to serve as the basis upon which each will recognize and designate distinct Investors for purposes of creating the Database, such that each distinct value of such portion of Customer-Identifying Information is treated by all Data Providers as representing one and the same Investor (each such value, an "A-value"), such process being designed in such a manner that:

(i) Each Surrogate Investor Code obtained by such Data Provider has the following properties: [0075] [a] It is derived from (or otherwise related to) one and only one A-value and thus designates one particular Investor and only such Investor; [0076] [b] It does not reveal the identity of such Investor because it has no information content that reveals (1) the A-value from which it was derived (or to which it is otherwise related), or (2) any other Customer-Identifying Information; and [0077] [c] When such Data Provider provides to the Receiving Entity any Customer-Specific Data in association with such Surrogate Investor Code, the Receiving Entity is able to use such Surrogate Investor Code (either directly or indirectly, as discussed below) to link such Customer-Specific Data with data pertaining to the same Investor that were provided by other Data Providers in association with Surrogate Investor Codes obtained by them in a similar manner; and (ii) The set of Surrogate Investor Codes used in the creation of the Database cannot be converted using a mathematical transformation into the set of A-values from which they were derived (or to which they are otherwise related) or into any other Customer-Identifying Information.

Description of the Inventive Method

The Providing Step

In what is referred to as the "Providing Step" of the invention, the Receiving Entity and/or a Trusted Third Party (depending upon the configuration of the type of embodiment of the invention being used) provides to each Data Provider a computer-based means to obtain, with respect to any Investor that is a customer of such Data Provider, a Surrogate Investor Code that corresponds to the A-value associated with such Investor.

In the Providing Step, one of the primary configuration options is that the Surrogate Investor Codes obtained with respect to any particular A-value may be the same for all Data Providers (in which case, they are defined as "B-values") or may be different for each Data Provider (in which case, they are defined as "C-values"), the former being configured when ease of use is to be optimized, and the latter when the competitive sensitivity of the Data Providers' Customer-Specific Data is a greater concern than ease of use.

The Gathering Step

In what is referred to as the "Gathering Step" of the invention, each Data Provider assembles the Customer-Specific Data it is to provide to the Receiving Entity for the purpose of creating the Database. It then processes such data together with the associated Customer-Identifying Information to create a computer-readable data file for use by the Receiving Entity in creating the Database (each such file, an "Input Data File") by:

(i) writing a series of discrete data records, each of which contains Customer-Specific Data pertaining to a particular Investor and the Surrogate Investor Code (a B-value or C-value, depending upon the type of embodiment of the invention being used) that the Data Provider substituted for the A-value associated with such Customer-Specific Data after having obtained such Surrogate Investor Code using the computer-based means for doing so received in the Providing Step (each such discrete data record, an "Input Data Record"); and (ii) blinding each such Input Data Record by excluding all A-values and other Customer-Identifying Information therefrom and/or, as applicable, removing such information from such Input Data Record after the Surrogate Investor Code has been added.

The blinding of Input Data Records as part of the creation of an Input Data File is performed in order to prevent the Receiving Entity from knowing the identity of the Investor to which any of such Input Data Records pertains, but also to satisfy a specific requirement regarding disclosure by financial institutions of customer-related information to third parties, as is set forth in GLB-based regulations.

The Linking Step

In what is referred to as the "Linking Step" of the invention, the Receiving Entity uses the Surrogate Investor Codes contained in Input Data Files provided by the Data Providers to link the Customer-Specific Data associated with such Surrogate Investor Codes, across Data Providers (and/or time periods), at the individual Investor level, and thereby create a Database containing composite logical data records, each of which logically associates Customer-Specific Data that pertain to a particular Investor (i.e., were originally associated with the same A-value) and may have been provided by more than one Data Provider.

In the Linking Step, one of the primary configuration options is that the Surrogate Investor Codes may be used either directly or indirectly for linking data to create the Database.

Linking data from Input Data Files by using the Surrogate Investor Codes directly means that Customer-Specific Data from multiple Data Providers are logically associated at the individual Investor level by matching on the Surrogate Investor Codes themselves. This method of linking is the most efficient way to use the invention, but it is only possible in embodiments that are configured to use B-values as the Surrogate Investor Codes because, by definition, only in such configurations are the Surrogate Investor Codes obtained by the various Data Providers with respect to any particular Investor the same and therefore matchable.

Linking data from Input Data Files by using the Surrogate Investor Codes indirectly means that Customer-Specific Data from multiple Data Providers are logically associated at the individual Investor level by matching based upon alternative codes (or some other data-matching mechanism) derived from or otherwise related to the Surrogate Investor Codes, but not based directly upon the Surrogate Investor Codes themselves. This method of linking may be used with any type of embodiment of the invention, whether it is configured to use B-values or C-values as Surrogate Investor Codes.

In embodiments of the invention configured to use C-values as the Surrogate Investor Codes, it is obligatory that the indirect linking method be used because in such configurations the Surrogate Investor Codes obtained by the various Data Providers with respect to any particular Investor are different (by definition) and, thus, not directly matchable.

In embodiments of the invention configured to use B-values as the Surrogate Investor Codes, use of the indirect linking method is not obligatory but may be appropriate when there is a desire for enhanced data security. In any such case, an alternative system of matching codes (or other data-matching mechanism) can be substituted for the B-values, such that the Receiving Entity preserves its ability to link data, while eliminating all use of B-values, thereby ensuring that any codes used in the Database that designate individual Investors are not known to any Data Provider.

Certain Configuration Options

Methods for Indirect Linking of Data

One way to effect the indirect linking of data is to substitute for the Surrogate Investor Codes (i.e., the B-values or C-values, depending upon the type of embodiment of the invention being used) corresponding D-values, where the "D-values" (also referred to in this document as "Proprietary Investor Codes") are codes that are proprietary to the Receiving Entity, are used by the Receiving Entity for secure linking of Customer-Specific Data from the Input Data Files, at the individual Investor level, and are designed in such a manner that:

(i) Each D-value has the following properties: [0097] [a] It is derived from or otherwise related to the Surrogate Investor Code for which it is substituted, using a process designed in such a manner that the same D-value results from applying such process to any Surrogate Investor Code originating from the same A-value (regardless of which Data Provider's Customer-Specific Data such Surrogate Investor Code is associated with), and, as a result, it designates one particular Investor and only such Investor; [0098] [b] It does not reveal the identity of such Investor because it has no information content that reveals (1) the A-value associated with such Investor, or (2) any other Customer-Identifying Information; and [0099] [c] It is private and confidential to the Receiving Entity and, therefore, neither disclosed to nor made accessible to any Data Provider; and (ii) The set of D-values used in the creation of such Database cannot be converted using a mathematical transformation into the set of Surrogate Investor Codes from which they were derived (or to which they are otherwise related) or into the A-values from which such Surrogate Investor Codes were derived (or to which such Surrogate Investor Codes are otherwise related) or into any other Customer-Identifying Information.

In embodiments of the invention configured to use B-values as Surrogate Investor Codes, the B-values may be used indirectly in the linking process by substituting a D-value for each B-value and then linking data by matching on D-values.

In embodiments of the invention configured to use C-values as Surrogate Investor Codes, the C-values may be used indirectly in the linking process by substituting a D-value for each C-value and then linking data by matching on D-values, or by substituting a B-value for each C-value and (depending upon the competitive sensitivity of the Data Providers' Customer-Specific Data) either (1) linking data by matching on B-values, or (2) taking the further step of substituting D-values for B-values, and then linking data by matching on D-values.

Choice of A-Values

Although the invention can be applied regardless of which portion of Customer-Identifying Information is chosen as the A-values, the most thoroughly linked Databases will result from using a portion of such information that every Data Provider maintains and with respect to which it is reasonable to expect that all Data Providers using a particular value thereof are designating the same Investor.

Given this, it can be seen that the invention is particularly useful when, for example, identifiers such as Social Security Numbers or Taxpayer ID Numbers are used as the A-values. However, the invention can also function effectively when other types of identifiers/designators are used, provided they are properly normalized. For example, in the event that households are to be treated as measured entities for a certain Database, each Data Provider can match any mailing address it maintains for the members of each household to a master directory of standardized mail addresses (each address in such directory having been prepared/formatted to U.S. Postal Service standards) and then normalize each such mailing address by substituting for it the most-closely matching address from the directory of standardized mail addresses.

Types of Embodiment of the Invention

The invention can be implemented through a number of types of embodiment, each differing from the others with respect to the mechanisms by which code substitutions are made and the means by which data security is achieved, the choice among them being determined by the level of competitive sensitivity of the data in the Data Providers' Input Data Files and considerations related to operational convenience.

Glossary of Terms

The description of the invention set forth in the various sections of this document includes definitions of certain terms, the understanding of which is critical to understanding the invention. As a convenience to readers, a glossary of these key terms is provided in the last section of the document (titled "Glossary of Terms").

BRIEF DESCRIPTION OF THE DRAWINGS

The foregoing and other objectives, aspects and advantages of the invention will be better understood from the description of the invention and several of its possible embodiment types set forth in the following sections of this document, with reference to the drawings in which.

DETAILED DESCRIPTION OF THE INVENTION

Functional Description of the Invention

Figure 1:
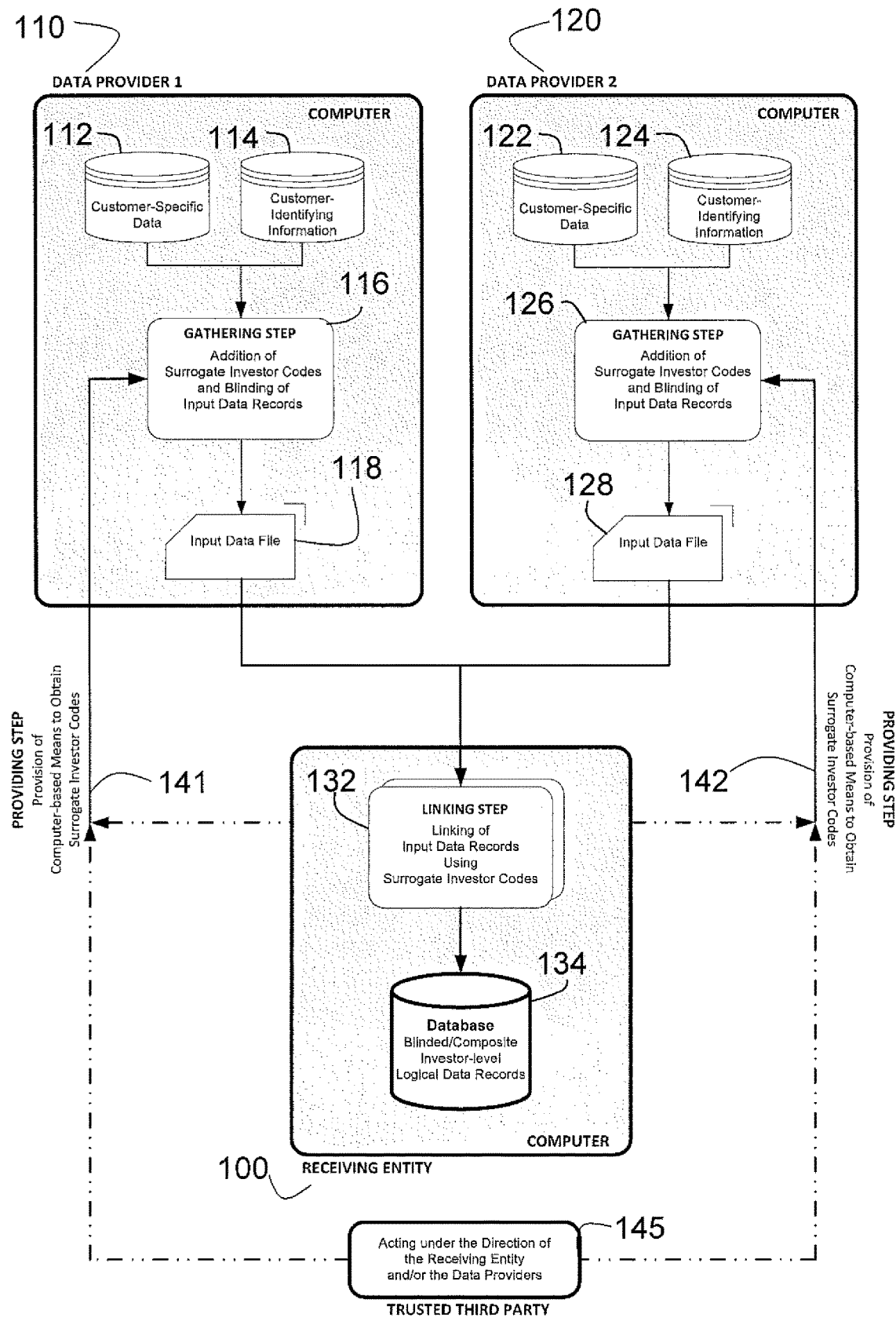
FIG. 1 is a high-level schematic illustrating the function and inter-relationship of the three main parts of the invention: the Providing Step, the Gathering Step and the Linking Step.

Referring now to the drawings, and specifically to FIG. 1, there is shown a process flow diagram that illustrates how the invention operates, which is now described with respect to [a] a particular Database, [b] the Receiving Entity creating such Database, and [c] the Data Providers providing data for such Database.

The diagram is simplified to show two Data Providers (110 and 120). In practice there may be many Data Providers, but the invention can be understood by showing only two. Each Data Provider holds in computer-readable form, among other information, two mutually-exclusive sets of information related to its customers: Customer-Specific Data (112,122) and Customer-Identifying Information (114,124).

The diagram also shows the Receiving Entity (100), the main functions of which (with respect to creating the Database using the invention) are: [a] to provide to each Data Provider, or facilitate a Trusted Third Party's provision to each Data Provider of, a computer-based means to obtain the Surrogate Investor Code that corresponds to each A-value associated with such Data Provider's Customer-Specific Data, [b] to gather Input Data Files from each Data Provider, and [c] to create the Database by linking data from the Input Data Files across Data Providers (and/or time periods), at the individual Investor level.

The process begins in the Providing Step of the invention (141,142). Here, the Receiving Entity (100) (or a Trusted Third Party (145)) provides to each Data Provider a computer-based means to obtain the Surrogate Investor Code that corresponds to each of the A-values associated with such Data Provider's Customer-Specific Data (112,122), the properties of such Surrogate Investor Code being as defined in the section of this document titled "Summary of the Invention."

Then, in the Gathering Step (116,126), each Data Provider (110,120) accesses its Customer-Specific Data (112,122) and at least the A-value portion of the Customer-Identifying Information (114,124) associated with such Customer-Specific Data. It then creates an Input Data File (118,128) for the Receiving Entity (100) by generating a series of Input Data Records, each of which [a] contains Customer-Specific Data (112,122) pertaining to a particular Investor and the Surrogate Investor Code associated with such Customer-Specific Data (where such Surrogate Investor Code is obtained by applying to the A-value associated with such Customer-Specific Data the computer-based means for obtaining Surrogate Investor Codes that such Data Provider received in the Providing Step (141,142)), and [b] is blinded by excluding/removing therefrom such A-value and all other Customer-Identifying Information (114, 124).

The process then ends in the Linking Step of the invention (132). Here, the Receiving Entity (100) receives Input Data Files (118,128) from the Data Providers (110,120) and uses the Surrogate Investor Codes they contain, either directly or indirectly, to link Customer-Specific Data in such Input Data Files, at the individual Investor level, to create a Database (134) that contains composite logical data records, each of which logically associates Customer-Specific Data that pertain to a particular Investor (i.e., data that were originally associated with the same A-value) and may have been provided by more than one Data Provider, and none of which contains any A-value or other Customer-Identifying Information.

The invention may be implemented through various possible embodiments, each configured according to the choice of certain configuration options, among which the primary ones are described in the following sections of this document.

Primary Configuration Options

There are two essential tasks that must be performed in every embodiment of the invention, each of which can be accomplished in one of two ways, with the choices being dependent upon the data security requirements of each particular application of the invention, as discussed below.

The first of these tasks is to blind the Input Data Records written into each Input Data File while preserving the ability of the Receiving Entity to link Customer-Specific Data contained in such Input Data Records across Data Providers (and/or time periods), at the individual Investor level. This is accomplished by substituting into each Input Data Record a non-identifying Surrogate Investor Code (the properties of which are described in the section of this document titled "Summary of the Invention") for the A-value associated with the Customer-Specific Data in such Input Data Record and then removing/excluding the A-value and all other Customer-Identifying Information therefrom.

The Surrogate Investor Codes may be, with respect to any particular Investor, the same for all Data Providers, in which case the Surrogate Investor Codes are B-values, by definition. Alternatively, the Surrogate Investor Codes may be, with respect to any particular Investor, different for each Data Provider (i.e., not the same for any two Data Providers), in which case the Surrogate Investor Codes are C-values, by definition.

The second task is to use the Surrogate Investor Codes (i.e., the B-values or C-values) in the Input Data Records to link Customer-Specific Data contained therein across Data Providers (and/or time periods), at the individual Investor level, and thereby create a Database.

Depending upon the configuration option selected for the Surrogate Investor Codes, Customer-Specific Data may be linked using the Surrogate Investor Codes either directly or indirectly. Using the Surrogate Investor Codes directly for linking data involves logically associating Customer-Specific Data that were originally associated with the same A-value (and may have been received on different Input Data Files) by matching on the Surrogate Investor Codes themselves. Using the Surrogate Investor Codes indirectly for linking involves logically associating Customer-Specific Data that were originally associated with the same A-value (and may have been received on different Input Data Files) by [a] substituting for each Surrogate Investor Code an alternative code (or other means of data-matching) that is part of a computer-based mechanism for linking, at the individual Investor level, Customer-Specific Data from multiple Data Providers, and then [b] linking data by matching on such alternative codes (or other means of data-matching).

These two tasks and the primary configuration options for accomplishing them within various embodiment types of the invention are further discussed in the following sections, with reference to FIGS. 2A, 2B and 2C.

Figure 2A:
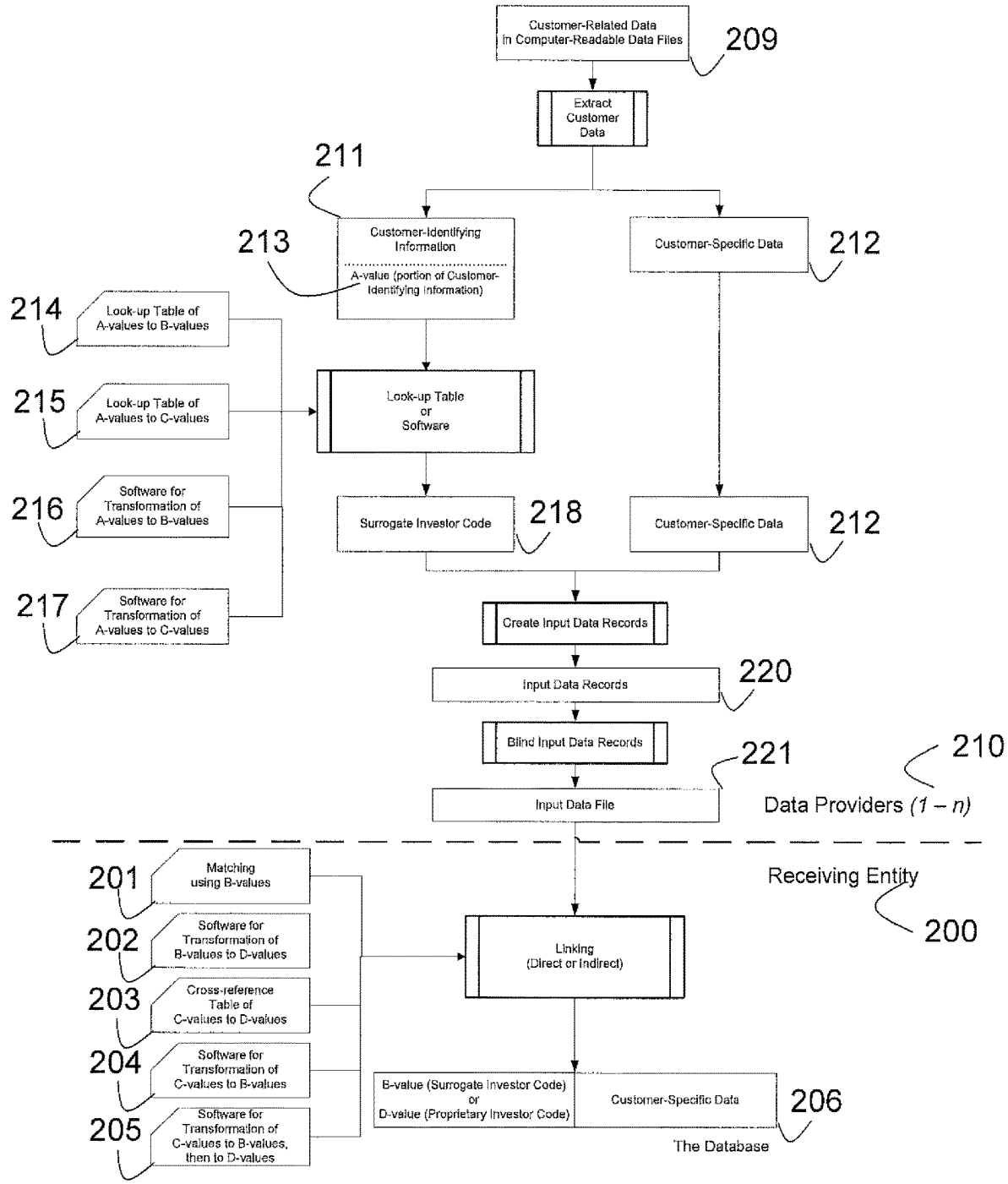
FIG. 2A is a detailed schematic illustrating the Gathering Step and the Linking Step of the invention and the various mechanisms for performing their respective functions in the different embodiment types of the invention.

Discussion of FIG. 2A

FIG. 2A is a schematic illustration that provides an overview of certain options for performing these two functions within the scope of the invention. It shows a Data Provider (210) extracting from the customer-related data in its computer-readable data files (209) a table of Customer-Specific Data (212) and an associated table of Customer-Identifying Information (211). The content of the two tables is logically linked by virtue of having at least one common data field (which, in FIGS. 2B and 2C, is the Acct-ID field). This way of storing customer-related data in separate linked tables (as illustrated in more detail in FIGS. 2B and 2C, and in the other figures that illustrate different types of embodiment of the invention) is purely exemplary. The invention will work as long as each Data Provider logically associates in some manner its Customer-Specific Data with its corresponding Customer-Identifying Information.

In the Gathering Step of the invention, the Data Provider generates a series of Input Data Records (220) to create an Input Data File (221) for submission to the Receiving Entity (200). Each of such Input Data Records contains [a] Customer-Specific Data (212) pertaining to a particular Investor, and [b] a corresponding Surrogate Investor Code (218) appropriate to the type of embodiment being used. The Data Provider (210) obtains such Surrogate Investor Code by using the computer-based means for doing so that was provided to it in the Providing Step of the invention. According to the type of embodiment used, this may be:

(i) a look-up table (214 or 215) that contains all allowable A-values (i.e., all values of the A-value portion (213) of the Customer-Identifying Information (211) associated with such Customer-Specific Data (212) that the entity that creates such look-up table deems to be allowable), with each A-value being coupled with the corresponding Surrogate Investor Code (either a B-value (214) or a C-value (215), according to the configuration of such embodiment type); or (ii) a software module (216 or 217) programmed to perform a transformation of any allowable A-value (where allowable A-values are as defined in (i) above) to derive the corresponding Surrogate Investor Code (either a B-value (216) or a C-value (217), according to the configuration of such embodiment type).

As part of the process that creates Input Data Records, each Input Data Record is blinded by the removal/exclusion therefrom of [a] the A-value associated with the Customer-Specific Data in such Input Data Record, and [b] all other Customer-Identifying Information. Once all Input Data Records (220) have been blinded in this manner, the Data Provider provides the resulting Input Data File (221) to the Receiving Entity for use in creating the Database (206).

In the Linking Step of the invention, the Receiving Entity (200) receives an Input Data File (221) from the Data Provider (210) and processes the Surrogate Investor Codes (218) it contains in one of the following ways in order to link the associated Customer-Specific Data (212):

(i) If the embodiment is configured in such a manner that the Surrogate Investor Codes are B-values (i.e., they are the same for all Data Providers with respect to any particular A-value), the Surrogate Investor Codes may be used either directly or indirectly for linking Customer-Specific Data in the Linking Step. Data may be linked simply by matching on the B-values themselves (201). This constitutes direct use of the Surrogate Investor Codes (i.e., B-values) for linking data. Alternatively, to achieve elevated data security, a transformation may be performed (202) to convert each B-value into the corresponding D-value (Proprietary Investor Code), after which data may be linked by matching on D-values. This constitutes indirect use of the Surrogate Investor Codes (B-values) for linking data.

(ii) If the embodiment is configured in such a manner that the Surrogate Investor Codes are C-values (i.e., they are different for each Data Provider with respect to any particular A-value), the Surrogate Investor Codes must be used indirectly to link Customer-Specific Data in the Linking Step because data cannot be linked by matching on the C-values themselves. Indirect use of C-values for linking data can be achieved by [a] using a cross-reference table (203) (created in the manner described in the sections of this document pertaining to Embodiment Types V and VI, below) to obtain the D-value corresponding to each C-value, and then linking data by matching on D-values, or [b] performing a software-based transformation (204) to convert each C-value into the corresponding B-value, and then linking data by matching on B-values, or [c] performing two successive software-based transformations (205) to convert each C-value into the corresponding B-value and then the resulting B-value into the corresponding D-value, and then linking data by matching on D-values.

Figure 2B:
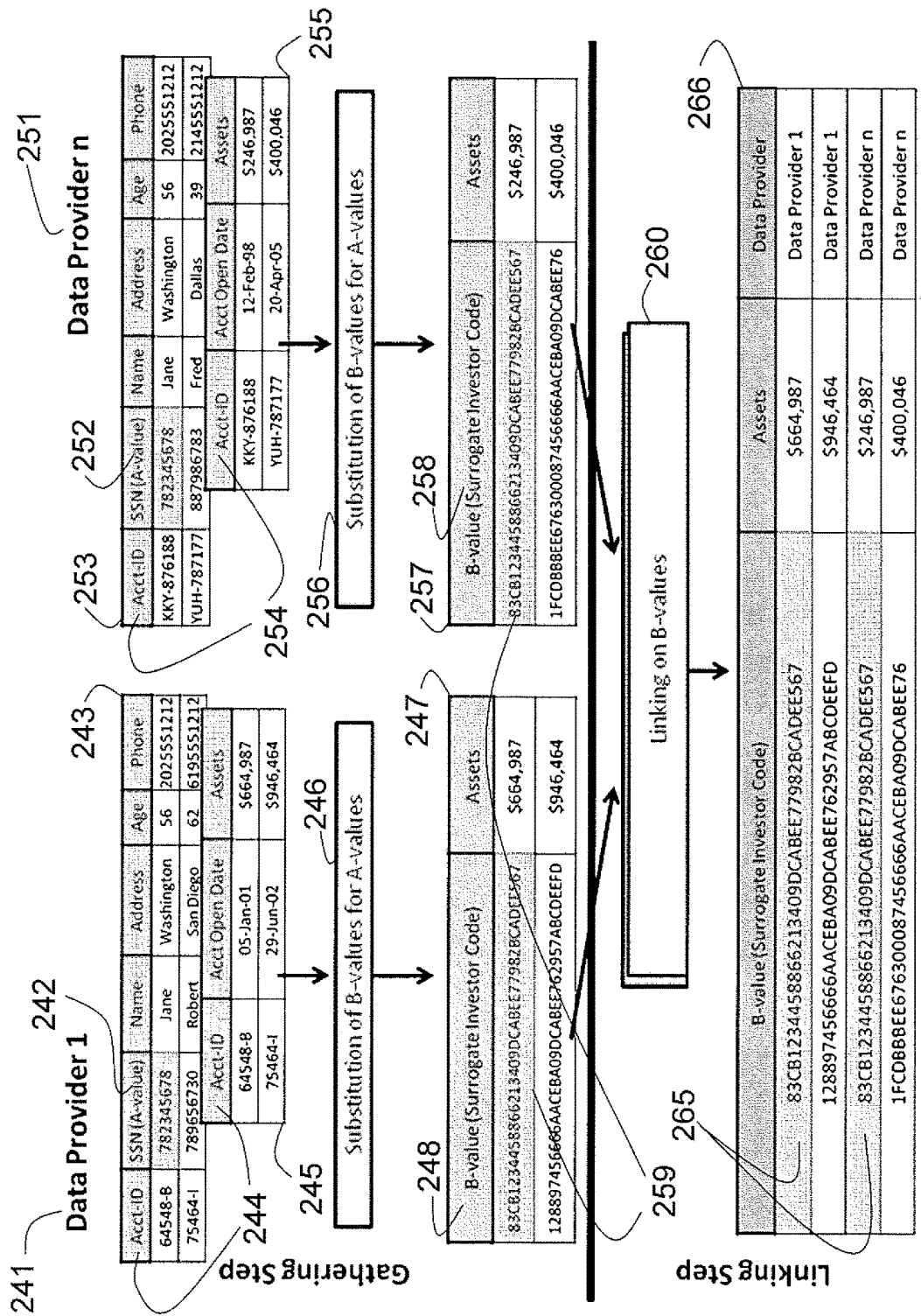
FIG. 2B is a detailed schematic illustrating how the Gathering Step and the Linking Step function in embodiment types in which the Surrogate Investor Codes associated with any particular Investor are the same for each Data Provider (i.e., are B-values) and in which Surrogate Investor Codes are used directly to link data contained in such Input Data Records.

Discussion of FIG. 2B

FIG. 2B provides a more detailed illustration of the preparation of Input Data Files and linking of data from such files when an embodiment is configured so that the Surrogate Investor Codes are B-values and the Surrogate Investor codes are used directly to link data. This illustration is simplified to show two Data Providers (241 and 251). In practice, there may be many Data Providers, but these aspects of the invention can be understood by showing only two.

Each Data Provider (241,251) holds a table that contains Customer-Specific Data (245,255) and an associated table containing Customer-Identifying Information (243,253). The rows of the tables are logically associated via a column in each table labeled "Acct-ID" (244,254) (which is part of the Customer-Identifying Information). For this example, the only element of information that is treated as Customer-Specific Data (by virtue of being included in the Input Data Files 247,257)) is "Assets." This limitation is made in order to simplify the explanation of the invention, but it should be understood that Customer-Specific Data may include virtually any type of information maintained by the Data Providers related to their customers, except for Customer-Identifying Information. For this illustration, the A-values are the SSN (Social Security Number) values (242,252) of the customers of each Data Provider.

Note that the value 782345678 of the A-value (SSN) appears in each Data Provider's Customer-Identifying Information table (243,253) and is associated with Investor "Jane" in both tables. From the two associated tables that contain Customer-Specific Data (245,255), one can see that Jane's balance is $664,987 with Data Provider 1 and $246,987 with Data Provider n.

In each Data Provider's Gathering Step (246,256), a series of Input Data Records is generated to create the Input Data File (247,257). Each such Input Data Record (shown as one row in the Input Data File (247, 257)) contains the asset balance from the Customer-Specific Data (245,255) and a Surrogate Investor Code (248,258) obtained by applying the computer-based means for obtaining Surrogate Investor Codes (that was provided in the Providing Step) to the A-value associated with such asset balance. In order to blind such Input Data Record, the A-value and all other associated Customer-Identifying Information (243,253) are removed/excluded therefrom.

FIG. 2B illustrates the option of the inventive method in which the means for obtaining the Surrogate Investor Code that corresponds to each A-value is configured so that, with respect to any given A-value, the same Surrogate Investor Code is obtained by each Data Provider. With an embodiment configured in this manner, the Surrogate Investor Code obtained is a B-value (by definition). Thus, the B-value each Data Provider obtains with respect to Investor "Jane" is the same (259) because the A-values (242,252) associated with Investor "Jane" are the same in each of the Customer-Identifying Information tables. This is in contrast to the other Input Data Records in each Data Provider's Input Data File (247,257) where each B-value (248,258) entered is unique because it originated from a unique A-value and, thus, pertains to a different Investor.

FIG. 2B also illustrates the option available in the Linking Step of the invention in which the Surrogate Investor Codes are used directly by the Receiving Entity to link data. Because in this illustration the Surrogate Investor Code that each Data Provider obtains with respect to a particular A-value is the same (i.e., is a B-value), in the Linking Step (260) the Receiving Entity can load Customer-Specific Data from the Input Data Records to the Database (266) and directly link such data by matching on the associated B-values. With the Linking Step configured in this manner, then, the two data records in the Database (266) for Investor "Jane" are linked because they are logically associated with the same B-value (265), whereas the other two data records are not linked to other data records in the Database because each is associated with a unique B-value (each having originated from a unique A-value).

In an operational setting, the decision to use an embodiment of the invention that incorporates the two options illustrated in FIG. 2B (i.e., using B-values as the Surrogate Investor Codes and using Surrogate Investor Codes directly to link data) will be dependent upon the data-security requirements prevailing in the specific operational context. Use of such an embodiment of the invention results in the simplest possible method of applying the invention and therefore the most efficient way to use it. However, there are certain data-security risks associated with these options that arise from the fact that any data file with B-values in its data records can be linked (by anyone) to any other such data file.

This means, for example, that any Data Provider can link to its own Input Data Records (247,257) the Input Data Records of another Data Provider or any data records extracted from the Database (266) that contain Investor-level data coded/keyed with B-values and, in that way, determine which of its customers have accounts with other Data Providers and how such customers' financial assets are distributed among the firms.

If the risks are low that the Input Data File of a Data Provider could be misdirected to any other Data Provider, or if there exists a minimal level of competitive sensitivity associated with the data in such an Input Data File and in the Database, then the configuration options illustrated in FIG. 2B may provide sufficient data security for an application of the invention. However, in the event that competitive sensitivity is high among Data Providers with respect to the Customer-Specific Data in their Input Data Files and in the Database, then an embodiment of the invention that is configured to incorporate the options illustrated in FIG. 2C (as described below) could be chosen in order to achieve elevated data security.

Figure 2C:
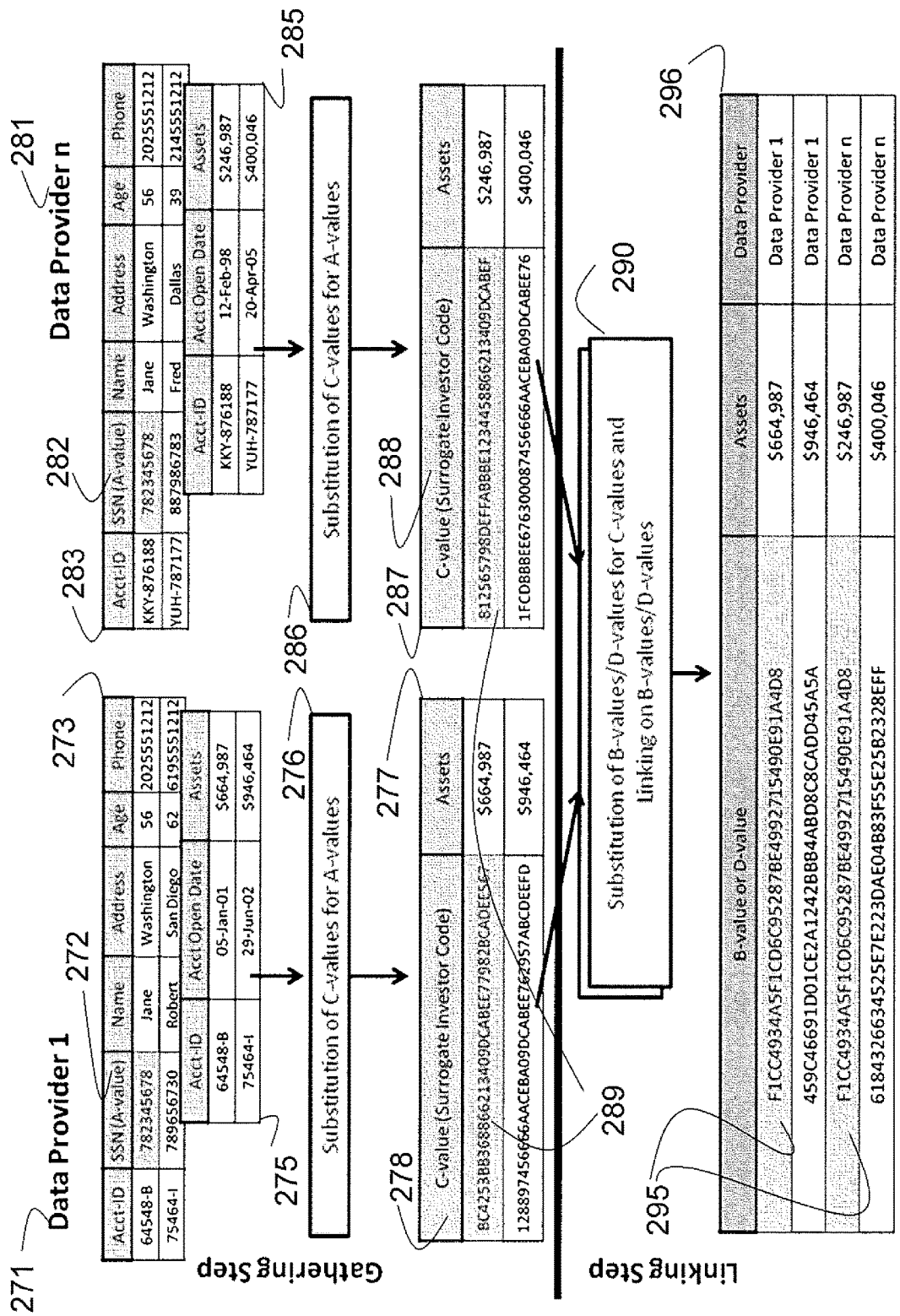
FIG. 2C is a detailed schematic illustrating how the Gathering Step and the Linking Step function in embodiment types in which the Surrogate Investor Codes associated with any particular Investor are different for each Data Provider (i.e., are C-values) and in which Surrogate Investor Codes are used indirectly to link data contained in such Input Data Records.

Discussion of FIG. 2C

FIG. 2C provides a more detailed illustration of the preparation of Input Data Files and linking of data from such files when an embodiment is configured so that the Surrogate Investor Codes are C-values and the Surrogate Investor Codes are used indirectly for linking data. This illustration is simplified to show two Data Providers (271 and 281). In practice, there may be many Data Providers, but these aspects of the invention can be understood by showing only two.

FIG. 2C is similar in form to FIG. 2B, and the content of the Customer-Identifying Information table (273,283) and the table containing Customer-Specific Data (275,285) for the two Data Providers (271,281) is the same in FIG. 2C as in the comparable tables of FIG. 2B (243,253;245,255). Note, especially, that the A-values (i.e., the Social Security Numbers) for Investor "Jane" are still the same (272,282).

The differences in FIG. 2C result from changes required to illustrate the option of the inventive method in which the means provided (in the Providing Step) for obtaining the Surrogate Investor Code that corresponds to each A-value is configured so that, with respect to any particular A-value, a different Surrogate Investor Code is obtained by each Data Provider (as opposed to the same Surrogate Investor Code, as is illustrated in FIG. 2B).

With an embodiment configured in this manner, the Surrogate Investor Codes obtained are C-values (by definition), and the various sets of C-values obtained are referred to by adding a subscript to the C, such as $C.sub.1$-values for Data Provider 1, $C.sub.2$-values for Data Provider 2, $C.sub.n$-values for Data Provider n, etc. Thus, the C-value (i.e., Surrogate Investor Code) obtained by each Data Provider with respect to Investor "Jane" (289) is different, although the A-values (272,282) associated with Investor "Jane" are the same in both Customer-Identifying Information tables (273,283).

In the Gathering Step (276,286), each Data Provider's creation of Input Data Records to comprise its Input Data File (277,287) is carried out in a similar manner to that described for FIG. 2B, except that each Surrogate Investor Code is a C-value (278,288).

FIG. 2C also illustrates the option available in the Linking Step of the invention in which the Surrogate Investor Codes are used indirectly by the Receiving Entity to link data records (instead of directly, as is illustrated in FIG. 2B). Because in this illustration the Surrogate Investor Code each Data Provider obtains with respect to a particular A-value is different for each Data Provider (i.e., is a C-value), in the Linking Step (290) the Receiving Entity cannot link data in the Input Data Records with other data in the Database (296) by simply matching directly on the C-values contained in such Input Data Records and must therefore substitute an alternative code system (or other data-matching mechanism) for the C-values. This may be accomplished in one of the following ways (among others) depending upon the configuration of the embodiment being used: [a] substituting for each C-value the corresponding D-value and then linking data by matching on D-values, or [b] substituting for each C-value the B-value from which it was derived, and then either (1) linking data by matching on B-values, or (2) making a further substitution of the corresponding D-value for each such B-value, and then linking data by matching on D-values. The purpose served by such substitution(s) is to map the differing sets of C-values used by various Data Providers to a single common code set (either B-values or D-values, depending upon the configuration of the type of embodiment of the invention being used) and, in that manner, logically associate data that were originally associated with the same A-value and may have been provided by more than one Data Provider. This effect is achieved because each B-value and each D-value is associated with one and only one Investor/A-value.

With the Linking Step configured in this manner, the two data records in the Database (296) for Investor "Jane" are linked because they are logically associated with the same B-value (295) or D-value (295), as applicable, whereas the other two data records are not linked to other data records in the Database because each is associated with a unique B-value or D-value, as applicable, (each having originated from a unique A-value.

TYPES OF EMBODIMENT OF THE INVENTION

Several of the possible types of embodiment of the invention, will now be described, each with respect to [a] a particular Database, [b] the Receiving Entity creating such Database, [c] the Data Providers providing data for such Database, and [d] the Trusted Third Party, if any, that is engaged with respect to such Database. These descriptions give a more concrete understanding of the methods by which Surrogate Investor Codes can be created, the ways in which code substitutions can be performed, and the ways in which such codes can be used to link data from multiple Data Providers.

Embodiment Type I

Embodiment Type I is distinguished from other types of embodiment by the following combination of elements:

(i) In the Providing Step of the invention, the provision to each Data Provider of software that transforms all allowable A-values into corresponding Surrogate Investor Codes that, with respect to any particular A-value, are the same for all Data Providers and thus are B-values—such software constituting the computer-based means to obtain such corresponding Surrogate Investor Codes;

(ii) In the Gathering Step of the invention, the substitution of B-values for A-values, using the software provided in the Providing Step; and (iii) In the Linking Step of the invention, the use of the Surrogate Investor Codes (i.e., B-values) either directly or indirectly for linking data contained in the Input Data Files.

Figure 3:
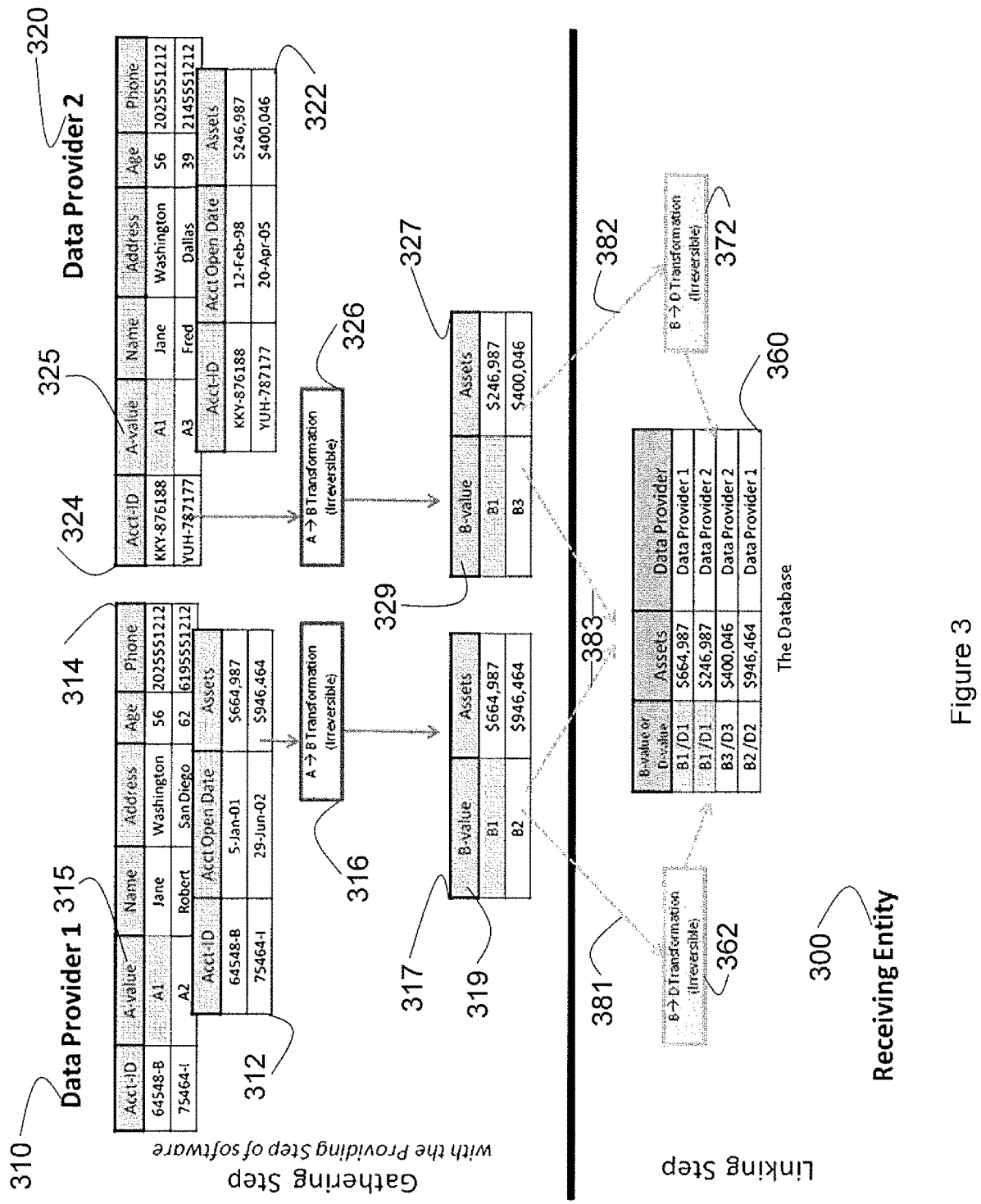
FIG. 3 is a detailed schematic illustrating a type of embodiment of the invention in which the Surrogate Investor Codes are B-values (as in FIG. 2B), obtained by performing a software-based transformation of each A-value to derive the corresponding B-value, and in which the B-values are used in the linking process that creates the Database.

This embodiment type is now explained in greater detail, with reference to FIG. 3.

Providing Step

In the Providing Step, each Data Provider (310, 320) is provided a software module programmed to perform a transformation (316,326) that converts into the corresponding Surrogate Investor Code (319,329) any allowable A-value (315,325) associated with the Customer-Specific Data (312,322) which such Data Provider is to submit to the Receiving Entity (300).

It is required in this embodiment type that each Surrogate Investor Code be a B-value (319,329). As a result, the software modules provided to the Data Providers must all be configured in the same way such that, with respect to any given A-value (315,325), each Data Provider obtains the same B-value.

The software-based transformation (316,326) of A-values (315,325) to derive corresponding B-values (319,329) (the "A-to-B transformation") is required to be irreversible in this embodiment type. The reason for this is to prevent the Receiving Entity from being able to use any B-value in an Input Data File (317,327) it receives (in the Linking Step) to derive the corresponding A-value (315,325) by reversing the A-to-B transformation (316,326) performed to create such B-value (by a Data Provider in the Gathering Step) and thereby determine the identity of an Investor.

Configuration Options: There are several options available for configuring the Providing Step of this embodiment type, including those discussed below:

In selecting the portion of Customer-Identifying Information to serve as the A-values, there normally are several possibilities. The preferred choices are discussed in Subsection 1 ("Defining A-values") in the section of this document titled "Discretionary Elements Common to the Embodiments."

An irreversible transformation (316,326) of the A-values (315,325) to derive corresponding B-values (319,329) is a required part of this embodiment type. Some of the methods for performing transformations of this kind are described in Subsection 3 ("Choice of Methods for Irreversible Transformations") in the section of this document titled "Discretionary Elements Common to the Embodiments."

In addition to minimizing the risk that anyone in the Receiving Entity having access to data from Input Data Files could successfully reverse any A-to-B transformation (such risk reduction being achieved by making each such transformation irreversible), it is also desirable to minimize the risk that anyone in the Receiving Entity could successfully use a dictionary-style attack on the B-values (as discussed in Subsection 3 ("Choice of Methods for Irreversible Transformations") in the section of this document titled "Discretionary Elements Common to the Embodiments") and thereby determine the A-value associated with any B-value in an Input Data File. One way to sharply reduce this risk with Embodiment Type I is to configure any embodiment thereof in such a manner that:

(i) The software modules provided to the Data Providers for performing the A-to-B transformations (316,326) are configured in such a manner that a Seed is used with each such transformation (the use of Seeds being discussed more fully in Subsection 3 ("Choice of Methods for Irreversible Transformations") in the section of this document titled "Discretionary Elements Common to the Embodiments");

(ii) All such software modules are configured in such a manner as to incorporate a common transformation algorithm in conjunction with a common Seed for each Data Provider, such that any given Data Provider performs the A-to-B transformation using the same transformation algorithm and the same Seed as every other Data Provider; and (iii) A Trusted Third Party is engaged to create such Seed and provide it in a secure manner directly to each Data Provider (without disclosing the Seed to the Receiving Entity or to any other party).

In this configuration, either or both of the functions of (1) creating or otherwise obtaining the software that performs the A-to-B transformations (316,326), and (2) providing such software to the Data Providers, may be performed either by the Trusted Third Party or by the Receiving Entity, depending upon operational convenience.

The rationale for engaging a Trusted Third Party to perform one or more of the functions of the Providing Step with respect to a particular embodiment of the invention is discussed in Subsection 8 ("Role of a Trusted Third Party") in the section of this document titled "Discretionary Elements Common to the Embodiments."

Gathering Step

In the Gathering Step, each Data Provider initially assembles its Customer-Specific Data (312,322) to be submitted to the Receiving Entity for purposes of creating the Database, along with the A-value portion (315,325) of the associated Customer-Identifying Information (314,324). The Data Provider then creates an Input Data File (317,327) comprising discrete Input Data Records, each of which contains Customer-Specific Data pertaining to a particular Investor and the associated B-value (319,329) which such Data Provider [a] obtained by applying the software module provided to it in the Providing Step to the A-value associated with such Customer-Specific Data, and then [b] substituted (316,326) for such A-value.

As part of the process just described, the Data Provider removes/excludes all A-values and other Customer-Identifying Information from each Input Data Record, as a result of which the Input Data File is fully blinded. Upon having completed preparation of an Input Data File (317,327) in this manner, the Data Provider submits the file to the Receiving Entity (300) for use in creating the Database.

Configuration Options: There are several options available for configuring the Gathering Step in this embodiment type, including those discussed below:

It is preferred that each Data Provider, before performing the Gathering Step, standardize/normalize all A-values in its Customer-Identifying Information. This topic is discussed more fully in Subsection 2 ("Standardization/Normalization of A-values") in the section of this document titled "Discretionary Elements Common to the Embodiments."

In FIG. 3, only one element of Customer-Specific Data (312,322) is shown, namely the asset balance in each customer's accounts. However, there are usually numerous choices available as to which elements of customer-related data could be treated as Customer-Specific Data and therefore be provided to the Receiving Entity. This topic is discussed more fully in Subsection 6 ("Choice of Customer-Specific Data") in the section of this document titled "Discretionary Elements Common to the Embodiments."

In order to protect from improper disclosure the contents of Input Data Files (317,327) during transit to the Receiving Entity (300), it is preferred that each Data Provider (310, 320) encrypt its Input Data Files, using a full-file encryption process, before submitting them to the Receiving Entity for use in creating the Database. This topic is discussed more fully in Subsection 7 ("File Encryption") in the section of this document titled "Discretionary Elements Common to the Embodiments."

Linking Step

In the Linking Step, the Receiving Entity (300) loads to a Database (360) Customer-Specific Data from each Input Data File (317,327) it receives and uses the Surrogate Investor Codes (319,329) associated with such data (i.e., the B-values) to link the data with Customer-Specific Data from other Data Providers (and/or time periods).

Configuration Options: There are several options available for configuring the Linking Step in this embodiment type, including those discussed below:

If any Data Provider uses a full-file encryption process in the Gathering Step to encrypt an Input Data File (317,327), that file must be decrypted before it is used in the Linking Step. This topic is discussed more fully in Subsection 7 ("File Encryption") in the section of this document titled "Discretionary Elements Common to the Embodiments."

Given that in this embodiment type all Surrogate Investor Codes in the Input Data Files are B-values, the Receiving Entity may link the associated Customer-Specific Data by using the Surrogate Investor Codes either directly (383) or indirectly (381,382). It is preferred, however, that the Receiving Entity use the B-values indirectly for linking data. One way to accomplish this is to [a] perform a transformation (362, 372) that converts each B-value into the corresponding D-value, and then [b] link the associated Customer-Specific Data by matching on D-values. This topic is discussed more fully in Subsection 5 ("Use of B-values and D-values for Linking Data") in the section of this document titled "Discretionary Elements Common to the Embodiments."

Embodiment Type II

Embodiment Type II is distinguished from other types of embodiment by the following combination of elements:

(i) In the Providing Step of the invention, the provision to each Data Provider of a computer-readable look-up table that contains all allowable A-values and their corresponding Surrogate Investor Codes that, with respect to any particular A-value, are the same for all Data Providers and thus are B-values—such look-up table constituting the computer-based means to obtain such corresponding Surrogate Investor Codes;

(ii) In the Gathering Step of the invention, the substitution of B-values for A-values, by using the look-up table provided in the Providing Step; and (iii) In the Linking Step of the invention, the use of the Surrogate Investor Codes (i.e., B-values) either directly or indirectly for linking data contained in the Input Data Files.

Figure 4A:
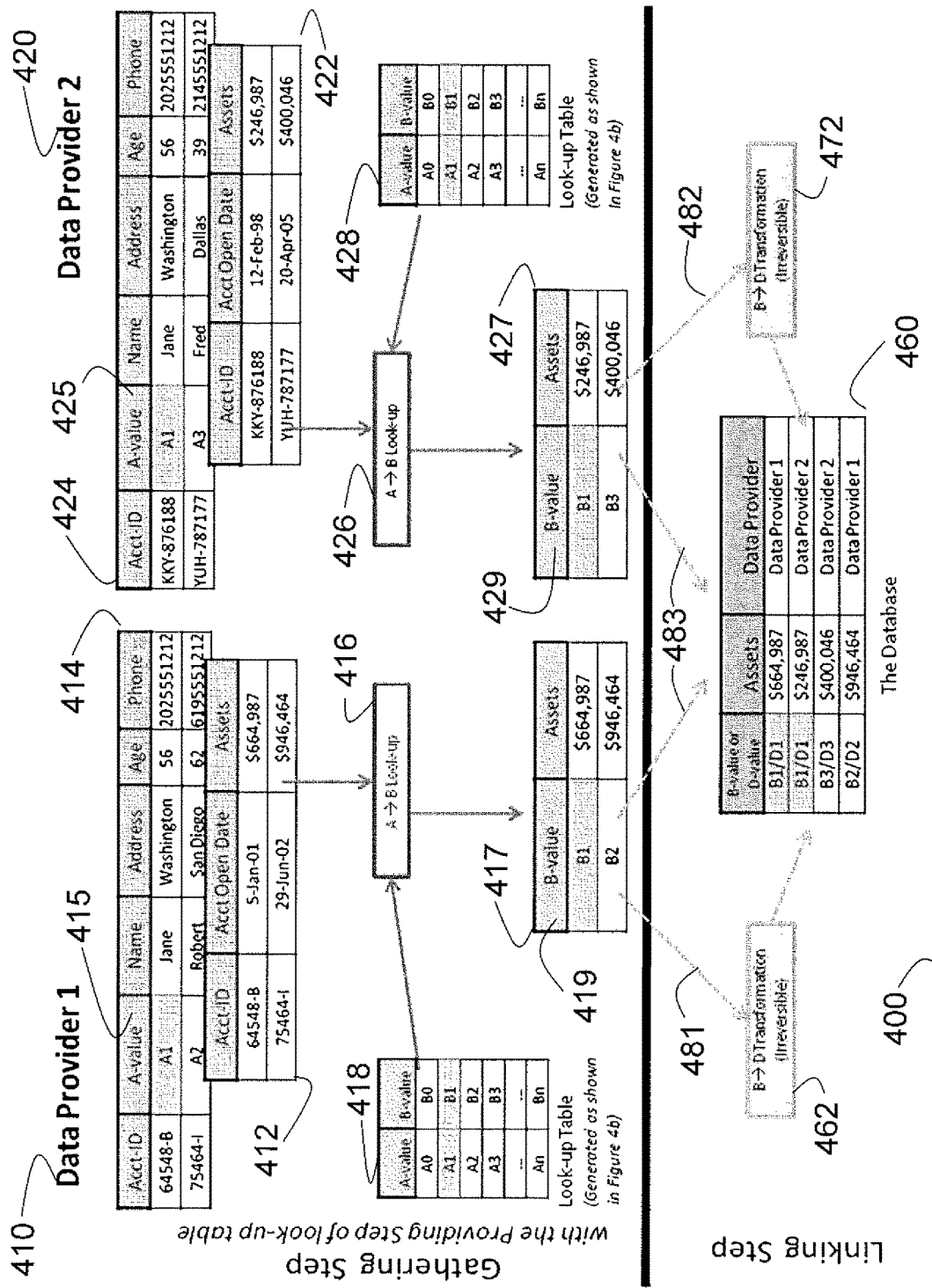
FIG. 4A is a detailed schematic illustrating a type of embodiment of the invention in which the Surrogate Investor Codes are B-values (as in FIG. 2B), obtained by searching an A-to-B look-up table to find the B-value corresponding to each A-value, and in which the B-values are used in the linking process that creates the Database.
Figure 4B:
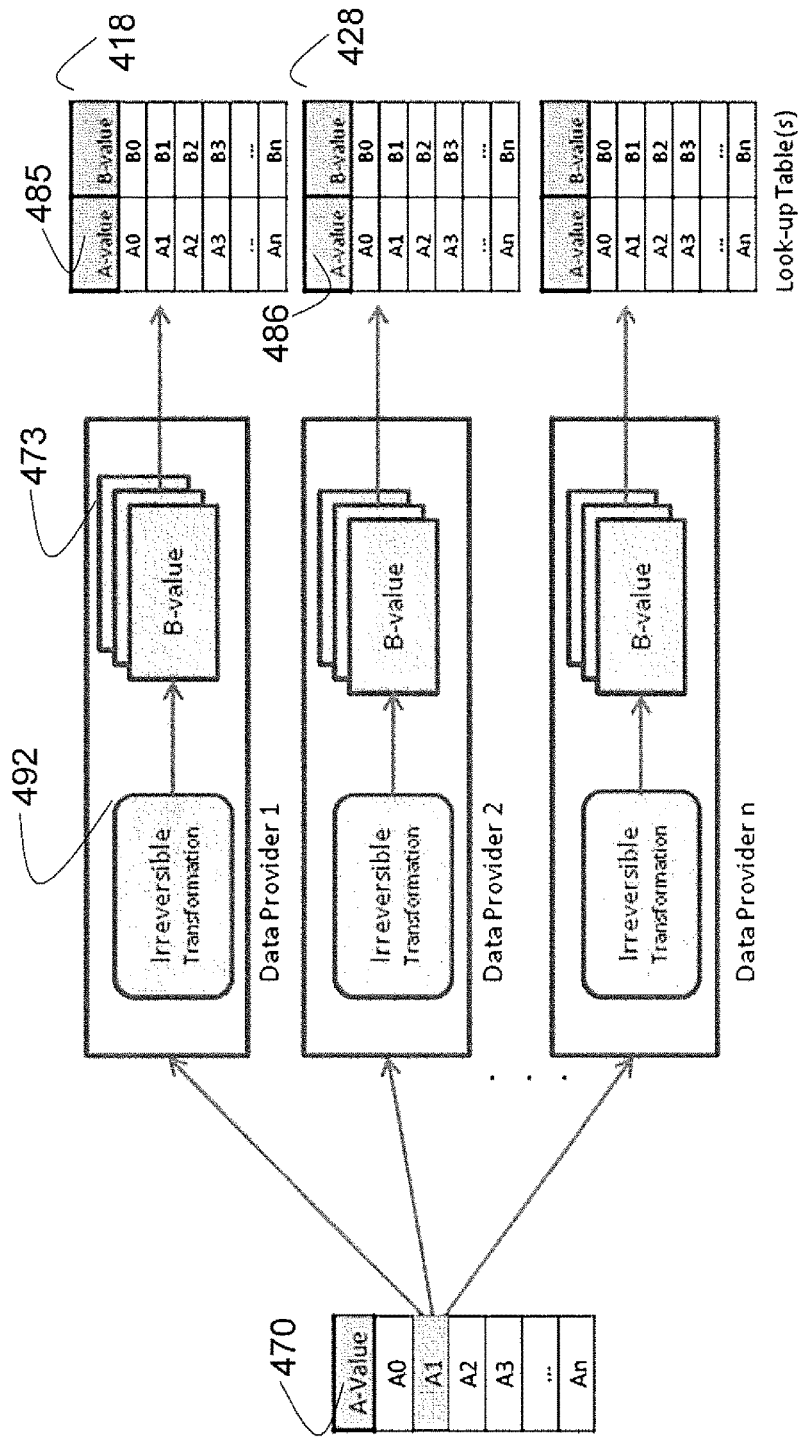
FIG. 4B is a detailed schematic illustrating the process through which an A-to-B look-up table is created for use in the type of embodiment illustrated in FIG. 4A.

This embodiment type is now explained in greater detail, with reference to FIGS. 4A and 4B.

Providing Step

In the Providing Step, each Data Provider (410, 420) is provided a look-up table (418,428) that enables it to obtain the Surrogate Investor Code (419,429) corresponding to each allowable A-value (415,425) associated with the Customer-Specific Data (412,422) which such Data Provider is to submit to the Receiving Entity (400).

It is required in this embodiment type that each Surrogate Investor Code be a B-value (419,429). As a result, the look-up tables (418,428) provided to the Data Providers must all be configured in the same way such that, with respect to any given A-value (415,425), each Data Provider obtains the same Surrogate Investor Code (B-value).

As illustrated in FIG. 4B, each look-up table is created by entering all allowable A-values (470) into a first column (485,486) and then populating a second column with Surrogate Investor Codes by [a] performing a transformation (492) that converts each A-value (470) into the corresponding B-value (473), and then [b] entering such B-value into the corresponding row of the second column of the table, the result being an "A-to-B look-up table" (418,428).

As indicated in FIG. 4B, the transformation of A-values (470) to derive corresponding B-values (473) (the "A-to-B transformation") for any look-up table is required to be irreversible (492) in this embodiment type. The reason for this is to prevent the Receiving Entity from being able to use any B-value in an Input Data File (417,427) it receives (in the Linking Step) to derive the corresponding A-value (415,425) by reversing the A-to-B transformation (492) performed to create such B-value (by the entity that creates the look-up tables in the Providing Step) and thereby determine the identity of an Investor.

Configuration Options: There are several options available for configuring the Providing Step in this embodiment type, including those discussed below:

In selecting the portion of Customer-Identifying Information to serve as the A-values, there normally are several possibilities. The preferred choices are discussed in Subsection 1 ("Defining A-values") in the section of this document titled "Discretionary Elements Common to the Embodiments."

It is preferred that before the A-to-B transformation (492) is performed to create a look-up table (418, 428) for a Data Provider, all allowable A-values be standardized/normalized. This topic is discussed more fully in Subsection 2 ("Standardization/Normalization of A-values") in the section of this document titled "Discretionary Elements Common to the Embodiments."

An irreversible transformation (492) of A-values (470) to derive corresponding B-values (473) is a required part of this embodiment type. Some of the methods for performing transformations of this kind are described in Subsection 3 ("Choice of Methods for Irreversible Transformations") in the section of this document titled "Discretionary Elements Common to the Embodiments."

In addition to minimizing the risk that anyone in the Receiving Entity having access to data from Input Data Files could successfully reverse any A-to-B transformation (such risk reduction being achieved by making each such transformation irreversible), it is also desirable to minimize the risk that anyone in the Receiving Entity could successfully use a dictionary-style attack on the B-values (as discussed in Subsection 3 ("Choice of Methods for Irreversible Transformations") in the section of this document titled "Discretionary Elements Common to the Embodiments") and thereby determine the A-value associated with any B-value in an Input Data File. One way to sharply reduce this risk with Embodiment Type II is to configure any embodiment thereof in such a manner that:

(i) The A-to-B transformation (492) used in the creation of the Data Providers' look-up tables (418, 428) is configured to incorporate a Seed (as discussed in Subsection 3 ("Choice of Methods for Irreversible Transformations") in the section of this document titled "Discretionary Elements Common to the Embodiments); and (ii) A Trusted Third Party is engaged to [a] create such Seed (without disclosing it to the Receiving Entity or any Data Provider or other party), [b] perform the A-to-B transformation (492), using the Seed, as part of the process of creating an A-to-B look-up table for each Data Provider, and [c] provide each look-up table (418,428) in a secure manner directly to the pertinent Data Provider.

In this configuration, the Trusted Third Party may create the software module that performs the A-to-B transformation (492) or, instead, obtain such software from the Receiving Entity or from another party, depending upon operational convenience.

The rationale for engaging a Trusted Third Party to perform one or more of the functions of the Providing Step with respect to a particular embodiment of the invention is discussed in Subsection 8 ("Role of a Trusted Third Party") in the section of this document titled "Discretionary Elements Common to the Embodiments."

In order to protect the contents of any A-to-B look-up table (418,428) during transit to the intended Data Provider (410,420), it is preferred that the entity preparing such look-up table encrypt it, using a full-file encryption process, before providing it to such Data Provider. This topic is discussed more fully in Subsection 7 ("File Encryption") in the section of this document titled "Discretionary Elements Common to the Embodiments."

Gathering Step

In the Gathering Step, each Data Provider initially assembles its Customer-Specific Data (412,422) to be submitted to the Receiving Entity for purposes of creating the Database, along with the A-value portion (415,425) of the associated Customer-Identifying Information (414,424). The Data Provider then creates an Input Data File (417,427) comprising discrete Input Data Records, each of which contains Customer-Specific Data pertaining to a particular Investor and the associated B-value (419,429) which such Data Provider [a] obtained by searching the look-up table (418,428) provided to it in the Providing Step, using the A-value associated with such Customer-Specific Data, and then [b] substituted (416,426) for such A-value.

As part of the process just described, the Data Provider removes/excludes all A-values and other Customer-Identifying Information from each Input Data Record, as a result of which the Input Data File is fully blinded. Upon having completed preparation of an Input Data File (417,427) in this manner, the Data Provider submits the file to the Receiving Entity (400) for use in creating the Database.

Configuration Options: There are several options available for configuring the Gathering Step in this embodiment type, including those discussed below:

It is preferred that each Data Provider, before performing the Gathering Step, standardize/normalize all A-values in its Customer-Identifying Information. This topic is discussed more fully in Subsection 2 ("Standardization/Normalization of A-values") in the section of this document titled "Discretionary Elements Common to the Embodiments."

In the event that a full-file encryption process is used in the Providing Step to encrypt a look-up table (418,428), that look-up table must be decrypted prior to being used in the Gathering Step. This topic is discussed more fully in Subsection 7 ("File Encryption") in the section of this document titled "Discretionary Elements Common to the Embodiments."

In FIG. 4a, only one element of Customer-Specific Data (412,422) is shown, namely the asset balance in each customer's accounts. However, there are usually numerous choices available as to which elements of customer-related data could be treated as Customer-Specific Data and therefore be provided to the Receiving Entity. This topic is discussed more fully in Subsection 6 ("Choice of Customer-Specific Data") in the section of this document titled "Discretionary Elements Common to the Embodiments."

In order to protect from improper disclosure the contents of Input Data Files (417,427) during transit to the Receiving Entity (400), it is preferred that each Data Provider (410, 420) encrypt its Input Data Files, using a full-file encryption process, before submitting them to the Receiving Entity for use in creating the Database. This topic is discussed more fully in Subsection 7 ("File Encryption") in the section of this document titled "Discretionary Elements Common to the Embodiments."

Linking Step

In the Linking Step, the Receiving Entity (400) loads to a Database (460) Customer-Specific Data from each Input Data File (417,427) it receives and uses the Surrogate Investor Codes (419,429) associated with such data (i.e., the B-values) to link the data with Customer-Specific Data from other Data Providers (and/or time periods).

Configuration Options: There are several options available for configuring the Linking Step in this embodiment type, including those discussed below:

If any Data Provider uses a full-file encryption process in the Gathering Step to encrypt an Input Data File (417,427), that file must be decrypted before it is used in the Linking Step. This topic is discussed more fully in Subsection 7 ("File Encryption") in the section of this document titled "Discretionary Elements Common to the Embodiments."

Given that in this embodiment type all Surrogate Investor Codes in the Input Data Files are B-values, the Receiving Entity may link the associated Customer-Specific Data by using the Surrogate Investor Codes either directly (483) or indirectly (481,482). It is preferred, however, that the Receiving Entity use the B-values indirectly for linking data. One way to accomplish this is to [a] perform a transformation (462, 472) that converts each B-value into the corresponding D-value, and then [b] link the associated Customer-Specific Data by matching on D-values. This topic is discussed more fully in Subsection 5 ("Use of B-values and D-values for Linking Data") in the section of this document titled "Discretionary Elements Common to the Embodiments."

Embodiment Type III

Embodiment Type III is distinguished from other types of embodiment by the following combination of elements:

(i) In the Providing Step of the invention, the provision to each Data Provider of software that transforms all allowable A-values into corresponding Surrogate Investor Codes that, with respect to any particular A-value, are different for each Data Provider and thus are C-values—such software constituting the computer-based means to obtain such corresponding Surrogate Investor Codes;

(ii) In the Gathering Step of the invention, the substitution of C-values for A-values, using the software provided in the Providing Step; and (iii) In the Linking Step of the invention, the indirect use of the Surrogate Investor Codes (i.e., C-values) for linking data contained in the Input Data Files—accomplished by performing a software-based transformation that converts each C-value back into the corresponding B-value, then substituting such B-value for the C-value, and then using the B-values for linking data contained in the Input Data Files.

Figure 5:
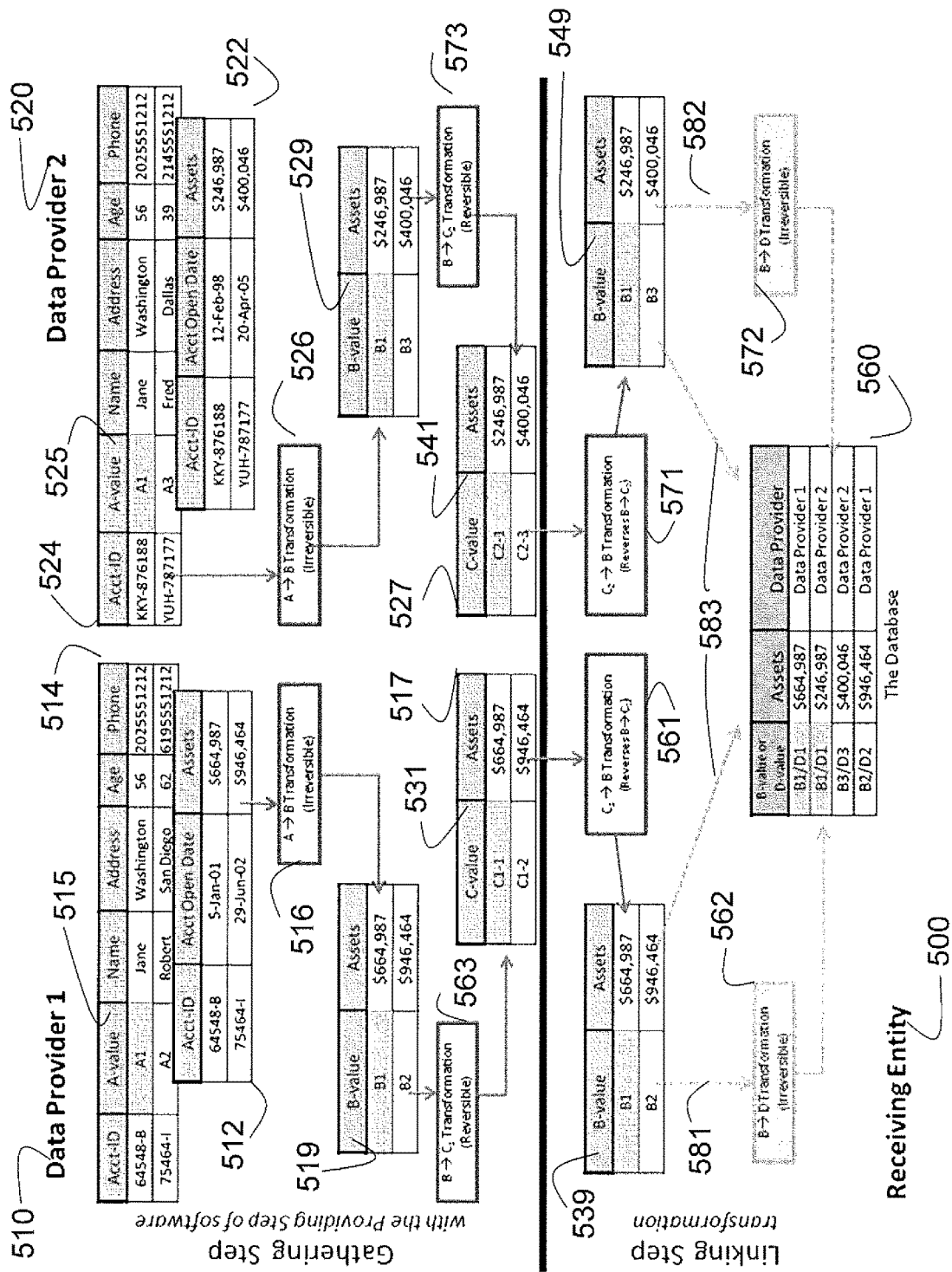
FIG. 5 is a detailed schematic illustrating a type of embodiment of the invention in which the Surrogate Investor Codes are C-values (as in FIG. 2C), obtained by performing a software-based transformation of each A-value to derive the corresponding B-value and then performing a second software-based transformation that converts the resulting B-value into the corresponding C-value, and in which the Surrogate Investor Codes (C-values) are used indirectly (as in FIG. 2C) in linking data by performing a software-based transformation of each C-value in order to reverse the B-to-C transformation (which the pertinent Data Provider earlier performed to create such C-value) and then using the resulting B-values in the linking process that creates the Database.

This embodiment type is now explained in greater detail, with reference to FIG. 5.

Providing Step

In the Providing Step, each Data Provider (510, 520) is provided a software module programmed to perform, in series, two transformations (516/563,526/573) that, together, convert into the corresponding Surrogate Investor Code (531,541) any allowable A-value (515,525) associated with the Customer-Specific Data (512,522) which such Data Provider is to submit to the Receiving Entity (500).

It is required in this embodiment type that each Surrogate Investor Code be a C-value (531,541). As a result, the software modules provided to the Data Providers must all be configured differently and in such a manner that, with respect to any given A-value (515, 525), each Data Provider obtains a different Surrogate Investor Code (C-value) (531, 541). The reason for using C-values as the Surrogate Investor Codes is to prevent any Data Provider that gains access to the Input Data File of another Data Provider (whether by mistake or for any other reason) from being able to use the Surrogate Investor Codes in the Input Data Records of such file to link the associated Customer-Specific Data to the data in its own Input Data Records and, in that manner, identify the customers common to both parties.

The first of the two transformations in this embodiment type is required to be an irreversible transformation (516, 526) that generates a transitional Surrogate Investor Code by converting any allowable A-value (515,525) into the corresponding B-value (519,529), where such transformation (the "A-to-B transformation") is configured in the same way for each Data Provider so that, with respect to any given A-value (515,525), it yields the same B-value (519,529).

The second of the two transformations in this embodiment type is required to be a reversible transformation (563,573) that generates the final Surrogate Investor Codes by converting each B-value (519,529) that results from the first transformation into the corresponding C-value (531,541) (the "B-to-C transformation"), where such B-to-C transformation is configured differently for each Data Provider and in such a manner that, with respect to any given B-value (and, hence, the A-value from which it was derived), it yields a different C-value (531,541) for each Data Provider.

The reason the second transformation (i.e., the B-to-C transformation) is required to be reversible is to enable the Receiving Entity (in the Linking Step) to convert the differing sets of C-values (531,541) in the Input Data Files of the various Data Providers into the single common set of B-values (539,549) by reversing (561,571) the B-to-C transformations (563,573) that the Data Providers perform (in the Gathering Step).

The reason the first transformation (i.e., the A-to-B transformation) is required to be irreversible is to prevent the Receiving Entity from being able to use any B-value (539, 549) it obtains (in accordance with the previous paragraph) to derive the corresponding A-value (515,525) by reversing the A-to-B transformation (516,526) performed to create such B-value (by a Data Provider in the Gathering Step) and thereby determine the identity of an Investor.

Configuration Options: There are several options available for configuring the Providing Step of this embodiment type, including those discussed below:

In selecting the portion of Customer-Identifying Information to serve as the A-values, there normally are several possibilities. The preferred choices are discussed in Subsection 1 ("Defining A-values") in the section of this document titled "Discretionary Elements Common to the Embodiments."

An irreversible transformation (516,526) of the A-values (515,525) to derive corresponding B-values (519,529) is a required part of this embodiment type. Some of the methods for performing transformations of this kind are described in Subsection 3 ("Choice of Methods for Irreversible Transformations") in the section of this document titled "Discretionary Elements Common to the Embodiments."

A reversible transformation (563,573) of B-values (519, 529) to derive corresponding C-values (531,541) is a required part of this embodiment type. Some of the methods for performing transformations of this kind are described in Subsection 4 ("Choice of Methods for Reversible Transformations") in the section of this document titled "Discretionary Elements Common to the Embodiments."

In addition to minimizing the risk that anyone in the Receiving Entity having access to data from Input Data Files could successfully reverse any A-to-B trans-formation (such risk reduction being achieved by making each such transformation irreversible), it is also desirable to minimize the risk that anyone in the Receiving Entity could successfully use a dictionary-style attack on the B-values (as discussed in Subsection 3 ("Choice of Methods for Irreversible Transformations") in the section of this document titled "Discretionary Elements Common to the Embodiments") and thereby determine the A-value associated with any B-value in an Input Data File. One way to sharply reduce this risk with Embodiment Type III is to configure any embodiment thereof in such a manner that:

(i) The software modules provided to the Data Providers for performing the A-to-B transformations (516,526) are configured in such a manner that a Seed is used with each such transformation (the use of Seeds being discussed more fully in Subsection 3 ("Choice of Methods for Irreversible Transformations") in the section of this document titled "Discretionary Elements Common to the Embodiments");

(ii) All such software modules are configured in such a manner as to incorporate a common transformation algorithm in conjunction with a common Seed for every Data Provider, such that any given Data Provider performs the A-to-B transformation using the same transformation algorithm and the same Seed as every other Data Provider; and (iii) A Trusted Third Party is engaged to create such Seed and provide it in a secure manner directly to each Data Provider (without disclosing the Seed to the Receiving Entity or to any other party).

In this configuration, one or more of the functions of [a] creating or otherwise obtaining the portion of software that performs the A-to-B transformations (516,526), [b] creating or otherwise obtaining the portion of software that performs the B-to-C transformations (563,573), and [c] providing any of such software to the Data Providers, may be performed by either the Trusted Third Party or the Receiving Entity, depending upon operational convenience. If the Trusted Third Party provides to any Data Provider any element of the method for performing the B-to-C transformation, then, depending upon the configuration of such method, it may be required that the Trusted Third Party provide some element (s) of such method to the Receiving Entity to enable it to reverse such transformation (in the Linking Step).

The rationale for engaging a Trusted Third Party to perform one or more of the functions of the Providing Step with respect to a particular embodiment of the invention is discussed in Subsection 8 ("Role of a Trusted Third Party") in the section of this document titled "Discretionary Elements Common to the Embodiments."

Gathering Step

In the Gathering Step, each Data Provider initially assembles its Customer-Specific Data (512,522) to be submitted to the Receiving Entity for purposes of creating the Database, along with the A-value portion (515,525) of the associated Customer-Identifying Information (514,524). The Data Provider then creates an Input Data File (517,527) comprising discrete Input Data Records, each of which contains Customer-Specific Data pertaining to a particular Investor and the associated C-value (531,541) which such Data Provider [a] obtained by applying the software module provided to it in the Providing Step to the A-value associated with such Customer-Specific Data, and then [b] substituted (516/563, 526/573) for such A-value.

As part of the process just described, the Data Provider removes/excludes all A-values and other Customer-Identifying Information from each Input Data Record, as a result of which the Input Data File is fully blinded. Upon having completed preparation of an Input Data File (517,527) in this manner, the Data Provider submits the file to the Receiving Entity (500) for use in creating the Database.

Configuration Options: There are several options available for configuring the Gathering Step in this embodiment type, including those discussed below:

It is preferred that each Data Provider, before performing the Gathering Step, standardize/normalize all A-values in its Customer-Identifying Information. This topic is discussed more fully in Subsection 2 ("Standardization/Normalization of A-values") in the section of this document titled "Discretionary Elements Common to the Embodiments."

In FIG. 5, only one element of Customer-Specific Data (512,522) is shown, namely the asset balance in each customer's accounts. However, there are usually numerous choices available as to which elements of customer-related data could be treated as Customer-Specific Data and therefore be provided to the Receiving Entity. This topic is discussed more fully in Subsection 6 ("Choice of Customer-Specific Data") in the section of this document titled "Discretionary Elements Common to the Embodiments."

In order to protect from improper disclosure the contents of Input Data Files (517,527) during transit to the Receiving Entity (500), it is preferred that each Data Provider (510, 520) encrypt its Input Data Files, using a full-file encryption process, before submitting them to the Receiving Entity for use in creating the Database. This topic is discussed more fully in Subsection 7 ("File Encryption") in the section of this document titled "Discretionary Elements Common to the Embodiments."

Linking Step

In the Linking Step, the Receiving Entity (500) loads to a Database (560) Customer-Specific Data from each Input Data File (517,527) it receives and uses indirectly the Surrogate Investor Codes (531,541) associated with such data (i.e., the C-values) to link the data with Customer-Specific Data from other Data Providers (and/or time periods). It accomplishes this by [a] obtaining the B-value (539,549) that corresponds to each C-value (531,541) in the Input Data File by reversing the B-to-C transformation (563,573) performed in the Gathering Step to create such C-value, [b] substituting (561,571) such B-value for the C-value, and then [c] using the B-values so obtained in the linking process.

The effect of reversing the B-to-C transformations (as described in the preceding paragraph) is that the differing C-values (531,541) obtained and substituted by the various Data Providers (in the Gathering Step) with respect to any particular A-value (515,525) are all converted into the same B-value (539,549), thereby making it possible for the Receiving Entity to link Customer-Specific Data provided by more than one Data Provider that were originally associated with the same A-value.

Configuration Options: There are several options available for configuring the Linking Step in this embodiment type, including those discussed below:

If any Data Provider uses a full-file encryption process in the Gathering Step to encrypt an Input Data File (517,527), that file must be decrypted before it is used in the Linking Step. This topic is discussed more fully in Subsection 7 ("File Encryption") in the section of this document titled "Discretionary Elements Common to the Embodiments."

Given that in this embodiment type the differing sets of C-values (531,541) in the Input Data Files (517, 527) of the various Data Providers (510,520) all originate from a single, common set of B-values (519,529), once the Receiving Entity has converted (561,571) such C-values back into the corresponding B-values (539,549), the Receiving Entity is then able to link the associated Customer-Specific Data and may do so using such B-values either directly (583) or indirectly (581,582). It is preferred, however, that the Receiving Entity use the B-values indirectly for linking data. One way to accomplish this is to [a] perform a transformation (562, 572) that converts each B-value into the corresponding D-value, and then [b] link the associated Customer-Specific Data by matching on D-values. This topic is discussed more fully in Subsection 5 ("Use of B-values and D-values for Linking Data") in the section of this document titled "Discretionary Elements Common to the Embodiments."

Embodiment Type IV

Embodiment Type IV is distinguished from other types of embodiment by the following combination of elements:

(i) In the Providing Step of the invention, the provision to each Data Provider of a computer-readable look-up table that contains all allowable A-values and their corresponding Surrogate Investor Codes that, with respect to any particular A-value, are different for each Data Provider and thus are C-values—such look-up table constituting the computer-based means to obtain such corresponding Surrogate Investor Codes;

(ii) In the Gathering Step of the invention, the substitution of C-values for A-values, by using the look-up table provided in the Providing Step; and (iii) In the Linking Step of the invention, the indirect use of the Surrogate Investor Codes (i.e., C-values) for linking data contained in the Input Data Files—accomplished by performing a software-based transformation that converts each C-value back into the corresponding B-value, then substituting such B-value for the C-value, and then using the B-values for linking data contained in the Input Data Files.

Figure 6A:
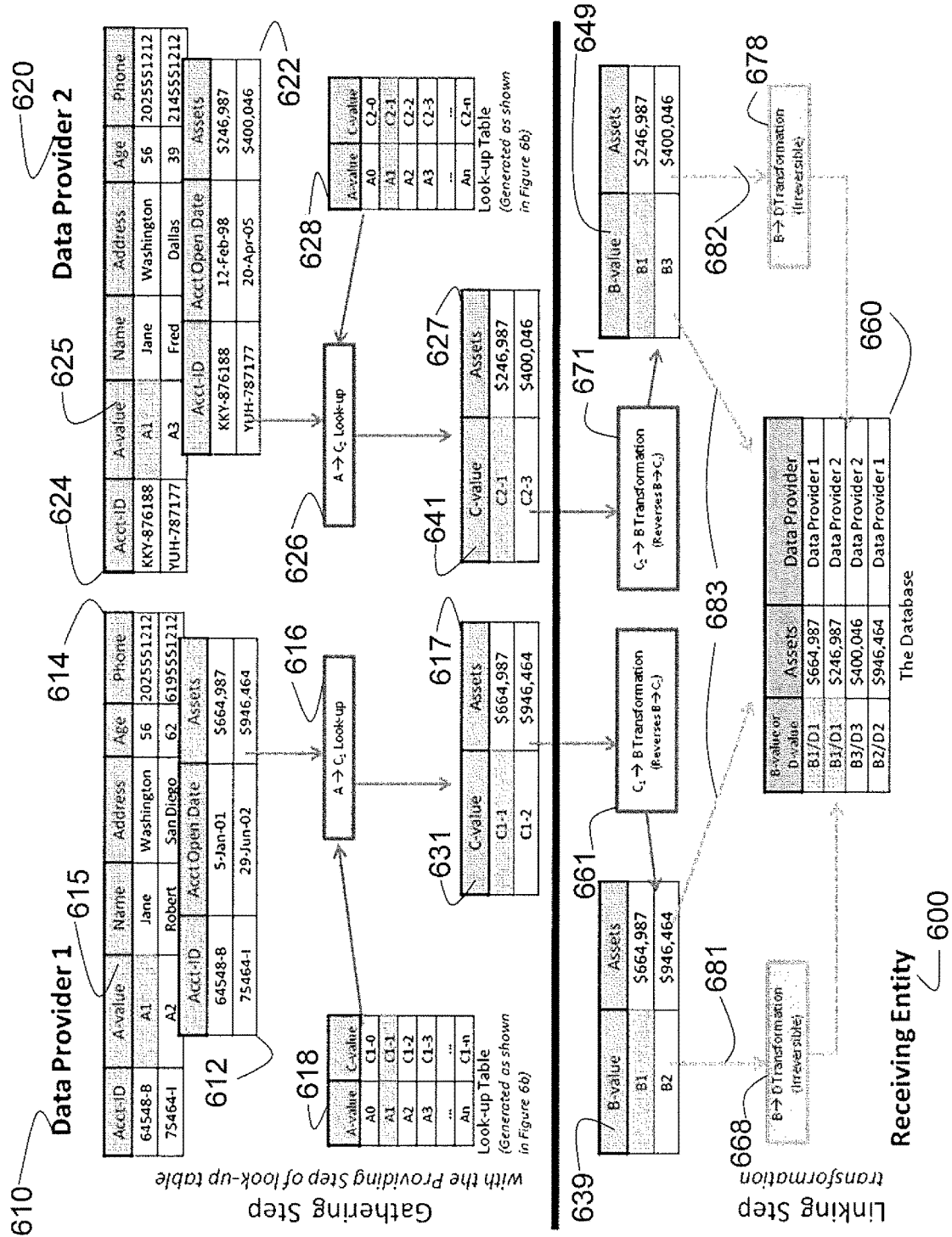
FIG. 6A is a detailed schematic illustrating a type of embodiment of the invention in which the Surrogate Investor Codes are C-values (as in FIG. 2C), obtained by searching an A-to-C look-up table to find the C-value corresponding to each A-value, and in which the Surrogate Investor Codes (C-values) are used indirectly (as in FIG. 2C) in linking data by performing a software-based transformation that converts each C-value into the corresponding B-value and then using the resulting B-values in the linking process that creates the Database.
Figure 6B:
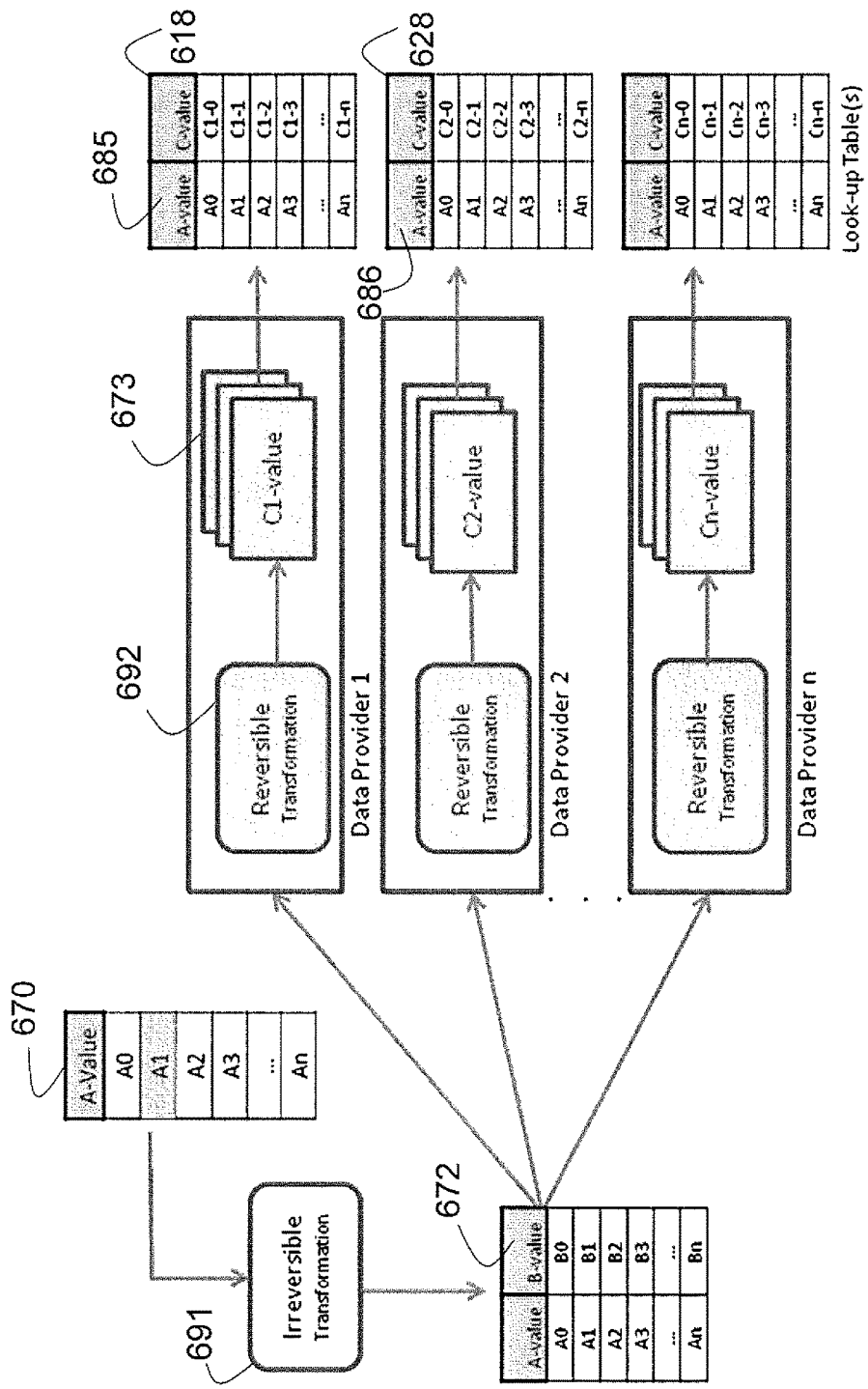
FIG. 6B is a detailed schematic illustrating the process through which A-to-C look-up tables are created for use in the type of embodiment illustrated in FIG. 6A.

This embodiment type is now explained in greater detail, with reference to FIGS. 6A and 6B.

Providing Step

In the Providing Step, each Data Provider (610, 620) is provided a look-up table (618,628) that enables it to obtain the Surrogate Investor Code (631,641) corresponding to each allowable A-value (615,625) associated with the Customer-Specific Data (612,622) which such Data Provider is to submit to the Receiving Entity (600).

It is required in this embodiment type that each Surrogate Investor Code be a C-value (631,641). As a result, the look-up tables (618,628) provided to the Data Providers must all be configured differently and in such a manner that, with respect to any given A-value (615,625), each Data Provider obtains a different Surrogate Investor Code (C-value) (631,641). The reason for using C-values as the Surrogate Investor Codes is to prevent any Data Provider that gains access to the Input Data File of another Data Provider (whether by mistake or for any other reason) from being able to use the Surrogate Investor Codes in the Input Data Records of such file to link the associated Customer-Specific Data to the data in its own Input Data Records and, in that manner, identify the customers common to both parties.

As illustrated in FIG. 6B, each look-up table is created by entering all allowable A-values (670) into a first column (685,686) and then populating a second column with Surrogate Investor Codes by [a] performing, in series, two transformations (691,692) that, together, convert each A-value (670) into the corresponding C-value (673), and then [b] entering such C-value into the corresponding row of the second table column, the result being an "A-to-C look-up table" (618,628).

As shown in FIG. 6B, the first transformation for creating a look-up table in this embodiment type is required to be an irreversible transformation (691) that generates a transitional Surrogate Investor Code (672) by converting any allowable A-value (670) into the corresponding B-value (672), where such transformation (the "A-to-B transformation") is configured in the same way for each Data Provider so that, with respect to any given A-value (670), it yields the same B-value (672).

The second of the two transformations in this embodiment type is required to be a reversible transformation (692) that generates the final Surrogate Inves-for Codes (673) for the look-up table by converting each B-value (672) that results from the first transformation into the corresponding C-value (673) (the "B-to-C transformation"), where such B-to-C transformation is configured differently for each Data Provider and in such a manner that, with respect to any given B-value (and, hence, the A-value from which it was derived), it yields a different C-value (673) for each Data Provider.

The reason the second transformation (i.e., the B-to-C transformation) is required to be reversible is to enable the Receiving Entity (in the Linking Step) to convert the differing sets of C-values (631,641) in the Input Data Files of the various Data Providers into the single common set of B-values (672) by reversing (661, 671) the B-to-C transformations (692) that the entity that creates the look-up tables performs (in the Providing Step).

The reason the first transformation (i.e., the A-to-B transformation) is required to be irreversible is to prevent the Receiving Entity from being able to use any B-value (672) it obtains (in accordance with the previous paragraph) to derive the corresponding A-value (670) by reversing the A-to-B transformation (691) performed to create such B-value (by the entity that creates the look-up tables in the Providing Step) and thereby determine the identity of an Investor.

Configuration Options: There are several options available for configuring the Providing Step of this embodiment type, including those discussed below:

In selecting the portion of Customer-Identifying Information to serve as the A-values, there normally are several possibilities. The preferred choices are discussed in Subsection 1 ("Defining A-values") in the section of this document titled "Discretionary Elements Common to the Embodiments."

It is preferred that before the two-step transformation (691,692) is performed to create a look-up table (618,628) for a Data Provider (i.e., the transformation of A-values (670) to derive corresponding C-values (673)), all allowable A-values be standardized/normalized. This topic is discussed more fully in Subsection 2 ("Standardization/Normalization of A-values") in the section of this document titled "Discretionary Elements Common to the Embodiments."

An irreversible transformation (691) of A-values (670) to derive corresponding B-values (672) is a required part of this embodiment type. Some of the methods for performing transformations of this kind are described in Subsection 3 ("Choice of Methods for Irreversible Transformations") in the section of this document titled "Discretionary Elements Common to the Embodiments."

A reversible transformation (692) of B-values (672) to derive corresponding C-values (673) is a required part of this embodiment type. Some of the methods for performing transformations of this kind are described in Subsection 4 ("Choice of Methods for Reversible Transformations") in the section of this document titled "Discretionary Elements Common to the Embodiments."

In addition to minimizing the risk that anyone in the Receiving Entity having access to data from Input Data Files could successfully reverse any A-to-B transformation (such risk reduction being achieved by making each such transformation irreversible), it is also desirable to minimize the risk that anyone in the Receiving Entity could successfully use a dictionary-style attack on the B-values (as discussed in Subsection 3 ("Choice of Methods for Irreversible Transformations") in the section of this document titled "Discretionary Elements Common to the Embodiments") and thereby determine the A-value associated with any B-value in an Input Data File. One way to sharply reduce this risk with Embodiment Type IV is to configure any embodiment thereof in such a manner that:

(i) The A-to-B transformation (691) used in the creation of the Data Providers' look-up tables (618, 628) is configured to incorporate a Seed (as discussed in Subsection 3 ("Choice of Methods for Irreversible Transformations") in the section of this document titled "Discretionary Elements Common to the Embodiments); and (ii) A Trusted Third Party is engaged to [a] create such Seed (without disclosing it to the Receiving Entity or any Data Provider or other party), [b] perform the A-to-B transformation (691), using the Seed, and the B-to-C transformations (692), as part of the process of creating the A-to-C look-up tables (618,628), and [c] provide each look-up table (618,628) in a secure manner directly to the pertinent Data Provider.

In this configuration, the Trusted Third Party may create the software module that performs the A-to-B and/or B-to-C transformations (691,692) or, instead, obtain such software from the Receiving Entity or from another party, depending upon operational convenience. If the Receiving Entity does not provide to the Trusted Third Party the entire means for performing the B-to-C transformations, then, depending upon the configuration of the method for performing such transformation, it may be required that the Trusted Third Party provide some element(s) of such method to the Receiving Entity to enable it to reverse such transformation (in the Linking Step).

The rationale for engaging a Trusted Third Party to perform one or more of the functions of the Providing Step with respect to a particular embodiment of the invention is discussed in Subsection 8 ("Role of a Trusted Third Party") in the section of this document titled "Discretionary Elements Common to the Embodiments."

In order to protect the contents of any A-to-C look-up table (618,628) during transit to the intended Data Provider (610,620), it is preferred that the entity preparing such look-up table encrypt it, using a full-file encryption process, before providing it to such Data Provider. This topic is discussed more fully in Subsection 7 ("File Encryption") in the section of this document titled "Discretionary Elements Common to the Embodiments."

Gathering Step

In the Gathering Step, each Data Provider initially assembles its Customer-Specific Data (612,622) to be submitted to the Receiving Entity for purposes of creating the Database, along with the A-value portion (615, 625) of the associated Customer-Identifying Information (614,624). The Data Provider then creates an Input Data File (617,627) comprising discrete Input Data Records, each of which contains Customer-Specific Data pertaining to a particular Investor and the associated C-value (631,641) which such Data Provider [a] obtained by searching the look-up table (618,628) provided to it in the Providing Step, using the A-value associated with such Customer-Specific Data, and then [b] substituted (616,626) for such A-value.

As part of the process just described, the Data Provider removes/excludes all A-values and other Customer-Identifying Information from each Input Data Record, as a result of which the Input Data File is fully blinded. Upon having completed preparation of an Input Data File (617,627) in this manner, the Data Provider submits the file to the Receiving Entity (600) for use in creating the Database.

Configuration Options: There are several options available for configuring the Gathering Step in this embodiment type, including those discussed below:

It is preferred that each Data Provider, before performing the Gathering Step, standardize/normalize all A-values in its Customer-Identifying Information. This topic is discussed more fully in Subsection 2 ("Standardization/Normalization of A-values") in the section of this document titled "Discretionary Elements Common to the Embodiments."

In the event that a full-file encryption process is used in the Providing Step to encrypt a look-up table (618,628), that look-up table must be decrypted prior to being used in the Gathering Step. This topic is discussed more fully in Subsection 7 ("File Encryption") in the section of this document titled "Discretionary Elements Common to the Embodiments."

In FIG. 6A, only one element of Customer-Specific Data (612,622) is shown, namely the asset balance in each customer's accounts. However, there are usually numerous choices available as to which elements of customer-related data could be treated as Customer-Specific Data and therefore be provided to the Receiving Entity. This topic is discussed more fully in Subsection 6 ("Choice of Customer-Specific Data") in the section of this document titled "Discretionary Elements Common to the Embodiments."

In order to protect from improper disclosure the contents of Input Data Files (617,627) during transit to the Receiving Entity (600), it is preferred that each Data Provider (610, 620) encrypt its Input Data Files, using a full-file encryption process, before submitting them to the Receiving Entity for use in creating the Database. This topic is discussed more fully in Subsection 7 ("File Encryption") in the section of this document titled "Discretionary Elements Common to the Embodiments."

Linking Step

In the Linking Step, the Receiving Entity (600) loads to a Database (660) Customer-Specific Data from each Input Data File (617,627) it receives and uses indirectly the Surrogate Investor Codes (631,641) associated with such data (i.e., the C-values) to link the data with Customer-Specific Data from other Data Providers (and/or time periods). It accomplishes this by [a] obtaining the B-value (672) that corresponds to each C-value (631,641) in the Input Data File by reversing the B-to-C transformation (692) performed in the Providing Step to create such C-value, [b] substituting (661,671) such B-value for the C-value, and then [c] using the B-values so obtained in the linking process.

The effect of reversing the B-to-C transformations (as described in the preceding paragraph) is that the differing C-values (631, 641) obtained and substituted by the various Data Providers (in the Gathering Step) with respect to any particular A-value (615,625) are all converted into the same B-value (639,649), thereby making it possible for the Receiving Entity to link Customer-Specific Data provided by more than one Data Provider that were originally associated with the same A-value.

Configuration Options: There are several options available for configuring the Linking Step in this embodiment type, including those discussed below:

If any Data Provider uses a full-file encryption process in the Gathering Step to encrypt an Input Data File (617,627), that file must be decrypted before it is used in the Linking Step. This topic is discussed more fully in Subsection 7 ("File Encryption") in the section of this document titled "Discretionary Elements Common to the Embodiments."

Given that in this embodiment type the differing sets of C-values (631,641) in the Input Data Files (617, 627) of the various Data Providers (610,620) all originate from a single, common set of B-values (672), once the Receiving Entity has converted (661,671) such C-values back into the corresponding B-values (639,649), the Receiving Entity is then able to link the associated Customer-Specific Data and may do so using such B-values either directly (683) or indirectly (681,682). It is preferred, however, that the Receiving Entity use the B-values indirectly for linking data. One way to accomplish this is to [a] perform a transformation (668, 678) that converts each B-value into the corresponding D-value, and then [b] link the associated Customer-Specific Data by matching on D-values. This topic is discussed more fully in Subsection 5 ("Use of B-values and D-values for Linking Data") in the section of this document titled "Discretionary Elements Common to the Embodiments."

Embodiment Type V

Embodiment Type V is distinguished from other types of embodiment by the following combination of elements:

(i) In the Providing Step of the invention, the provision to each Data Provider of a computer-readable look-up table that contains all allowable A-values and their corresponding Surrogate Investor Codes that, with respect to any particular A-value, are different for each Data Provider and thus are C-values—such look-up table constituting the computer-based means to obtain such corresponding Surrogate Investor Codes;

(ii) In the Gathering Step of the invention, the substitution of C-values for A-values, by using the look-up table provided in the Providing Step; and (iii) In the Linking Step of the invention, the indirect use of the Surrogate Investor Codes (i.e., C-values) for linking data contained in the Input Data Files—accomplished by obtaining, from a computer-readable cross-reference table created in the Providing Step and augmented in the Linking Step, the Proprietary Investor Code (i.e., D-value) that corresponds to each C-value in the Input Data Files, then substituting such D-value for the C-value, and then linking data by matching on D-values.

Figure 7A:
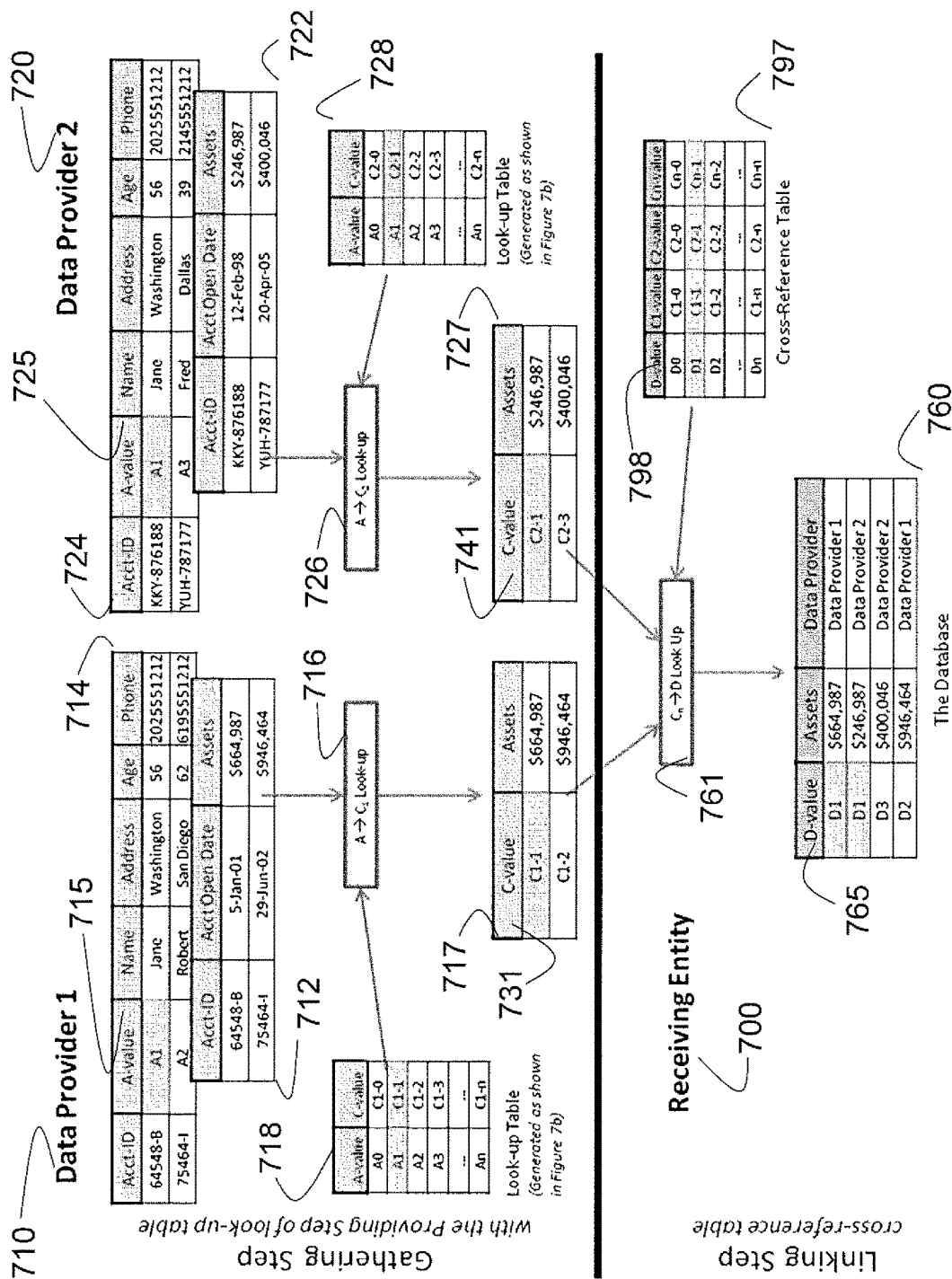
FIG. 7A is a detailed schematic illustrating a type of embodiment of the invention in which the Surrogate Investor Codes are C-values (as in FIG. 2C), obtained by searching an A-to-C look-up table to find the C-value corresponding to each A-value, and in which the Surrogate Investor Codes (C-values) are used indirectly (as in FIG. 2C) in linking data by searching a C's-to-D cross-reference table to find the D-value corresponding to each C-value and then linking data to create the Database by matching on the resulting D-values.
Figure 7B:
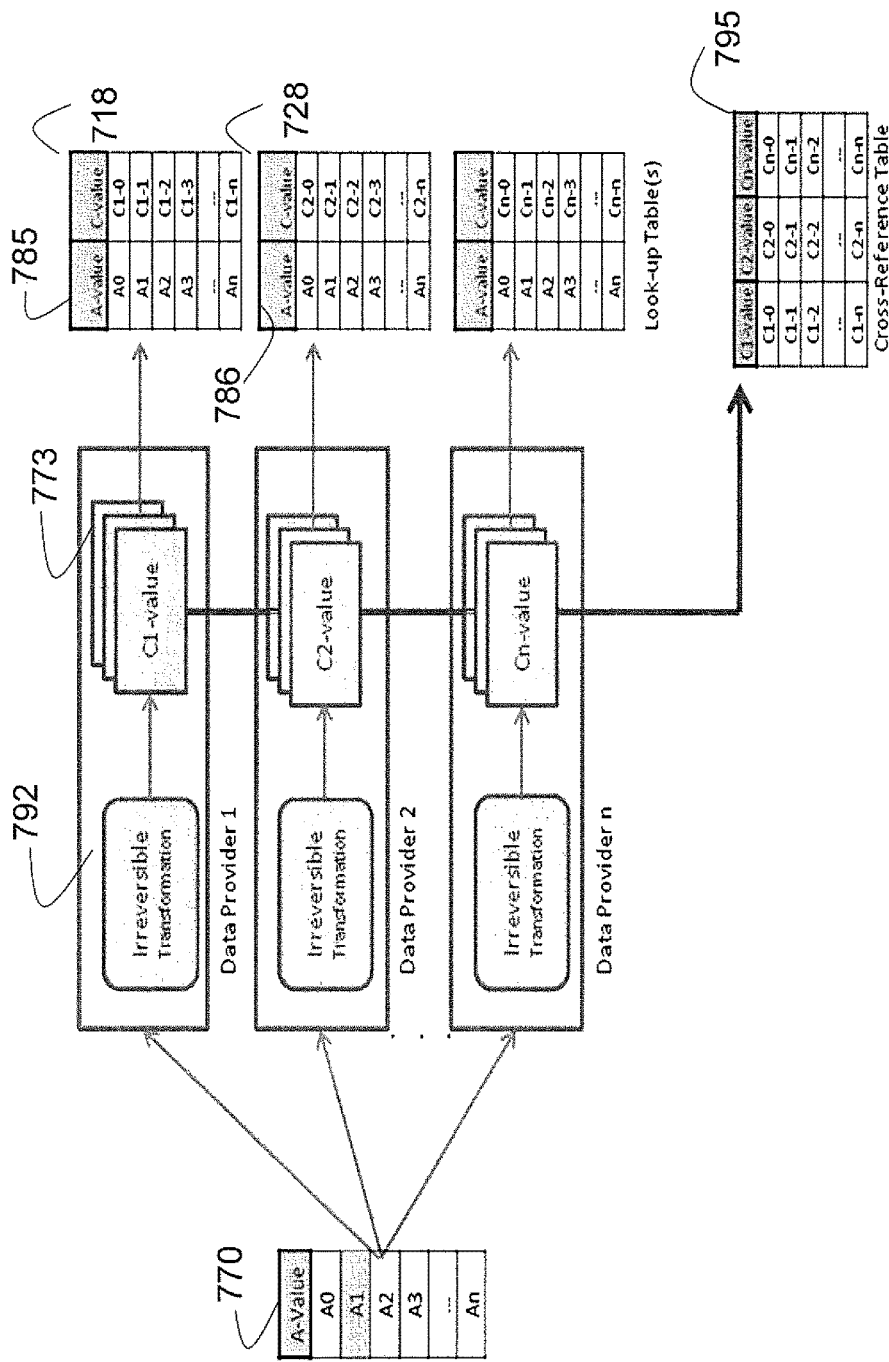
FIG. 7B is a detailed schematic illustrating the process through which A-to-C look-up tables and a cross-reference table containing all C-values are created for use in the type of embodiment illustrated in FIG. 7A.

This embodiment type is now explained in greater detail, with reference to FIGS. 7A and 7B.

Providing Step

In the Providing Step, each Data Provider (710, 720) is provided a look-up table (718,728) that enables it to obtain the Surrogate Investor Code (731,741) corresponding to each allowable A-value (715,725) associated with the Customer-Specific Data (712,722) which such Data Provider is to submit to the Receiving Entity (700).

It is required in this embodiment type that each Surrogate Investor Code be a C-value (731,741). As a result, the look-up tables (718,728) provided to the Data Providers must all be configured differently and in such a manner that, with respect to any given A-value (715,725), each Data Provider obtains a different Surrogate Investor Code (C-value) (731,741). The reason for using C-values as the Surrogate Investor Codes is to prevent any Data Provider that gains access to the Input Data File of another Data Provider (whether by mistake or for any other reason) from being able to use the Surrogate Investor Codes in the Input Data Records of such file to link the associated Customer-Specific Data to the data in its own Input Data Records and, in that manner, identify the customers common to both parties.

As illustrated in FIG. 7B, each look-up table is created by entering all allowable A-values (770) into a first column (785,786) and then populating a second column with Surrogate Investor Codes by [a] performing a transformation (792) that converts each A-value (770) into the corresponding C-value (773), and then [b] entering such C-value into the corresponding row of the second column of the table, the result being an "A-to-C look-up table" (718,728).

As indicated in FIG. 7B, the transformation of A-values (770) to derive corresponding C-values (773) (the "A-to-C transformation") for any look-up table is required to be irreversible (792) in this embodiment type. The reason for this is to prevent the Receiving Entity from being able to use any C-value in an Input Data File (717,727) it receives (in the Linking Step) to derive the corresponding A-value (715,725) by reversing the A-to-C transformation (792) performed to create such C-value (by the entity that creates the look-up tables in the Providing Step) and thereby determine the identity of an Investor.

As further shown in FIG. 7B, a cross-reference table (795) is also created in this embodiment type, for use by the Receiving Entity in the Linking Step. The table contains one row for each allowable A-value (770) and a column for each Data Provider. As each look-up table is generated for a Data Provider, the set of C-values (773) created for such look-up table is entered into the cross-reference table (795) in the appropriate column, with each C-value in the appropriate row, such that upon completion of such process [a] each column of the table (795) contains the entire set of C-values generated for a particular Data Provider's look-up table, and [b] each row contains all of the different C-values that were derived for the look-up tables from a particular A-value.

Configuration Options: There are several options available for configuring the Providing Step in this embodiment type, including those discussed below:

In selecting the portion of Customer-Identifying Information to serve as the A-values, there normally are several possibilities. The preferred choices are discussed in Subsection 1 ("Defining A-values") in the section of this document titled "Discretionary Elements Common to the Embodiments."

It is preferred that before the A-to-C transformation (792) is performed to create a look-up table (718, 728) for a Data Provider, all allowable A-values be standardized/normalized. This topic is discussed more fully in Subsection 2

("Standardization/Normalization of A-values") in the section of this document titled "Discretionary Elements Common to the Embodiments."

An irreversible transformation (792) of A-values (770) to derive corresponding C-values (773) is a required part of this embodiment type. Some of the methods for performing transformations of this kind are described in Subsection 3 ("Choice of Methods for Irreversible Transformations") in the section of this document titled "Discretionary Elements Common to the Embodiments."

In addition to minimizing the risk that anyone in the Receiving Entity having access to data from Input Data Files could successfully reverse any A-to-C transformation (such risk reduction being achieved by making each such transformation irreversible), it is also desirable to minimize the risk that anyone in the Receiving Entity could successfully use a dictionary-style attack on the C-values (as discussed in Subsection 3 ("Choice of Methods for Irreversible Transformations") in the section of this document titled "Discretionary Elements Common to the Embodiments") and thereby determine the A-value associated with any C-value in an Input Data File. One way to sharply reduce this risk with Embodiment Type V is to configure any embodiment thereof in such a manner that:

(i) The A-to-C transformation (792) used in the creation of the Data Providers' look-up tables (718, 728) is configured to incorporate a Seed (as discussed in Subsection 3 ("Choice of Methods for Irreversible Transformations") in the section of this document titled "Discretionary Elements Common to the Embodiments") such that the A-to-C look-up table created for any given Data Provider is created using the same transformation algorithm as is used for the look-up tables for all other Data Providers, but a different Seed than is used for any other such look-up table; and (ii) A Trusted Third Party is engaged to [a] create the Seeds (without disclosing them to the Receiving Entity or to any Data Provider or other party), [b] perform the A-to-C transformations (792), using the Seeds, as part of the process of creating the A-to-C look-up tables (718,728), [c] provide each such look-up table in a secure manner directly to the pertinent Data Provider for its use in creating Input Data Files (in the Gathering Step), and [d] generate the C.sub.1-to-C.sub.n cross-reference table (795), using the C-values from the look-up tables, and provide the cross-reference table to the Receiving Entity for use (in the Linking Step) in processing Input Data Files and creating the Database.

In this configuration, the Trusted Third Party may create the software module that performs the A-to-C transformations (792) or, instead, obtain such software from the Receiving Entity or from another party, depending upon operational convenience.

The rationale for engaging a Trusted Third Party to perform one or more of the functions of the Providing Step with respect to a particular embodiment of the invention is discussed in Subsection 8 ("Role of a Trusted Third Party") in the section of this document titled "Discretionary Elements Common to the Embodiments."

In order to protect the contents of any A-to-C look-up table (718,728) during transit to the intended Data Provider (710,720), and the contents of the C.sub.1-to-C.sub.n cross-reference table (795) during transit to the Receiving Entity (in the event that the cross-reference table is created by a Trusted Third Party), it is preferred that all such tables be encrypted, using a full-file encryption process, before being provided to the intended recipient. This topic is discussed more fully in Subsection 7 ("File Encryption") in the section of this document titled "Discretionary Elements Common to the Embodiments."

Gathering Step

In the Gathering Step, each Data Provider initially assembles its Customer-Specific Data (712,722) to be submitted to the Receiving Entity for purposes of creating the Database, along with the A-value portion (715,725) of the associated Customer-Identifying Information (714,724). The Data Provider then creates an Input Data File (717,727) comprising discrete Input Data Records, each of which contains Customer-Specific Data pertaining to a particular Investor and the associated C-value (731,741) which such Data Provider [a] obtained by searching the look-up table (718,728) provided to it in the Providing Step, using the A-value associated with such Customer-Specific Data, and then [b] substituted (716,726) for such A-value.

As part of the process just described, the Data Provider removes/excludes all A-values and other Customer-Identifying Information from each Input Data Record, as a result of which the Input Data File is fully blinded. Upon having completed preparation of an Input Data File (717,727) in this manner, the Data Provider submits the file to the Receiving Entity (700) for use in creating the Database.

Configuration Options: There are several options available for configuring the Gathering Step in this embodiment type, including those discussed below:

It is preferred that each Data Provider, before performing the Gathering Step, standardize/normalize all A-values in its Customer-Identifying Information. This topic is discussed more fully in Subsection 2 ("Standardization/Normalization of A-values") in the section of this document titled "Discretionary Elements Common to the Embodiments."

In the event that a full-file encryption process is used in the Providing Step to encrypt a look-up table (718,728), that look-up table must be decrypted prior to being used in the Gathering Step. This topic is discussed more fully in Subsection 7 ("File Encryption") in the section of this document titled "Discretionary Elements Common to the Embodiments."

In FIG. 7A, only one element of Customer-Specific Data (712,722) is shown, namely the asset balance in each customer's accounts. However, there are usually numerous choices available as to which elements of customer-related data could be treated as Customer-Specific Data and therefore be provided to the Receiving Entity. This topic is discussed more fully in Subsection 6 ("Choice of Customer-Specific Data") in the section of this document titled "Discretionary Elements Common to the Embodiments."

In order to protect from improper disclosure the contents of Input Data Files (717,727) during transit to the Receiving Entity (700), it is preferred that each Data Provider (710, 720) encrypt its Input Data Files, using a full-file encryption process, before submitting them to the Receiving Entity for use in creating the Database. This topic is discussed more fully in Subsection 7 ("File Encryption") in the section of this document titled "Discretionary Elements Common to the Embodiments."

Linking Step

In the Linking Step, the Receiving Entity (700) loads to a Database (760) Customer-Specific Data from each Input Data File (717,727) it receives and uses indirectly the Surrogate Investor Codes (731,741) associated with such data (i.e., the C-values) to link the data with Customer-Specific Data from other Data Providers (and/or time periods).

The foregoing is accomplished by first expanding the C.sub.1-to-C.sub.n cross-reference table (795) created in the Providing Step to create a new cross-reference table (797) by associating a distinct D-value (798) with each row of the table (doing so in such a manner that each row of the table is associated with one and only one D-value and each distinct D-value is associated with one and only one row of such table), and then, with respect to each Input Data File received from a Data Provider, [a] substituting for each C-value in such Input Data File the corresponding D-value (798) (obtained by searching the column of the table that pertains to such Data Provider to locate such C-value and selecting the D-value from the same row of the table), and then [b] linking the data by matching on D-values (765).

The effect of substituting (761) for each C-value (731, 741) in an Input Data File the corresponding D-value (798) (as described in the preceding paragraph) is that the differing C-values (731,741) obtained and substituted (716,726) by the various Data Providers (in the Gathering Step) with respect to any particular A-value (715,725) are all replaced by the same D-value (765), thereby making it possible for the Receiving Entity to link Customer-Specific Data provided by more than one Data Provider that were originally associated with the same A-value.

Configuration Options: There are several options available for configuring the Linking Step in this embodiment type, including those discussed below:

If any Data Provider uses a full-file encryption process in the Gathering Step to encrypt an Input Data File (717,727), or if the Trusted Third Party uses such an encryption process in the Providing Step to encrypt a cross-reference table (795), such file must be decrypted before it is used in the Linking Step. This topic is discussed more fully in Subsection 7 ("File Encryption") in the section of this document titled "Discretionary Elements Common to the Embodiments."

There are many ways to create the D-values that the Receiving Entity associates with the rows of the C.sub.1-to-C.sub.n cross-reference table (795). As an example, each row-number could be mathematically transformed to generate the associated D-value. Alternatively, each D-value could be randomly generated. In either case, any duplicates would be excluded from use. The only requirements of the generation process are that the resulting D-values must conform to the definition of D-values set forth in this document and that each D-value must have a persistent association over time with the A-value to which it is related.

Embodiment Type VI

Embodiment Type VI is distinguished from other types of embodiment by the following combination of elements:

(i) In the Providing Step of the invention, the provision to each Data Provider of software that transforms all allowable A-values into corresponding Surrogate Investor Codes that, with respect to any particular A-value, are different for each Data Provider and thus are C-values—such software constituting the computer-based means to obtain such corresponding Surrogate Investor Codes;

(ii) In the Gathering Step of the invention, the substitution of C-values for A-values, using the software provided in the Providing Step; and (iii) In the Linking Step of the invention, the indirect use of the Surrogate Investor Codes (i.e., C-values) for linking data contained in the Input Data Files—accomplished by obtaining, from a computer-readable cross-reference table created in the Providing Step and augmented in the Linking Step, the Proprietary Investor Code (i.e., D-value) that corresponds to each C-value in the Input Data Files, then substituting such D-value for the C-value, and then linking data by matching on D-values.

Figure 8A:
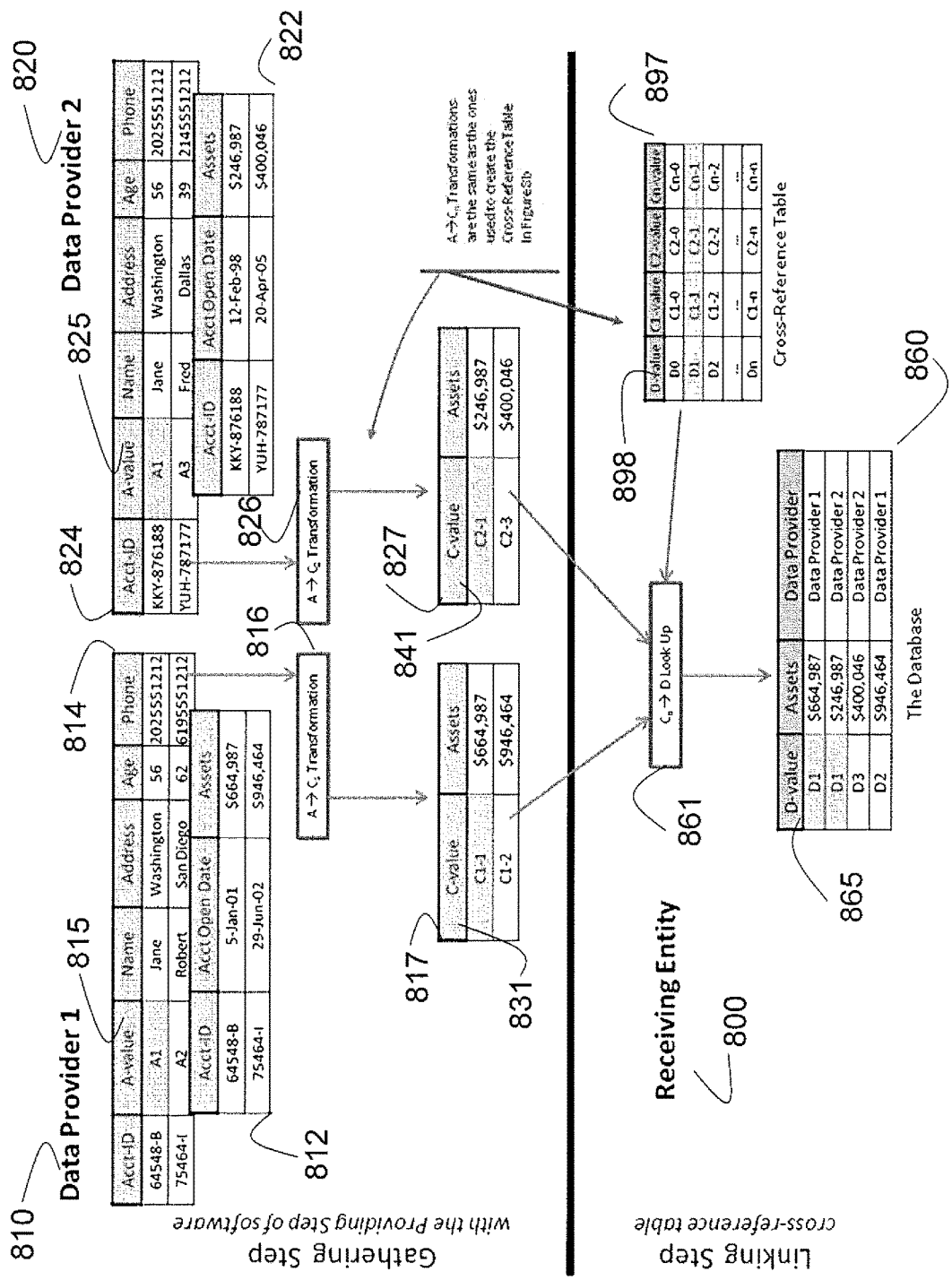
FIG. 8A is a detailed schematic illustrating a type of embodiment of the invention in which the Surrogate Investor Codes are C-values (as in FIG. 2C), obtained by performing a software-based transformation of each A-value to derive the corresponding C-value, and in which the Surrogate Investor Codes (C-values) are used indirectly (as in FIG. 2C) in linking data, by searching a C's-to-D cross-reference table to find the D-value corresponding to each C-value and then linking data to create the Database by matching on the resulting D-values.
Figure 8B:
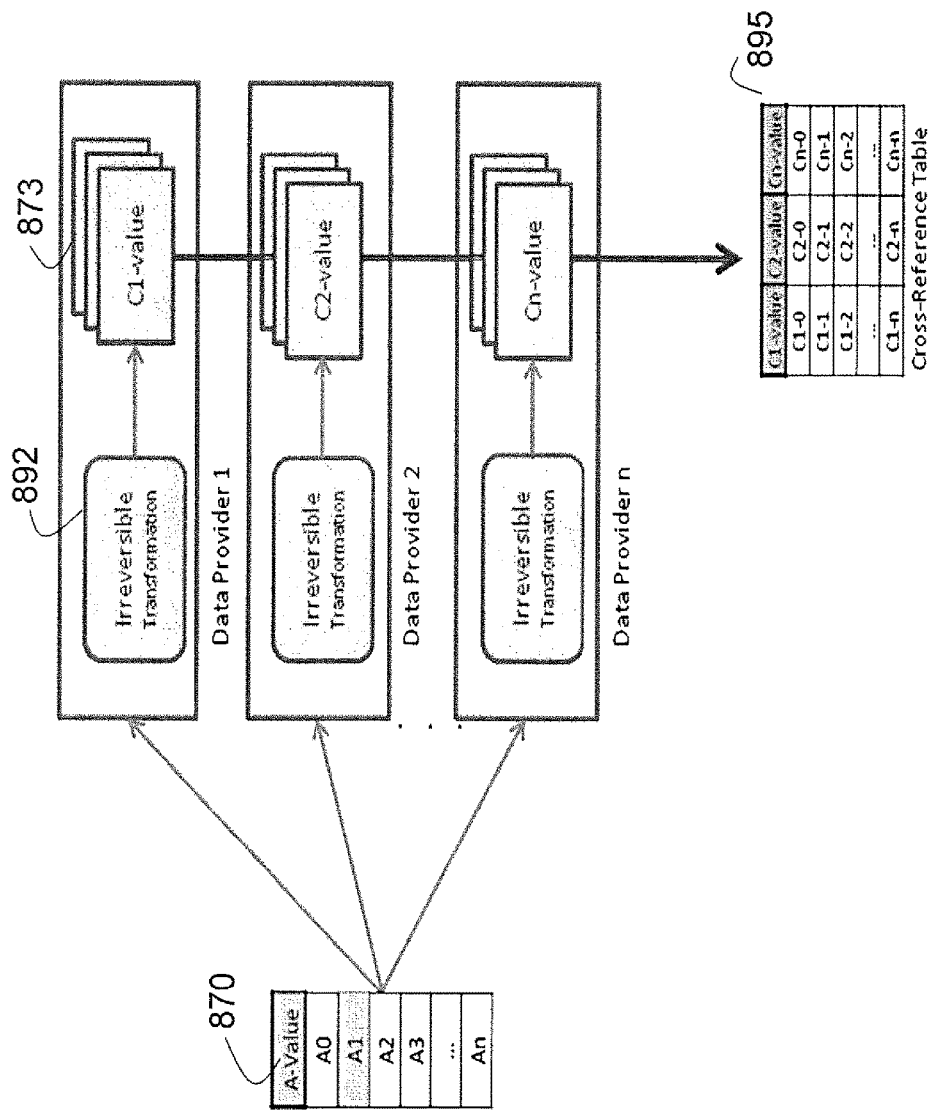
FIG. 8B is a detailed schematic illustrating the process through which a cross-reference table containing all C-values is created for use in the type of embodiment illustrated in FIG. 8A.

This embodiment type is now explained in greater detail, with reference to FIGS. 8A and 8B.

Providing Step

In the Providing Step, each Data Provider (810, 820) is provided a software module programmed to perform a transformation (816,826) that converts into the corresponding Surrogate Investor Code (831,841) any allowable A-value (815,825) associated with the Customer-Specific Data (812,822) which such Data Provider is to submit to the Receiving Entity (800).

It is required in this embodiment type that each Surrogate Investor Code be a C-value (831,841). As a result, the software modules provided to the Data Providers must all be configured differently and in such a manner that, with respect to any given A-value (815, 825), each Data Provider obtains a different Surrogate Investor Code (C-value) (831, 841). The reason for using C-values as the Surrogate Investor Codes is to prevent any Data Provider that gains access to the Input Data File of another Data Provider (whether by mistake or for any other reason) from being able to use the Surrogate Investor Codes in the Input Data Records of such file to link the associated Customer-Specific Data to the data in its own Input Data Records and, in that manner, identify the customers common to both parties.

The software-based transformation (816,826) of A-values (815,825) to derive corresponding C-values (831,841) (the "A-to-C transformation") is required to be irreversible in this embodiment type. The reason for this is to prevent the Receiving Entity from being able to use any C-value in an Input Data File (817,827) it receives (in the Linking Step) to derive the corresponding A-value (815,825) by reversing the A-to-C transformation (816,826) performed to create such C-value (by a Data Provider in the Gathering Step) and thereby determine the identity of an Investor.

As shown in FIG. 8B, a cross-reference table (895) is created in this embodiment type, for use by the Receiving Entity in the Linking Step. The table contains one row for each allowable A-value (870) and a column for each Data Provider. The columns are populated by using the software module provided to each Data Provider (in the Providing Step) to perform the A-to-C transformation (892) that converts all allowable A-values (870) into the corresponding C-values (873) pertaining to such Data Provider, such that upon completion of such process [a] each column of the table (895) contains the entire set of C-values that a particular Data Provider could obtain using the software module provided to it, and [b] each row contains all of the different C-values that were derived from a particular A-value using all such software modules. As discussed in the previous paragraph and as further shown in FIG. 8B, the A-to-C transformations (892) used to create such cross-reference table (895) are all required to be irreversible.

Configuration Options: There are several options available for configuring the Providing Step in this embodiment type, including those discussed below:

In selecting the portion of Customer-Identifying Information to serve as the A-values, there normally are several possibilities. The preferred choices are discussed in Subsection 1 ("Defining A-values") in the section of this document titled "Discretionary Elements Common to the Embodiments."

It is preferred that before any A-to-C transformation (892) is performed to create the cross-reference table (895) (for use in the Linking Step), all allow-able A-values be standardized/normalized. This topic is discussed more fully in Subsection 2 ("Standardization/Normalization of A-values") in the section of this document titled "Discretionary Elements Common to the Embodiments."

An irreversible transformation (892) of A-values (870) to derive corresponding C-values (873) is a required part of this embodiment type. Some of the methods for performing transformations of this kind are described in Subsection 3 ("Choice of Methods for Irreversible Transformations") in the section of this document titled "Discretionary Elements Common to the Embodiments."

In addition to minimizing the risk that anyone in the Receiving Entity having access to data from Input Data Files could successfully reverse any A-to-C transformation (such risk reduction being achieved by making each such transformation irreversible), it is also desirable to minimize the risk that anyone in the Receiving Entity could successfully use a dictionary-style attack on the C-values (as discussed in Subsection 3 ("Choice of Methods for Irreversible Transformations") in the section of this document titled "Discretionary Elements Common to the Embodiments") and thereby determine the A-value associated with any C-value in an Input Data File. One way to sharply reduce this risk with Embodiment Type VI is to configure any embodiment thereof in such a manner that:

(i) The software modules provided to the Data Providers for performing the A-to-C transformations (816,826) are configured in such a manner that a Seed is used with each such transformation (the use of Seeds being discussed more fully in Subsection 3 ("Choice of Methods for Irreversible Transformations") in the section of this document titled "Discretionary Elements Common to the Embodiments");

(ii) All such software modules are configured in such a manner as to incorporate a common transformation algorithm in conjunction with a unique Seed for the pertinent Data Provider, such that any given Data Provider performs the A-to-C transformation using the same transformation algorithm as every other Data Provider but a Seed that is used by no other Data Provider; and (iii) A Trusted Third Party is engaged to [a] create each Seed and provide it in a secure manner directly to the pertinent Data Provider (without disclosing such Seed to the Receiving Entity or to any other Data Provider or other party), and [b] generate the $C_1$-to-$C_n$ cross-reference table (895), using the software and Seeds provided to the Data Providers, and provide the cross-reference table to the Receiving Entity for use (in the Linking Step) in processing Input Data Files and creating the Database.

In this configuration, one or more of the functions of [a] creating or otherwise obtaining the software module that performs the A-to-C transformations (816,826), and [b] providing such software module to the Data Providers may be performed by either the Receiving Entity or the Trusted Third Party, depending upon operational convenience.

The rationale for engaging a Trusted Third Party to perform one or more of the functions of the Providing Step with respect to a particular embodiment of the invention is discussed in Subsection 8 ("Role of a Trusted Third Party") in the section of this document titled "Discretionary Elements Common to the Embodiments."

In order to protect the contents of the $C_1$-to-$C_n$ cross-reference table (895) during transit to the Receiving Entity (in the event that such table is generated by a Trusted Third Party), it is preferred that the table be encrypted, using a full-file encryption process, before being provided to the Receiving Entity. This topic is discussed more fully in Subsection 7 ("File Encryption") in the section of this document titled "Discretionary Elements Common to the Embodiments."

Gathering Step

In the Gathering Step, each Data Provider initially assembles its Customer-Specific Data (812,822) to be submitted to the Receiving Entity for purposes of creating the Database, along with the A-value portion (815, 825) of the associated Customer-Identifying Information (814,824). The Data Provider then creates an Input Data File (817,827) comprising discrete Input Data Records, each of which contains Customer-Specific Data pertaining to a particular Investor and the associated C-value (831,841) which such Data Provider [a] obtained by applying the software module provided to it in the Providing Step to the A-value associated with such Customer-Specific Data, and then [b] substituted (816/826) for such A-value.

As part of the process just described, the Data Provider removes/excludes all A-values and other Customer-Identifying Information from each Input Data Record, as a result of which the Input Data File is fully blinded. Upon having completed preparation of an Input Data File (817, 827) in this manner, the Data Provider submits the file to the Receiving Entity (800) for use in creating the Database.

Configuration Options: There are several options available for configuring the Gathering Step in this embodiment type, including those discussed below:

It is preferred that each Data Provider, before performing the Gathering Step, standardize/normalize all A-values in its Customer-Identifying Information. This topic is discussed more fully in Subsection 2 ("Standardization/Normalization of A-values") in the section of this document titled "Discretionary Elements Common to the Embodiments."

In FIG. 8A, only one element of Customer-Specific Data (812,822) is shown, namely the asset balance in each customer's accounts. However, there are usually numerous choices available as to which elements of customer-related data could be treated as Customer-Specific Data and therefore be provided to the Receiving Entity. This topic is discussed more fully in Subsection 6 ("Choice of Customer-Specific Data") in the section of this document titled "Discretionary Elements Common to the Embodiments."

In order to protect from improper disclosure the contents of Input Data Files (817,827) during transit to the Receiving Entity (800), it is preferred that each Data Provider (810, 820) encrypt its Input Data Files, using a full-file encryption process, before submitting them to the Receiving Entity for use in creating the Database. This topic is discussed more fully in Subsection 7 ("File Encryption") in the section of this document titled "Discretionary Elements Common to the Embodiments."

Linking Step

In the Linking Step, the Receiving Entity (800) loads to a Database (860) Customer-Specific Data from each Input Data File (817,827) it receives and uses indirectly the Surrogate Investor Codes (831,841) associated with such data (i.e., the C-values) to link the data with Customer-Specific Data from other Data Providers (and/or time periods).

The foregoing is accomplished by first expanding the $C_1$-to-$C_n$ cross-reference table (895) created in the Providing Step to create a new cross-reference table (897) by associating a distinct D-value (898) with each row of the table (doing so in such a manner that each row of the table is associated with one and only one D-value and each distinct D-value is associated with one and only one row of such table), and then, with respect to each Input Data File received from a Data Provider, [a] substituting for each C-value in such Input Data File the corresponding D-value (898) (obtained by searching the column of the table that pertains to such Data Provider to locate such C-value and selecting the D-value from the same row of the table), and then [b] linking the data by matching on D-values (865).

The effect of substituting (861) for each C-value (831, 841) in an Input Data File the corresponding D-value (898) (as described in the preceding paragraph) is that the differing C-values (831,841) obtained and substituted (816,826) by the various Data Providers (in the Gathering Step) with respect to any particular A-value (815,825) are all replaced by the same D-value (865), thereby making it possible for the Receiving Entity to link Customer-Specific Data provided by more than one Data Provider that were originally associated with the same A-value.

Configuration Options: There are several options available for configuring the Linking Step in this embodiment type, including those discussed below:

If any Data Provider uses a full-file encryption process in the Gathering Step to encrypt an Input Data File (817,827), or if the Trusted Third Party uses such an encryption process in the Providing Step to encrypt a cross-reference table (895), such file must be decrypted before it is used in the Linking Step. This topic is discussed more fully in Subsection 7 ("File Encryption") in the section of this document titled "Discretionary Elements Common to the Embodiments."

There are many ways to create the D-values that the Receiving Entity associates with the rows of the C.sub.1-to-C.sub.n cross-reference table (895). As an example, each row-number could be mathematically transformed to generate the associated D-value. Alternatively, each D-value could be randomly generated. In either case, any duplicates would be excluded from use. The only requirements of the generation process are that the resulting D-values must conform to the definition of D-values set forth in this document and that each D-value must have a persistent association over time with the A-value to which it is related.

Discretionary Elements Common to Embodiments

This section of the document provides a detailed explanation of several options and preferred methods for implementation of the invention (all of which are described with respect to [a] a particular Database, [b] the Receiving Entity creating such Database, [c] the Data Providers providing data for such Database, and [d] the Trusted Third Party, if any, that is engaged with respect to such Database), each such option or preferred method being applicable to more than one of the types of embodiment of the invention described above and incorporated by reference into the description thereof, as applicable.

1: Defining A-Values

For all of the types of embodiment of the invention, it is preferred that the portion of Customer-Identifying Information chosen by the Data Providers to function as the A-values be an element or combination of elements of Customer-Identifying Information that every Data Provider maintains and with respect to which it is reasonable to expect that all Data Providers using a particular value thereof are designating the same Investor. Such a configuration results in the most reliable/effective basis for linking data across multiple Data Providers. Given the foregoing, it can be seen that suitable candidates for A-values include: Social Security Numbers, Standardized Mailing Addresses and Taxpayer ID Numbers (where, respectively, the Investors designated would be individuals, households, and business entities and/or trusts). Any such element of Customer-Identifying Information can be expected to provide a reliable, consistent foundation of A-values for purposes of any embodiment of the invention.

2: Standardization/Normalization of A-Values

For all of the embodiments of the invention, it is preferred that before performing any transformation to convert A-values into Surrogate Investor Codes, such A-values first be standardized/normalized.

Whenever such standardizations/normalizations are to be performed by the Data Providers (a preferred part of the Gathering Step for all embodiment types), the purpose is to maximize the likelihood that the A-value associated with any particular Investor is the same for all Data Providers with which such Investor has a customer relationship. This, in turn, maximizes the likelihood that the Surrogate Investor Code obtained by each such Data Provider with respect to such Investor can be successfully used by the Receiving Entity to link all associated Customer-Specific Data in the Linking Step.

Whenever such a standardization/normalization is to be performed in connection with creating an A-to-B or A-to-C look-up table (which is a preferred part of the Providing Step of Embodiment Types II, IV and V), the purpose is to maximize the likelihood that the A-value in such look-up table that pertains to any given Investor is the same as the A-value that the Data Provider that uses such look-up table associates with such Investor (to the extent that a customer relationship exists between such Investor and such Data Provider). This, in turn, maximizes the successful matching of A-values in such Data Provider's Customer-Identifying Information with the A-values in such look-up table.

3: Choice of Methods for Irreversible Transformations

The different types of embodiment described in this document all include the use of an irreversible transformation, whether for conversion of A-values into B-values, of A-values into C-values, or of B-values into D-values. The primary objective in using an irreversible transformation in any process is to prevent a recipient of the output values that result from such transformation from determining the input value that corresponds to any given output value (e.g., if a person gains access to a file that contains B-values that were created by irreversibly transforming A-values, that person would not be able to reverse the transformation to derive the A-value associated with any B-value).

However, in cases, where the A-values (or other input values) are from a known, finite set of values (e.g., Social Security Numbers), it is possible for a person to attempt to defeat the mechanism used for an irreversible transformation by launching a dictionary-style attack on the output values resulting from such transformation. This is typically done by generating a dictionary that contains all (or a high percentage) of the possible input values and then applying various irreversible transformation algorithms until the resulting set of output values matches the output values resulting from the transformation being attacked. As an example, if it is known that the A-values consist of Social Security Numbers, then the dictionary of all possible A-values would consist of most or all of the possible nine-digit numeric strings, a set of values that can be easily generated by computer. In such restricted cases, it may then be computationally feasible to derive the input values from the output values.

In order to minimize the likelihood that such a dictionary attack could be successfully made, a string of characters (a "salt-string") can be added to each input value (in accordance with a string-composition algorithm) prior to performing the transformation. By keeping the salt-string secret, the effect is to convert the set of known input values into unknown input values, which makes dictionary attacks on the output values resulting from an irreversible transformation substantially more difficult to successfully execute. For this reason, it is preferred to combine a salt-string with each input value (in the manner just described) before performing any irreversible transformation in an embodiment of the invention.

It is common practice in computing applications to effect irreversible transformations through one of the well-established cryptographic hash functions. An accepted method of implementing a cryptographic hash with a salt-string (a "salted hash") is to use a Hash Message Authentication Code ("HMAC") transformation, which is a type of message authentication code ("MAC") calculated using a specific algorithm, such algorithm involving a cryptographic hash function in combination with a "key-string" which, like a salt-string, is a predetermined string of characters. The HMAC-hash computations are double-hash computations wherein a non-salted hash function is initially applied to an input value and, then, the proprietary key-string is combined with the output of the first hash function to create the input to the second hash function.

This procedure of using dual hash functions is intended to protect against a known vulnerability of cryptographic hash functions, wherein if a hash of a string "X" is known, the hash of string "X+Y" (where "Y" is the salt-string/key-string) can be computed in some cases.

For purposes of this document, the terms "salt-string" and "key-string" are treated as equivalent in meaning, and each is treated as a type of "Seed," as defined in the "Glossary of Terms" section of this document. The two following paragraphs discuss the use of Seeds in conjunction with irreversible transformations in various types of embodiments of the invention.

Whenever an embodiment of the invention requires that an irreversible transformation be used to convert A-values directly into B-values, as required in Embodiment Types I-IV and resulting (by definition) in the same series of Surrogate Investor Codes for each Data Provider, it is required that a common A-to-B transformation algorithm be used for all Data Providers, and it is preferred that a common Seed be used with such transformation, such that the A-to-B transformation for any given Data Provider is performed using the same transformation algorithm and the same Seed as is used for every other Data Provider. When a Seed is incorporated in this way into an A-to-B transformation, it is preferred that a Trusted Third Party create the Seed and, depending upon the type of embodiment being used, either [a] (in Embodiment Types II and IV) use the Seed, without disclosure to any other party, to perform such A-to-B transformations (492;692) as part of the process of creating look-up tables (418,428;618,628) for use by the Data Providers, or [b] (in Embodiment Types I and III) securely provide the Seed to each Data Provider for its use in performing the A-to-B transformations (316,326;516,526) using software provided to it in the Providing Step. The reason for engaging a Trusted Third Party to perform these functions is to prevent the Receiving Entity from having any means by which to derive the corresponding A-value from any B-value in an Input Data File (317,327;417,427) or from any B-value it derives (561,571;661,671) from a C-value in an Input Data File.

Whenever an embodiment of the invention requires that an irreversible transformation be used to convert A-values directly into C-values, as required in Embodiment Types V and VI and resulting (by definition) in a different series of Surrogate Investor Codes for each Data Provider, it is preferred that instead of using a different transformation algorithm for each Data Provider, the same algorithm be used, together with a Seed that is different for each Data Provider, such that the A-to-C transformation for any given Data Provider is performed using the same transformation algorithm as is used for every other Data Provider but a Seed that is different from the Seed used for any other Data Provider. When Seeds are incorporated in this manner into A-to-C transformations, it is preferred that a Trusted Third Party create the Seeds and, depending upon the type of embodiment being used, either [a] (in Embodiment Type V) use the Seeds, without disclosure to any other party, to perform such A-to-C transformations (792) as part of the process of creating look-up tables (718,728) for use by the Data Providers, or [b] (in Embodiment Type VI) securely provide each Seed to the pertinent Data Provider for its use in performing the A-to-C transformations (816,826) using software provided to it in the Providing Step, and, in the case of either [a] or [b], use the Seeds to create the $C_1$-to-$C_n$ cross-reference table (795;895) for use by the Receiving Entity. The reason for engaging a Trusted Third Party to perform these functions is to prevent the Receiving Entity from having any means by which to derive the corresponding A-value from any C-value in an Input Data File (717, 727;817,827) or from any C-value in a cross-reference table (795,797;895,897).

4: Choice of Methods for Reversible Transformations

Embodiment Types III and IV each include, in the respective Providing Steps, a reversible transformation to convert B-values into C-values. A widely used method for performing transformations of this kind is encryption, which entails the application of an encryption algorithm to an input value that has been coupled with a pre-defined key (also called a Seed) to produce an encrypted output value. One widely used encryption algorithm is AES 256-bit. Encryptions can be based upon any of the following procedures:

(i) Symmetric encryption (where the keys for encryption and decryption are the same);

(ii) Asymmetric encryption (where the keys for encryption and decryption are different); or (iii) A combination of the two methods, where asymmetric encryption is used to encrypt the key to the symmetric encryption.

For purposes of this document, the terms "salt-string" and "key-string" are treated as equivalent in meaning, and each is treated as a type of "Seed."

Embodiment Types III and IV both require that the reversible transformation generate, with respect to any given input value, a differing output value for each Data Provider. It is possible to accomplish this by using a different transformation algorithm for every Data Provider, however it is preferred (for reasons of both operational convenience and enhanced data security) that a common transformation algorithm be used, in conjunction with a unique Seed for each Data Provider, such that the B-to-C transformation for any given Data Provider is performed using the same transformation algorithm as is used for every other Data Provider but a Seed that is different from the Seed used for any other Data Provider.

5: Use of B-Values and D-Values for Linking Data

At a certain point in the Linking Step of each of Embodiment Types I-IV, all Customer-Specific Data are associated with B-values. For Embodiment Types I and II, the Input Data Files are received by the Receiving Entity in this form (i.e., with B-values as the Surrogate Investor Codes). For Embodiment Types III and IV, the Input Data Files are received by the Receiving Entity with C-values as the Surrogate Investor Codes, but the Receiving Entity then converts the C-values into B-values by reversing the B-to-C transformations that were performed (in the Gathering Step and Providing Step, respectively) to create such C-values.

In either of these circumstances, the Receiving Entity has the option to use the B-values directly to link associated Customer-Specific Data, which it can accomplish by loading the B-values and the associated Customer-Specific Data to the Database and then linking the data with other Customer-Specific Data in the Database by matching on the B-values themselves. This method of linking data is possible because all Customer-Specific Data associated with the same B-value can be relied upon, by design, to pertain to the same Investor even if such data were provided by different Data Providers and/or for different time periods.

Linking Customer-Specific Data by using B-values directly is the most efficient way to use Embodiment Types I-IV. However, in all four of these embodiment types, the entity or entities performing the functions of the Providing Step (whether that is an organization unit of the Receiving Entity or a Trusted Third Party or both) would know or could readily determine the relationships between B-values and A-values. Moreover, in Embodiment Types I-III, all Data Providers would know or could likely determine such relationships, as well. Consequently, the presence of B-values in any Database may create data-security vulnerabilities with respect to identifying the Investor to which certain Customer-Specific Data in the Database pertain. For example, any data extracted from the Database that are coded with B-values (or otherwise linked to B-values) could be linked by any Data Provider to its Input Data Records by matching on B-values, which could enable such Data Provider to determine which of its customers have relationships with other Data Providers, as well as the nature and extent of such relationships.

In order to substantially mitigate the risk of any such improper disclosure, it is preferred in Embodiment Types I-IV that [a] the B-values be used indirectly for linking Customer-Specific Data, and [b] the Receiving Entity accomplish this by first substituting for each B-value the corresponding D-value (i.e., Proprietary Investor Code) and then linking data by matching on D-values. Given the properties of D-values (as set forth in the "Summary of the Invention" and "Glossary of Terms" sections of this document), the effect of substituting D-values for B-values is to preserve the ability of the Receiving Entity to link Customer-Specific Data across Data Providers (and/or time periods), while enabling the Receiving Entity to entirely exclude Surrogate Investor Codes (i.e., B-values or C-values) from the Database.

It is further preferred in these embodiment types that the Receiving Entity create such D-values by performing an irreversible transformation of each B-value to derive the corresponding D-value. The use of irreversible transformations is discussed more fully above in Subsection 3. The reason for using a transformation to create D-values from B-values is to ensure a persistent relationship between the B-values and their corresponding D-values without having to store any table that maps B-values to D-values (and thereby create a vulnerability that someone interested to reverse the B-to-D transformation could potentially gain access to such table). The reason for such transformation to be irreversible is to prevent any Data Provider, or any entity (other than the Receiving Entity) that performs any function of the Providing Step, from being able to use the D-values associated with any data in the Database to derive the corresponding B-values by reversing such B-to-D transformation and, in that way, link data from the Database to any external data that are associated with B-values.

6: Choice of Customer-Specific Data

In the figures that accompany this document and illustrate each of the embodiment types described in the text (i.e., FIGS. 3 through 8), only two elements of customer-related data are identified that could be treated as Customer-Specific Data namely, "Acct Open Date" and "Assets," and only the latter is shown to be part of the Customer-Specific Data (i.e., is included in each of the Input Data Files). These data elements are shown only for illustrative purposes and are merely exemplary. Customer-Specific Data may, in practice, be any customer-related data other than Customer-Identifying Information and, therefore, might include, for example, data related to the demographic characteristics, financial holdings or behavior of a customer, or information concerning the individual(s) and/or organizational units (within a Data Provider's organization) responsible for the relationship with such customer. The choice of what is to constitute Customer-Specific Data for a certain Database is made by the pertinent Data Providers and Receiving Entity.

7: File Encryption

In the figures that accompany this document and illustrate each of the embodiment types described in this document (i.e., FIGS. 3 through 8), it is shown that certain sensitive data files are sent from one party to another, specifically:

(i) An Input Data File is sent from each Data Provider to the Receiving Entity in the Gathering Step of all embodiment types;

(ii) An A-to-B look-up table is sent to each Data Provider in the Providing Step of Embodiment Type II;

(iii) An A-to-C look-up table is sent to each Data Provider in the Providing Step of Embodiment Types IV and V; and (iv) A $C_1$-to-$C_n$ cross-reference table is sent to the Receiving Entity in the Providing Step of Embodiment Types V and VI when a Trusted Third Party is engaged in the preferred manner.

To protect the contents of each such file during transit to the Receiving Entity or the pertinent Data Provider, as applicable, it is preferred that the sending party encrypt such file, using a full-file encryption procedure, before submitting it to the receiving party. In such event, the recipient of such file will need to decrypt the file before using the file for its intended purpose.

The available encryption options and preferences are the same as those set forth in Subsection 4 above. With respect to full-file encryption of files that are to be sent to Data Providers, it is preferred that the encryption for any given Data Provider be performed using a different key (Seed) than is used for any other Data Provider.

8: Role of a Trusted Third Party

In the Providing Step of each of the embodiment types described in this document, each Data Provider is provided a computer-based means to obtain the appropriate Surrogate Investor Code to include in each of its Input Data Records. For Embodiment Types I, III and VI, such computer-based means is software that transforms A-values into corresponding Surrogate Investor Codes. For Embodiment Types II, IV and V, such computer-based means is a look-up table containing all allowable A-values and their corresponding Surrogate Investor Codes. In either case, the entity that is providing such computer-based means to the Data Providers has the knowledge of (or the means to determine) the way in which the Surrogate Investor Codes are derived from A-values and, as such, has the ability, if provided with an Input Data File from one of such Data Providers, to determine the A-value associated with the Customer-Specific Data in each of the Input Data Records in such file.

In the event that the Receiving Entity performs the function of providing such computer-based means to the Data Providers, its possession of both [a] the means by which to associate Surrogate Investor Codes with A-values (as described above), and [b] the Input Data Files submitted by Data Providers, could constitute a constructive disclosure of Investor identities and associated Customer-Specific Data to the Receiving Entity by the Data Providers. To prevent this, the Receiving Entity can separate knowledge of such computer-based means to obtain Surrogate Investor Codes from the processing of the Input Data Files.

One way to accomplish this is through some form of organizational "Chinese wall" which ensures that the group of individuals that is working with data in the Input Data Files is different from the group dealing with such computer-based means and, further, that the two groups are in distinct organizational units of the Receiving Entity. To minimize the risk of collusion between such groups, the groups can be organized so as to work in different locations and, preferably, report into different management structures.

Such separation of knowledge can be even more formally effected by having such groups be part of distinct legal entities, with one being a Trusted Third Party that (at a minimum) performs the functions of creating, securely maintaining, and securely distributing to each Data Provider, some or all of the elements of such computer-based means to obtain Surrogate Investor Codes. Such a structural approach can facilitate management/administration of the separation of information and functions and also present to Data Providers a more easily visualized means by which their data are safe-guarded. The preferred role for such a Trusted Third Party is described below in relation to the different embodiment types of the invention:

(i) If such computer-based means is a look-up table, the Trusted Third Party should perform the necessary transformations to derive the Surrogate Investor Codes, create the look-up tables, and distribute each look-up table to the pertinent Data Provider. With such a configuration, the Receiving Entity would not have access to the look-up tables or the entire method used to generate Surrogate Investor Codes from A-values and, therefore, would have no way of determining the A-value from which any Surrogate Investor Code in an Input Data File was derived.

(ii) If such computer-based means is software, the Trusted Third Party should create at least one of the essential elements used in the irreversible transformation of A-values into Surrogate Investor Codes and securely distribute such element or elements directly to the Data Providers. For example, if a Seed is used (as described in Subsection 3, above) in the irreversible transformation of A-values into B-values, the Trusted Third Party could create and distribute such Seed. With such a configuration, the Receiving Entity would not have access to all of the elements of method necessary for generating Surrogate Investor Codes from A-values and, therefore, would be prevented from determining the A-value from which any Surrogate Investor Code in an Input Data File was derived.

Depending upon which embodiment type of the invention is used for creating a particular Database, and the specific role assigned to the Trusted Third Party related thereto, the Trusted Third Party may be required to provide certain information to the Receiving Entity to enable it to perform the required functions in the Linking Step. For example, if a Trusted Third Party creates and distributes the look-up table in Embodiment Type V or the software in Embodiment Type VI, then such Trusted Third Party would be required to provide the $C_1$-to-$C_n$ cross-reference table to the Receiving Entity for use in creating the C's-to-D cross-reference table which is used by the Receiving Entity in the Linking Step of those embodiment types to link Customer-Specific Data received from the various Data Providers. Similarly, if in Embodiment Type IV a Trusted Third Party creates/distributes the A-to-C look-up tables, and a common reversible transformational-gorithm is used in conjunction with a different Seed to perform the B-to-C transformation for each Data Provider, such Trusted Third Party would be required to provide the Seeds to the Receiving Entity (along with the transformation algorithm, if it did not originate from the Receiving Entity) to enable the Receiving Entity to reverse the B-to-C transformations in the Linking Step.

An Embodiment of the Invention

Figure 9:
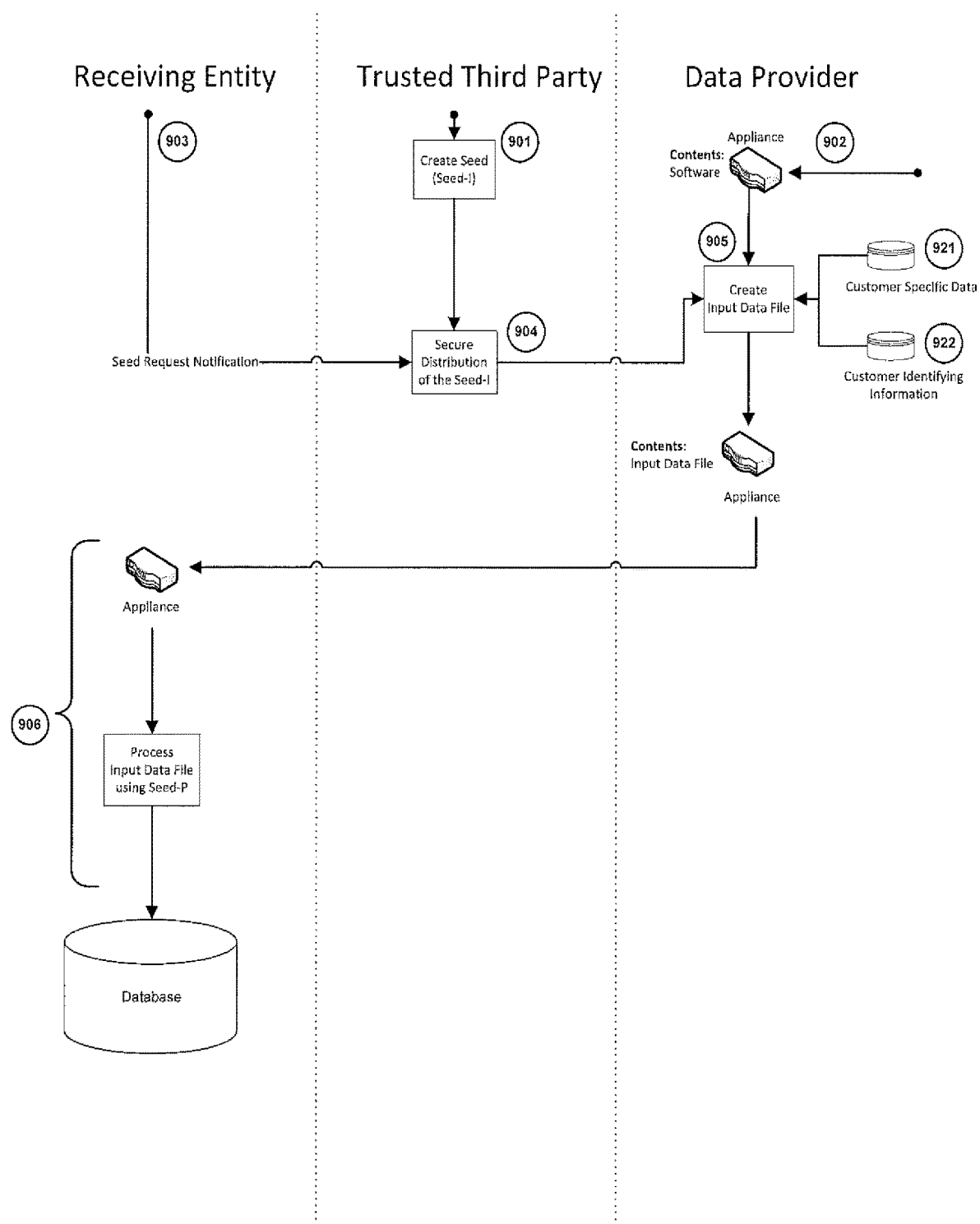
FIG. 9 is a detailed schematic that illustrates in greater detail an embodiment of the invention that is consistent with Embodiment Type III (as illustrated in FIG. 5), in which a computer appliance is used to [a] transfer software from a Receiving Entity that is creating a certain Database to each Data Provider providing data for use in creating such Database, and [b] transfer the Input Data Files from each such Data Provider to such Receiving Entity, and in which a Trusted Third Party creates, and securely distributes directly to each such Data Provider, a Seed (as defined in the "Glossary of Terms" section at the end of this document) for use in creating the Surrogate Investor Codes.

An embodiment of the invention is now described in the following sections with respect to [a] a particular Database, [b] the Receiving Entity creating such Database, [c] the Data Providers that provide data for such Database, and [d] the Trusted Third Party engaged with respect to such Database. This embodiment is consistent with Embodiment Type III and illustrates how data-security options can be incorporated that, collectively, afford a high level of protection to the security and integrity of all data prepared by Data Providers and submitted to the Receiving Entity. In the first part of the description, certain terms are defined that are particular to this embodiment. In the second part of the description, the process of this embodiment is described in detail, with reference to FIG. 9.

Definitions of Key Terms

The following terms, which are not defined elsewhere in this document, are specific to, and important to the understanding of, this embodiment:

Appliance—A physical computer device with interfaces for portable external memory devices and internal componentry sufficient for executing the functions of this embodiment, including internal memory for storing [a] software delivered with the Appliance, and [b] any Input Data File created on the Appliance.

Create Input Data File—A software application executed on the Appliance operated by each Data Provider that creates an Input Data File by, in part, performing in series the irreversible transformation of each of such Data Provider's A-values into the corresponding B-value and then the reversible transformation of such B-value into the corresponding C-value.

Create Seed—A software application executed by the Trusted Third Party that creates Seed-I for use in the irreversible transformation performed on an Appliance that converts each A-value into the corresponding B-value.

Process Input Data File—A software application executed by the Receiving Entity that processes each Input Data File by, in part, performing in series [a] the conversion of each C-value contained in such Input Data File into the corresponding B-value, by reversing the B-to-C transformation that created such C-value, and then [b] the irreversible transformation that converts the resulting B-value into the corresponding D-value (Proprietary Investor Code).

Seed-I—A Seed created and distributed to a Data Provider by the Trusted Third Party, that is used by the Create Input Data File application in performing, on the Appliance provided to such Data Provider, the irreversible transformation that converts A-values into corresponding B-values.

Seed-P—A Seed created by the Receiving Entity and used in the Process Input Data File application in performing, on the Receiving Entity's computers, the irreversible transformation that converts B-values into corresponding D-values (Proprietary Investor Codes).

Seed-R—A Seed used by the Create Input Data File application in performing, on the Appliance provided to a particular Data Provider, the reversible transformation that converts B-values into corresponding C-values for such Data Provider.

Seed Request Notification—A request sent by the Receiving Entity to the Trusted Third Party to prepare a Seed-I and to send such Seed-I in a secure manner to certain named Data Providers.

Description of the Process

This embodiment of the invention consists of the six steps set forth and explained below:

(i) Initial Process Set-up—The Trusted Third Party executes the Create Seed application (901) in order to generate the Seed-I to be provided to the Data Providers in connection with creation of the Database.

(ii) Appliance Set-up and Distribution—The Receiving Entity arranges for each Data Provider to receive an Appliance (902), with the Create Input Data File software pre-loaded and configured to require a Seed-I in order to execute. Such Appliance may be provided either by the Receiving Entity or by the Trusted Third Party, depending upon operational convenience.

(iii) Notification of Trusted Third Party—The Receiving Entity sends the Trusted Third Party a Seed Request Notification (903), with a certain Data Provider's name, shipping address and other associated information required in connection with delivery of the Seed-I to such Data Provider.

(iv) Seed Distribution to the Data Provider—The Trusted Third Party provides the Seed-I (904) to the Data Provider identified in such Seed Request Notification (903), using a secure means of distribution, with each of the Data Providers for a particular Database receiving the same Seed-I.

(v) Creation of Input Data File—The Data Provider then attaches to the Appliance an external memory device holding the Customer-Specific Data (921) it is to provide to the Receiving Entity and certain Customer-Identifying Information (922) associated with such Customer-Specific Data, including at least the A-value portion of the Customer Identifying Information. It then executes (905) on the Appliance the Create Input Data File application, providing the Seed-I upon program-prompt. The Create Input Data File application is programmed to read from the external memory device the file(s) containing the Customer-Specific Data and the A-value portion of associated Customer-Identifying Information and create on the Appliance an Input Data File containing a series of blinded Input Data Records, each of which is composed in the following manner: [0425] [a] Composition of Input Data Record: Such Input Data Record contains Customer-Specific Data pertaining to a particular Investor and the Surrogate Investor Code that pertains to such Investor, which such application obtains via the two-step transformation process described below: [0426] (1) A.fwdarw.B Transformation: The Seed-I is accessed and used as the Seed in an irreversible transformation that converts the A-value portion of the Customer-Identifying Information associated with such Customer-Specific Data into the corresponding B-value (where the transformation algorithm and Seed are the same as the ones used for the other Data Providers, such that, with respect to any particular A-value, the B-value obtained is the same as the B-value obtained by each of the other Data Providers); and [0427] (2) B.fwdarw.0 Transformation: A reversible transformation is then performed to convert the B-value resulting from the first transformation into the corresponding C-value (where such transformation is different from the one used for any other Data Provider, such that, with respect to any particular B-value, the C-value obtained is different from the C-value obtained by any other Data Provider), and such C-value is then used as the Surrogate Investor Code pertaining to such Investor. [0428] [b] Blinding of Input Data Records: Such Input Data Record is then blinded by the removal/exclusion therefrom of the A-value and all other Customer-Identifying Information associated with the Customer-Specific Data in such Input Data Record.

The reversible B.fwdarw.0 Transformation is performed using a Seed (Seed-R). For operational convenience, the transformation algorithm pre-installed on the Appliance is the same for all Data Providers, while the C-values are made different for each Data Provider by using differing Seed-Rs, each of which is known only to [a] the Data Provider that uses such Seed-R in its B.fwdarw.0 Transformation (and to no other Data Provider), [b] the Receiving Entity, and [c] the Trusted Third Party (but only in the event that the Trusted Third Party is responsible for providing the Seed-R to such Data Provider).

Once such Input Data File has been created, the Data Provider detaches any external memory device(s) that held data used in creating such Input Data File and then sends the Appliance to the Receiving Entity for use in creating the Database. For additional data security, the Create Input Data File application may be configured to encrypt the Input Data File using a full-file encryption process before the Appliance is sent to the Receiving Entity.

(vi) Processing of Input Data Files—Upon receiving the Appliance (906) from a Data Provider, the Receiving Entity copies the Input Data File from the Appliance to a secure server. In the event that the Create Input Data File application was configured to encrypt the Input Data File before the Appliance was submitted by the Data Provider to the Receiving Entity, the Receiving Entity must then decrypt the Input Data File before processing it. The Receiving Entity then executes the Process Input Data File application, which uses the Seed-R and is programmed to perform the two-step transformation process described below on each blinded Input Data Record in such Input Data File: [0432] (1) C.fwdarw.B Transformation: The Seed-R is accessed and used to reverse the B.fwdarw.0 transformation used in the creation of the Input Data File, thereby converting each C-value in the Input Data File back into the B-value from which it was derived; and [0433] (2) B.fwdarw.D Transformation: The B-value resulting from the first step is then converted into the corresponding D-value by an irreversible transformation, where such transformation uses a Seed (Seed-P), which is not disclosed by the Receiving Party to any other party and where the Receiving Party uses the same Seed-P for each Input Data File it processes, such that, with respect to any particular B-value, the irreversible transformation yields the same D-value for each Input Data File.

Upon completing execution of the Process Input Data File application, the Receiving Entity is then able to link the Customer-Specific Data in such Data Provider's Input Data File with Customer-Specific Data from processed Input Data Files provided by other Data Providers (and/or in other time periods) by matching on D-values.

Glossary of Terms

The description of the present invention set forth in the preceding sections of this document includes definitions of certain terms, the understanding of which is critical to understanding the invention. The Glossary of Terms provided in this section serves as a consolidated reference to such definitions.

A-value—A particular value of a certain portion of Customer-Identifying Information (such as Taxpayer ID Number, Social Security Number or Name-and-Address) that the Data Providers for a certain Database agree is to serve as the basis upon which each will recognize and designate distinct Investors for the purpose of creating such Database, such that each distinct A-value is treated by all such Data Providers as representing the same Investor (and only such Investor).

B-value—A Surrogate Investor Code that, with respect to any particular A-value, is the same for all Data Providers that provide data to be used in creating a particular Database.

(to) blind—To remove or exclude all Customer-Identifying Information (including A-values) from an Input Data Record; blinded—The state of an Input Data Record in which all Customer-Identifying Information has been removed or excluded therefrom.

C-value—A Surrogate Investor Code that, with respect to any particular A-value, is different for each Data Provider that provides data to be used in creating a particular Database.

Customer-Identifying Information—Any element or combination of elements of the customer-related information maintained by a Data Provider that either is a unique identifier/designator of any of such Data Provider's customers or is information pertaining to any such customer that such Data Provider considers to be non-public personal information; any or all such information, collectively.

Customer-Specific Data—Any element of the customer-related information maintained by a Data Provider, other than Customer-Identifying Information, that pertains to a particular customer of such Data Provider and that such Data Provider provides to a Receiving Entity for use in creating a particular Database; any or all such information, collectively.

D-value—A Proprietary Investor Code.

Data Provider—Any financial institution that provides Customer-Specific Data to a Receiving Entity for use in creating a Database.

Database—A computer-processable database that contains multiple composite logical data records, each of which logically associates Customer-Specific Data that pertain to a particular Investor (i.e., were originally associated with the same A-value) and may have been provided by more than one Data Provider.

FDIC—The Federal Deposit Insurance Corporation.

Gathering Step—The aspect of the invention in which the Data Providers for a certain Database create Input Data Files and a Receiving Entity receives such Input Data Files for use in creating such Database.

GLB—The Gramm Leach Bliley Act (of 1999).

Input Data File—A computer-processable file that contains Input Data Records, all of which are blinded.

Input Data Record—A logical data record prepared by a Data Provider that contains Customer-Specific Data pertaining to a particular Investor and an associated Surrogate Investor Code.

Investor—A person, or group of persons or other entity, that has a customer relationship with any financial institution that is a Data Provider.

(to) link—To create logical data records in a certain Database, each of which logically associates Customer-Specific Data that pertain to a particular Investor (i.e., were originally associated with the same A-value) and may have been provided by more than one Data Provider.

Linking Step—The aspect of the invention in which a Receiving Entity processes Input Data Files provided for use in creating a certain Database and links Customer-Specific Data contained in such Input Data Files to create such Database.

Proprietary Investor Codes—A system of codes that is proprietary to a Receiving Entity and that is used by such Receiving Entity for secure linking of data in a Database at the individual Investor level after such codes have been substituted by the Receiving Entity for the corresponding Surrogate Investor Codes in Input Data Records used for creating such Database, each system of Proprietary Investor Codes being designed in such a manner that:

(i) Each Proprietary Investor Code has the following properties: [0455] [a] It is derived from or otherwise related to the Surrogate Investor Code for which it is substituted, using a process designed in such a manner that the same D-value results from applying such process to any Surrogate Investor Code originating from the same A-value (regardless of which Data Provider's Customer-Specific Data such Surrogate Investor Code is associated with), and, as a result, it designates one particular Investor and only such Investor; [0456] [b] It does not reveal the identity of such Investor because it has no information content that reveals (1) the A-value associated with such Investor, or (2) any other Customer-Identifying Information; and [0457] [c] It is private and confidential to the Receiving Entity and, therefore, neither disclosed to nor made accessible to any Data Provider; and (ii) Such system of Proprietary Investor Codes cannot be converted using a mathematical transformation into the set(s) of Surrogate Investor Codes from which they were derived (or to which they are otherwise related) or into the A-values from which such Surrogate Investor Codes were derived (or to which such Surrogate Investor Codes are otherwise related) or into any other Customer-Identifying Information.

Providing Step—The aspect of the invention in which the Receiving Entity creating a certain Database and/or a Trusted Third Party engaged with respect to such Database (depending upon the configuration of the embodiment of the invention being used) provides to each Data Provider for such Database a computer-based means to obtain the Surrogate Investor Code that corresponds to each of the A-values that such Receiving Entity and/or Trusted Third Party (as the case may be) deems to be an allowable A-value for purposes of creating such Database.

Receiving Entity—Any entity that is acting as a compiler of a particular Database by receiving Input Data Files from the Data Providers for such Database and that is using the data in such Input Data Files to create such Database.

SEC—the U.S. Securities and Exchange Commission.

Seed—A sequence of bits (also referred to, for purposes hereof, as a "key-string" or a "salt-string") that is combined according to a pre-defined algorithm with either [a] an A-value, in connection with an irreversible transformation of such A-value to produce a Surrogate Investor Code (a B-value or a C-value), or [b] a B-value, in connection with either a reversible or irreversible transformation of such B-value to generate, respectively, another Surrogate Investor Code (a C-value) or a Proprietary Investor Code (a D-value), the Seed being used for either or both of two reasons:

(i) as a data-security enhancement to prevent dictionary-style attacks against a Surrogate Investor Code system (whether B-values or C-values) or a Proprietary Investor Code system (D-values), especially an attack aimed at determining the A-values from which any codes in such a system were derived; and/or (ii) as an operational convenience when creating C-values, as this enables the use of a common algorithm for performing the transformations that create C-values for the Data Providers, with the set of C-values that result from such transformation being made different for each Data Provider by using a Seed for such Data Provider that is different from the Seed used for any other Data Provider.

Surrogate Investor Code—A code that is substituted in accordance with the Gathering Step of the invention for the A-value associated with certain Customer-Specific Data (or for a derivative of such A-value), in connection with a Data Provider's creation of an Input Data Record to be used by a Receiving Entity in creating a particular Database, such codes being designed in such a manner that:

(i) Each Surrogate Investor Code has the following properties: [0467] [a] It is derived from (or otherwise related to) one and only one A-value and thus designates one particular Investor and only such Investor; [0468] [b] It does not reveal the identity of such Investor because it has no information content that reveals (1) the A-value from which it was derived (or to which it is otherwise related), or (2) any other Customer-Identifying Information; and [0469] [c] When such Data Provider provides to such Receiving Entity any Customer-Specific Data in association with such Surrogate Investor Code, the Receiving Entity is able to use such Surrogate Investor Code (either directly or indirectly) to link such Customer-Specific Data with data pertaining to the same Investor that were provided by other Data Providers in association with Surrogate Investor Codes obtained by them in a similar manner; and (ii) The set of Surrogate Investor Codes used in the creation of such Database cannot be converted using a mathematical transformation into the set of A-values from which they were derived (or to which they are otherwise related) or into any other Customer-Identifying Information.

Trusted Third Party—An entity other than the Receiving Entity or a Data Provider that, at the direction of the Receiving Entity and/or the Data Providers associated with a certain Database, creates, securely maintains, and securely provides to each such Data Provider, at least one essential element of the computer-based means to obtain Surrogate Investor Codes and may perform certain other functions in the Providing Step of the invention with respect to the creation of such Database.

EXTENSIONS OF THE PRESENT INVENTION

While this document sets forth a description of the present invention in terms of applications within the retail financial industry, those skilled in the art will recognize that the invention can be practiced in any industry in which participants maintain computer-based records that contain customer-related data logically associated with information that uniquely identifies each customer and in which such uniquely-identifying information is used in common by all participants. Further, while the present invention has been described in terms of several Embodiment Types and a particular embodiment consistent with Embodiment Type III, those skilled in the art will recognize that the invention can be practiced with modification within the spirit and scope of such description, which could include, for example, using certain features of one Embodiment Type in another Embodiment Type, or using less than all the features of a particular Embodiment Type.

What is claimed is:

1. A method of compiling a computerized database containing a composite data profile for each entity among a plurality of entities by linking data records received from a plurality of data providers and containing data that pertain to such entities, the method comprising:
    inputting, using a computer, a set of data records received from each data provider,
        wherein each data record pertains to a specific entity, contains data that pertain to that entity, and is associated with a surrogate entity code,
            wherein the surrogate entity code is associated with a single value of an entity identifier,
                wherein the value of the entity identifier represents the entity to which the data record pertains,
            wherein the surrogate entity code does not disclose the value of the entity identifier with which it is associated, and
            wherein the surrogate entity code is different from the surrogate entity codes associated with data records that pertain to that entity which are received from other data providers;
    determining, using a computer executing a code-resolution algorithm, which surrogate entity codes are associated with the same value of the entity identifier,
        wherein the code-resolution algorithm does not disclose the value of the entity identifier that is associated with any surrogate entity code; and
    linking, using a computer, data records associated with surrogate entity codes that are determined to be associated with the same value of the entity identifier.

2. The method of claim 1, wherein the entities are individuals or organizations.

3. The method of claim 1, wherein the values of the entity identifier comprise social security numbers.

4. The method of claim 2, wherein the values of the entity identifier comprise taxpayer identification numbers.

5. The method of claim 2, wherein the values of the entity identifier comprise email addresses.

6. The method of claim 2, wherein the values of the entity identifier comprise telephone numbers.

7. The method of claim 2, wherein the values of the entity identifier comprise addresses.

8. The method of claim 1,
    wherein each value of the entity identifier is associated with a common surrogate entity code,
        wherein that common surrogate entity code is associated with only that value of the entity identifier,
        wherein that value of the entity identifier is associated with only that common surrogate entity code, and
        wherein the common surrogate entity code does not disclose the value of the entity identifier;
    wherein each surrogate entity code is derived by executing a reversible transformation of the common surrogate entity code that is associated with the value of the entity identifier with which that surrogate entity code is associated,
        wherein the reversible transformation does not disclose the value of the entity identifier associated with any common surrogate entity code or any surrogate entity code, and
        wherein the reversible transformation is different from any reversible transformation executed to derive surrogate entity codes associated with inputted data records from other data providers; and
    wherein the code-resolution algorithm reverses each reversible transformation.

9. The method of claim 8, wherein the reversible transformation is based upon a symmetric cryptographic encryption function, and the code-resolution algorithm reverses that symmetric cryptographic encryption function, using the key associated with that encryption function.

10. The method of claim 8, wherein the reversible transformation is based upon an asymmetric cryptographic encryption function, and the code-resolution algorithm reverses that asymmetric cryptographic encryption function, using the key associated with that encryption function.

11. The method of claim 8, further comprising:
replacing with a proprietary entity code, using a computer, the common surrogate entity code that is associated with the surrogate entity code associated with each data record,
  wherein the proprietary entity code replaces only that common surrogate entity code,
  wherein the common surrogate entity code is replaced by only that proprietary entity code, and
  wherein the proprietary entity code does not disclose the value of the entity identifier associated with the common surrogate entity code the proprietary entity code replaces; and
linking data records that are associated with the same proprietary entity code.

12. The method of claim 11, wherein no proprietary entity code discloses the common surrogate entity code it replaces or any surrogate entity code associated with that common surrogate entity code.

13. The method of claim 11, wherein the proprietary entity codes are not known to any data provider.

14. The method of claim 8, wherein a lookup table is provided to a data provider for use in obtaining surrogate entity codes applicable to that data provider.

15. The method of claim 14,
wherein the lookup table comprises values of the entity identifier and, associated with each value, the associated common surrogate entity code, and
wherein instructions are provided to the data provider for obtaining, with respect to any particular value of the entity identifier, the surrogate entity code that is associated with that value of the entity identifier and is applicable to that data provider by:
  obtaining the common surrogate entity code associated with that value of the entity identifier by searching, using a computer, the lookup table using that value of the entity identifier as the search argument, and
  deriving the surrogate entity code by executing the reversible transformation of that common surrogate entity code.

16. The method of claim 14,
wherein the lookup table comprises values of the entity identifier and, associated with each value, the associated surrogate entity code applicable to that data provider, and
wherein instructions are provided to the data provider for obtaining, with respect to any particular value of the entity identifier, the surrogate entity code that is associated with that value of the entity identifier and is applicable to that data provider by searching, using a computer, the lookup table using that value of the entity identifier as the search argument.

17. The method of claim 1,
wherein a cross-reference table of surrogate entity codes and associated values of the entity identifier is created,
wherein each row of the table is assigned to a different value of the entity identifier,
wherein each column of the table is assigned to a different data provider and is populated with the surrogate entity codes applicable to that data provider, each surrogate entity code in the row assigned to the value of the entity identifier with which that surrogate entity code is associated, and
wherein the cross-reference table does not disclose the association between any value of the entity identifier and its associated surrogate entity codes; and
wherein the code-resolution algorithm searches the cross-reference table to determine which surrogate entity codes are in the same row of the table.

18. The method of claim 17, wherein the rows of the cross-reference table are randomly ordered.

19. The method of claim 17, further comprising:
logically associating, using a computer, a proprietary entity code with each row of the cross-reference table,
  wherein that proprietary entity code is associated with only that row of the cross-reference table,
  wherein that row of the cross-reference table is associated with only that proprietary entity code, and
  wherein that proprietary entity code does not disclose the value of the entity identifier associated with that row of the cross-reference table;
replacing, using a computer, the surrogate entity code associated with each data record with the proprietary entity code that is associated with the row of the table populated by that surrogate entity code; and
linking data records that are associated with the same proprietary entity code.

20. The method of claim 19, wherein no proprietary entity code discloses the surrogate entity code it replaces.

21. The method of claim 19, wherein the proprietary entity codes are not known to any data provider.

22. The method of claim 17,
wherein instructions are provided to a data provider for obtaining, with respect to any particular value of the entity identifier, the surrogate entity code that is associated with that value of the entity identifier and is applicable to that data provider by executing, using a computer, an irreversible transformation of that value of the entity identifier,
wherein the irreversible transformation is different from any irreversible transformation executed to derive surrogate entity codes associated with data records inputted from other data providers.

23. The method of claim 22, wherein the irreversible transformation is based upon a cryptographic hash function using a key that is used only by that data provider.

24. The method of claim 17, wherein a lookup table is provided to a data provider for use in obtaining surrogate entity codes applicable to that data provider,
wherein the lookup table comprises values of the entity identifier and, associated with each value, the associated surrogate entity code that is applicable to that data provider, and
wherein instructions are provided to the data provider for obtaining, with respect to any particular value of the entity identifier, the surrogate entity code that is associated with that value of the entity identifier and is applicable to that data provider by searching, using a computer, the lookup table using that value of the entity identifier as the search argument.

\* \* \* \* \*